US011132295B2

(12) United States Patent
Kanno et al.

(10) Patent No.: US 11,132,295 B2
(45) Date of Patent: Sep. 28, 2021

(54) MEMORY SYSTEM AND METHOD FOR CONTROLLING NONVOLATILE MEMORY

(71) Applicant: Toshiba Memory Corporation, Tokyo (JP)

(72) Inventors: Shinichi Kanno, Tokyo (JP); Naoki Esaka, Kawasaki Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 16/704,924

(22) Filed: Dec. 5, 2019

(65) Prior Publication Data
US 2020/0110698 A1 Apr. 9, 2020

Related U.S. Application Data

(63) Continuation of application No. 15/914,051, filed on Mar. 7, 2018, now Pat. No. 10,545,864.

(30) Foreign Application Priority Data

Sep. 21, 2017 (JP) .............................. JP2017-181686

(51) Int. Cl.
G06F 12/02 (2006.01)
G06F 12/1018 (2016.01)
G06F 3/06 (2006.01)

(52) U.S. Cl.
CPC ........ *G06F 12/0261* (2013.01); *G06F 3/0608* (2013.01); *G06F 3/0641* (2013.01); *G06F 3/0688* (2013.01); *G06F 12/0246* (2013.01); *G06F 12/1018* (2013.01); *G06F 2212/1044* (2013.01); *G06F 2212/2022* (2013.01);
(Continued)

(58) Field of Classification Search
CPC ............. G06F 12/0246; G06F 12/0292; G06F 12/0891; G06F 3/0659; G06F 3/064; G06F 3/061; G06F 3/0679
See application file for complete search history.

(56) References Cited

U.S. PATENT DOCUMENTS 7,957,236 B2 * 6/2011 Blacquiere ......... G11B 20/1883
369/47.14
8,352,706 B2 1/2013 Yano et al.
(Continued)

FOREIGN PATENT DOCUMENTS

| JP | 2014-513345 A | 5/2014 |
| JP | 2016-126632 A | 7/2016 |
| JP | 2017-049806 A | 3/2017 |

*Primary Examiner* — Pierre Miche Bataille

(57) ABSTRACT

According to one embodiment, a memory system manages a plurality of management tables corresponding to a plurality of first blocks in a nonvolatile memory. Each management table includes a plurality of reference counts corresponding to a plurality of data in a corresponding first block. The memory system copies a set of data included in a copy-source block for garbage collection and corresponding respectively to reference counts belonging to a first reference count range to a first copy-destination block, and copies a set of data included in the copy-source block and corresponding respectively to reference counts belonging to a second reference count range having a lower limit higher than an upper limit of the first reference count range to a second copy-destination block.

11 Claims, 40 Drawing Sheets

(52) U.S. Cl.
CPC ............... *G06F 2212/7201* (2013.01); *G06F 2212/7205* (2013.01)

(56) References Cited

U.S. PATENT DOCUMENTS

| | | |
|---|---|---|
| 8,751,763 B1 | 6/2014 | Ramarao |
| 9,223,511 B2 | 12/2015 | Rudelic |
| 9,251,087 B2 | 2/2016 | Nellans et al. |
| 9,563,555 B2 | 2/2017 | Flynn et al. |
| 9,852,066 B2* | 12/2017 | Shaharabany ...... G06F 12/0253 |
| 10,114,743 B2 | 10/2018 | Heller et al. |
| 10,545,863 B2* | 1/2020 | Kanno ................ G06F 12/0246 |
| 10,817,209 B2* | 10/2020 | Matsushita ........... G06F 3/0608 |
| 2007/0136555 A1 | 6/2007 | Sinclair |
| 2011/0082997 A1* | 4/2011 | Yochai .................. G06F 3/0689 |
| | | 711/171 |
| 2011/0231603 A1 | 9/2011 | Nakamura |
| 2014/0068214 A1 | 3/2014 | Yamada et al. |
| 2016/0062667 A1 | 3/2016 | Samuels et al. |
| 2016/0196215 A1 | 7/2016 | Ogihara |
| 2017/0060774 A1 | 3/2017 | Ito et al. |
| 2018/0088811 A1* | 3/2018 | Kanno .................. G06F 3/0679 |
| 2018/0095873 A1* | 4/2018 | Nakagoe ................ G06F 12/16 |

* cited by examiner

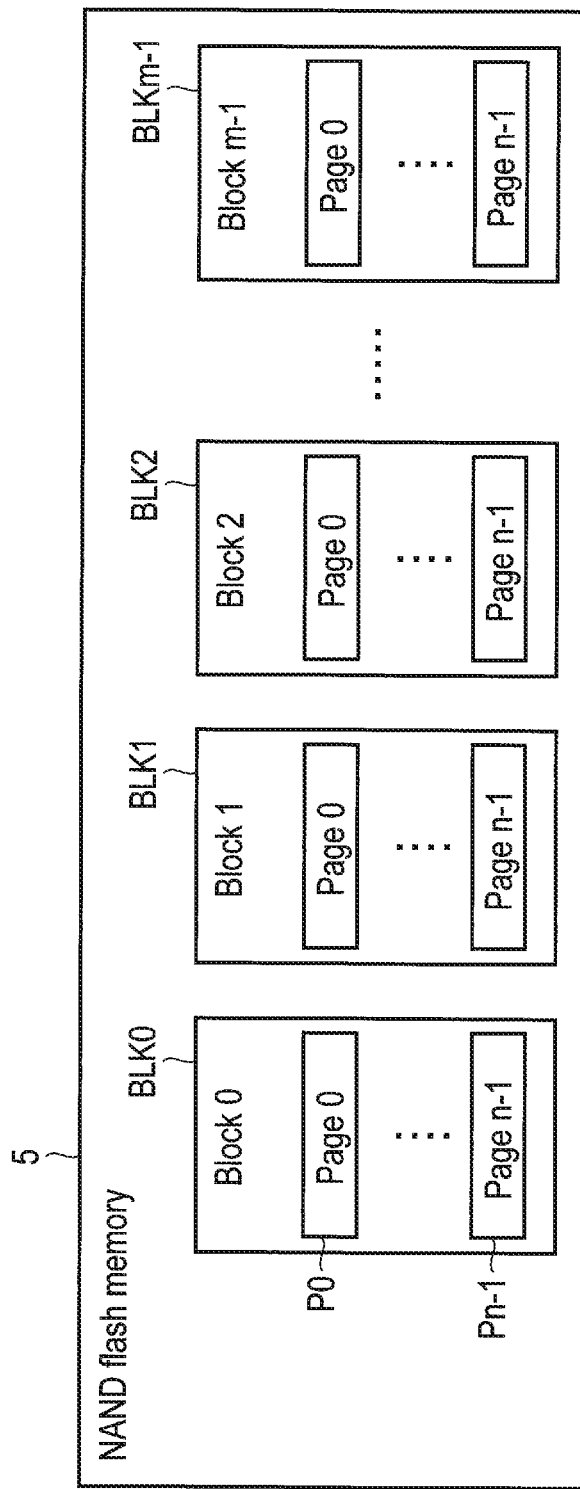
F I G. 2

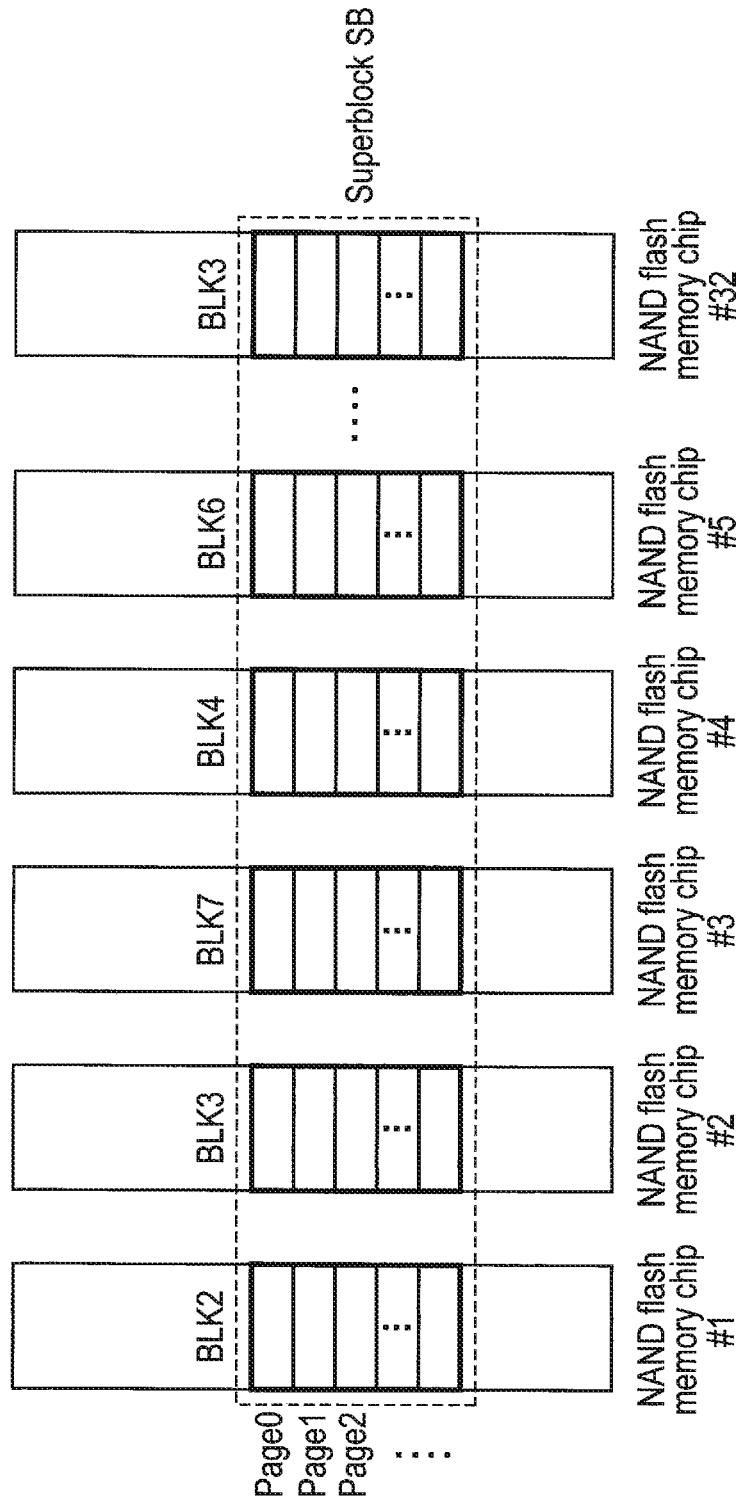
F I G. 4

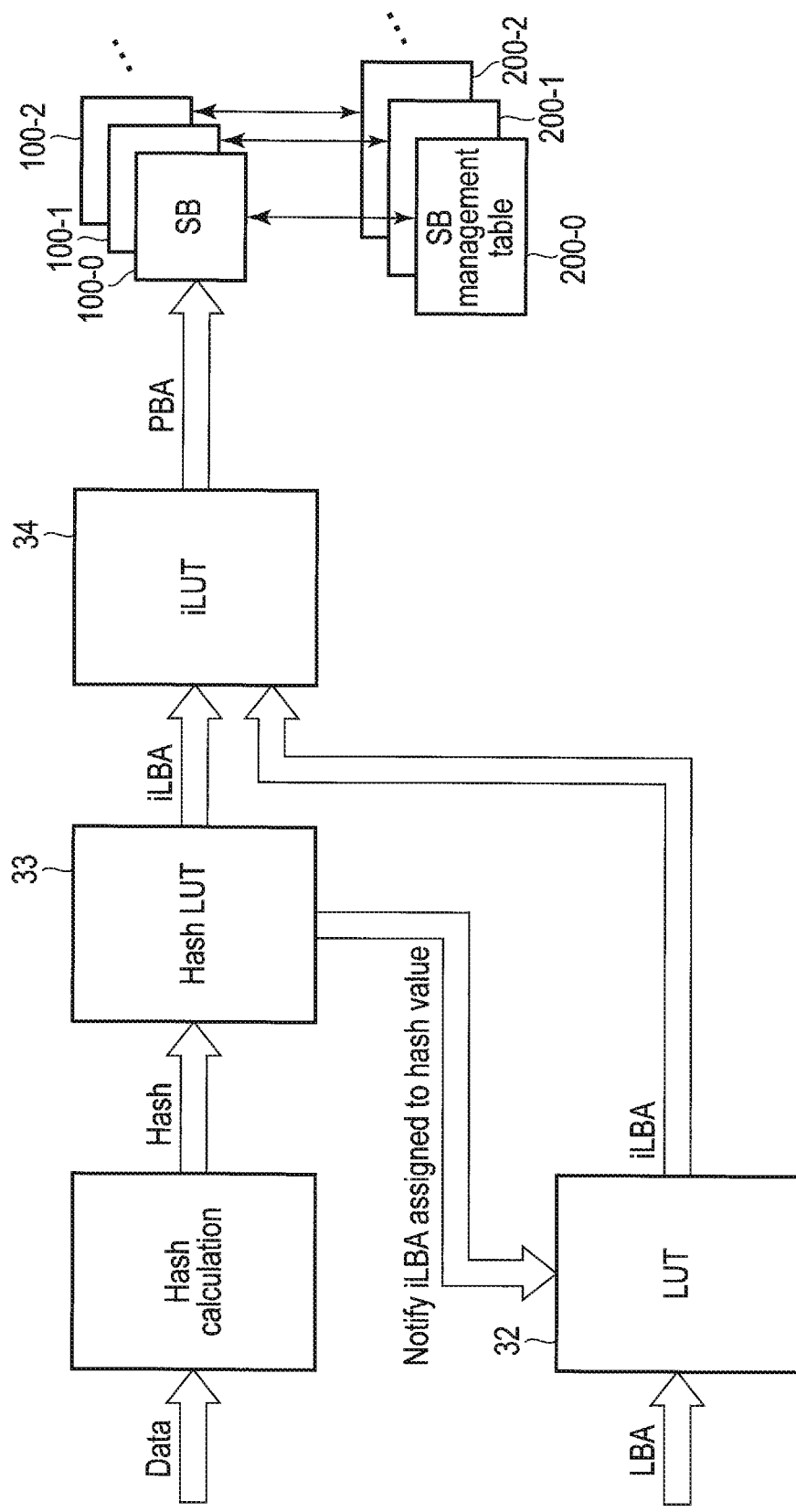
F I G. 7

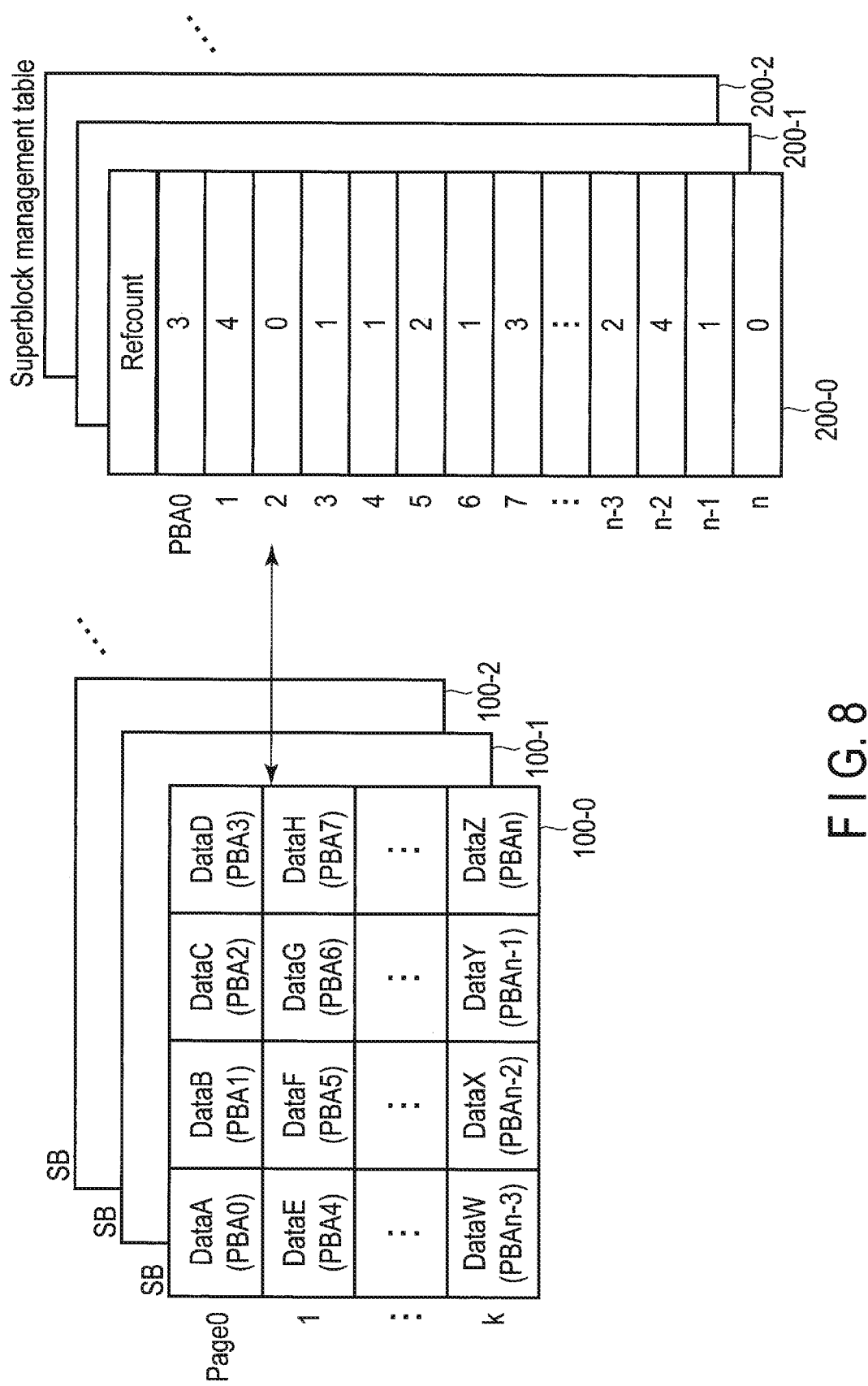
F I G. 8

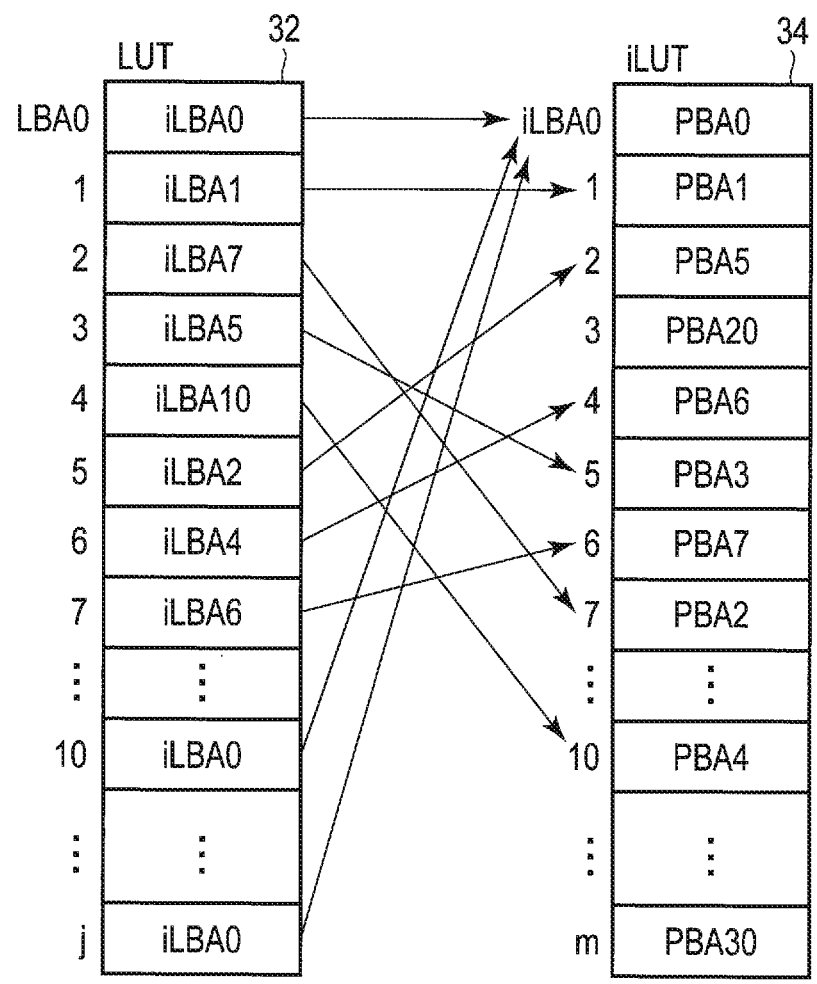
F I G. 10

Hash LUT 33

| Hash(DataA) | iLBA0 |
|---|---|
| Hash(DataB) | iLBA1 |
| Hash(DataC) | iLBA7 |
| Hash(DataD) | iLBA5 |
| Hash(DataE) | iLBA10 |
| Hash(DataF) | iLBA2 |
| Hash(DataG) | iLBA4 |
| Hash(DataH) | iLBA6 |
| ⋮ | ⋮ |

F I G. 11

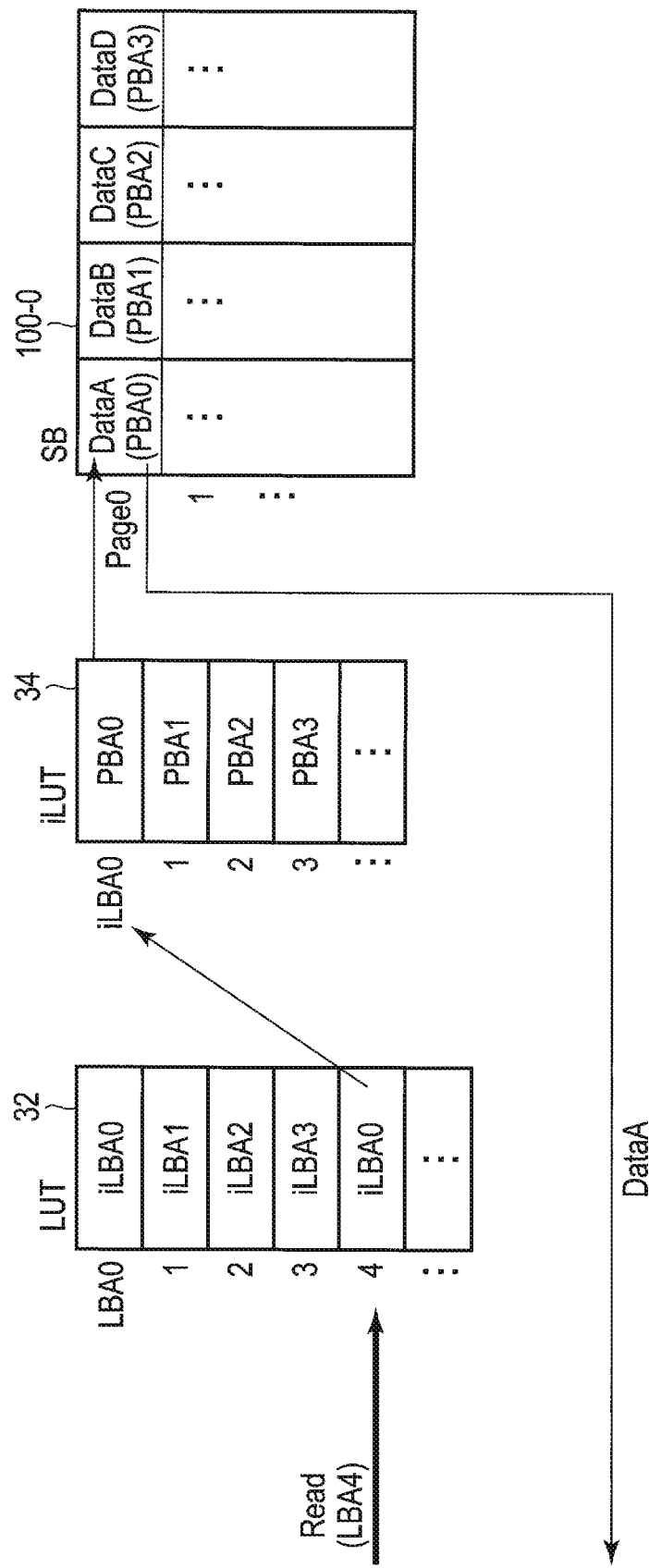
F I G. 13

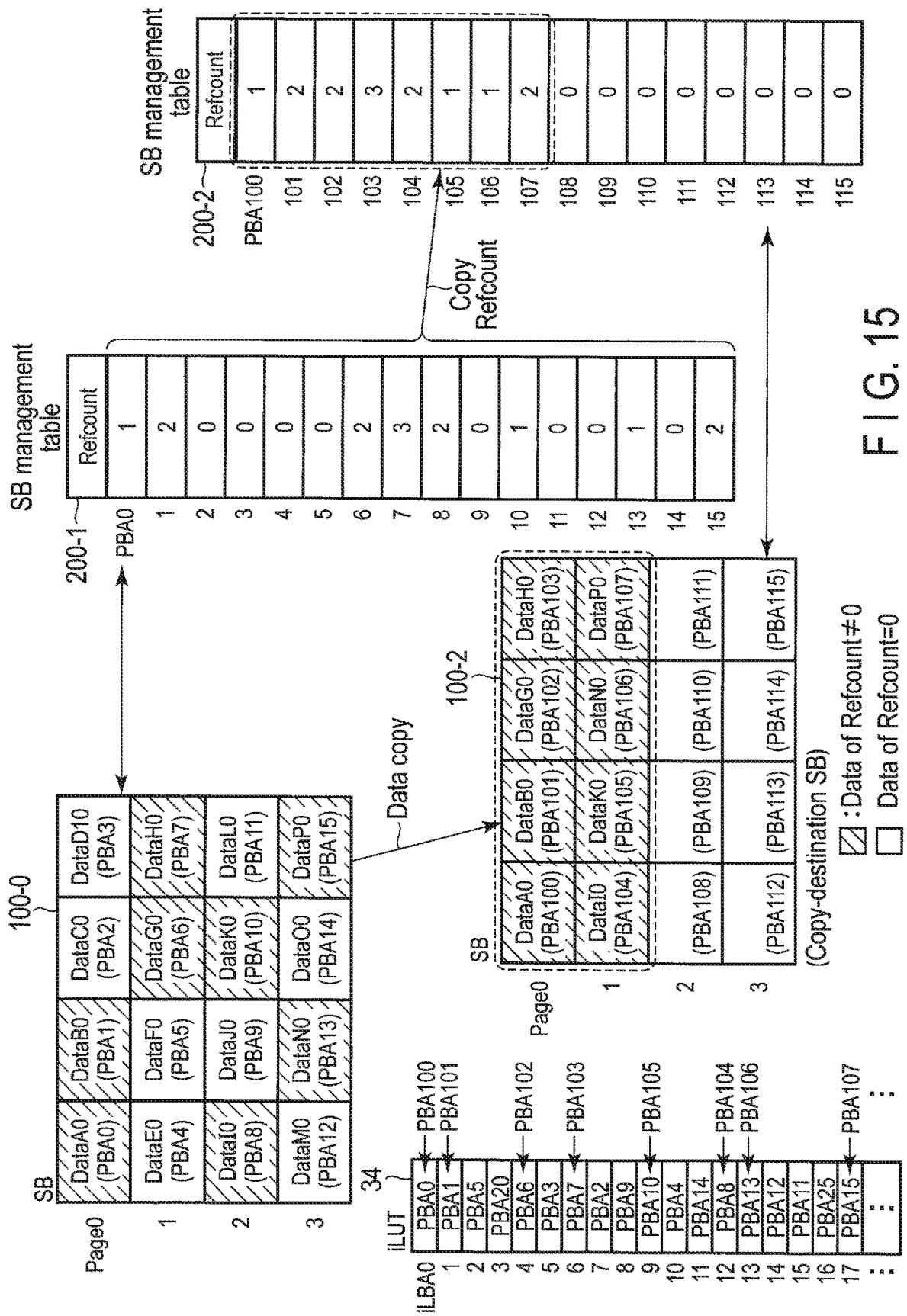
F I G. 15

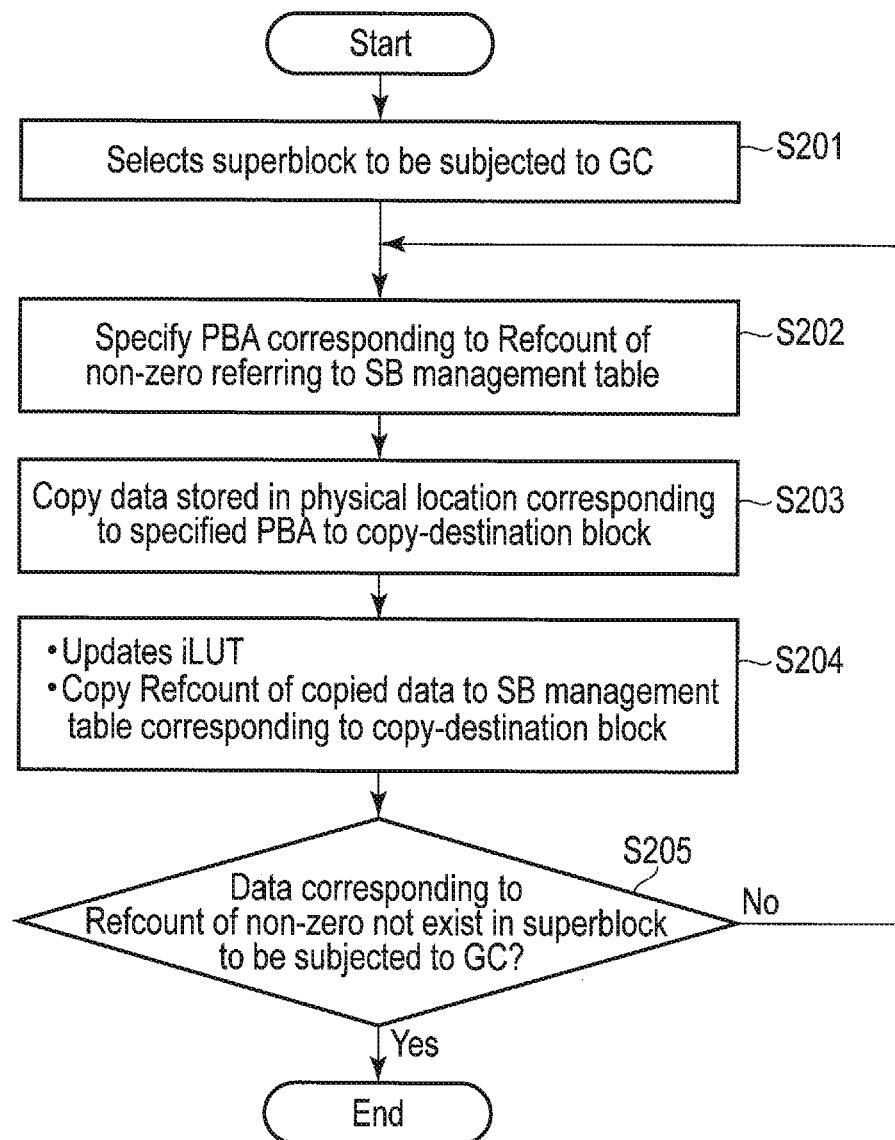
F I G. 18

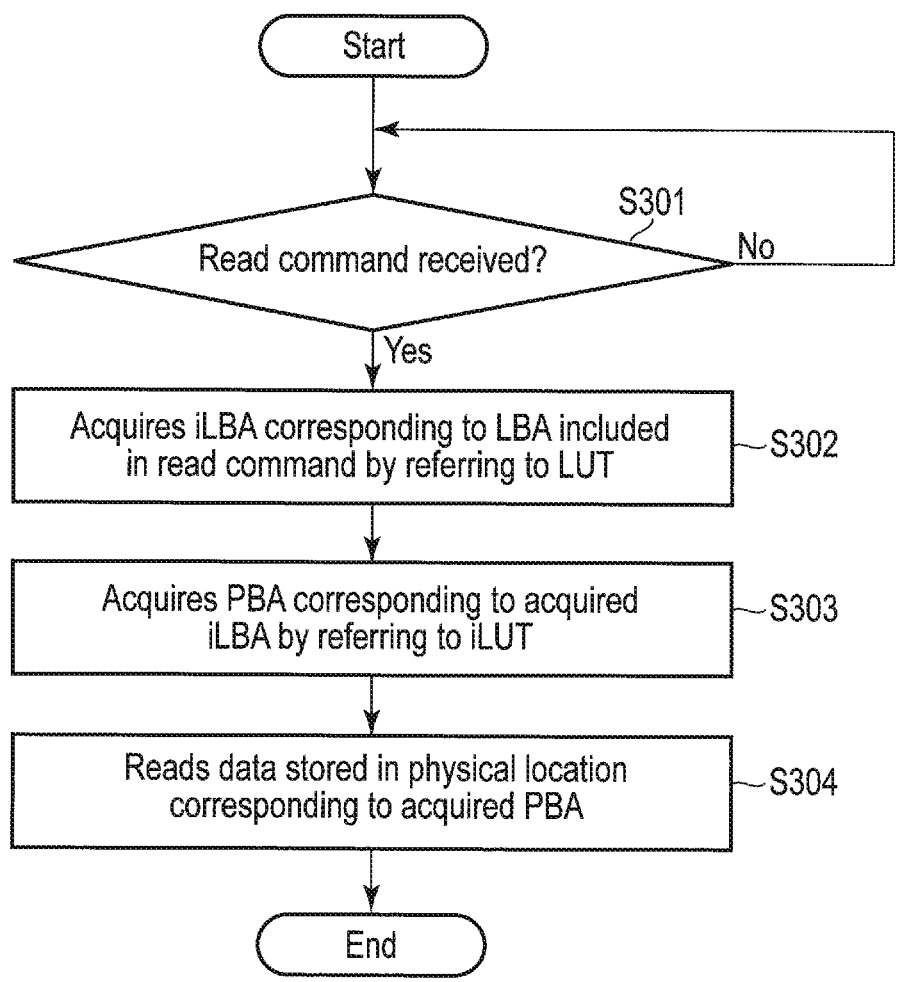
F I G. 19

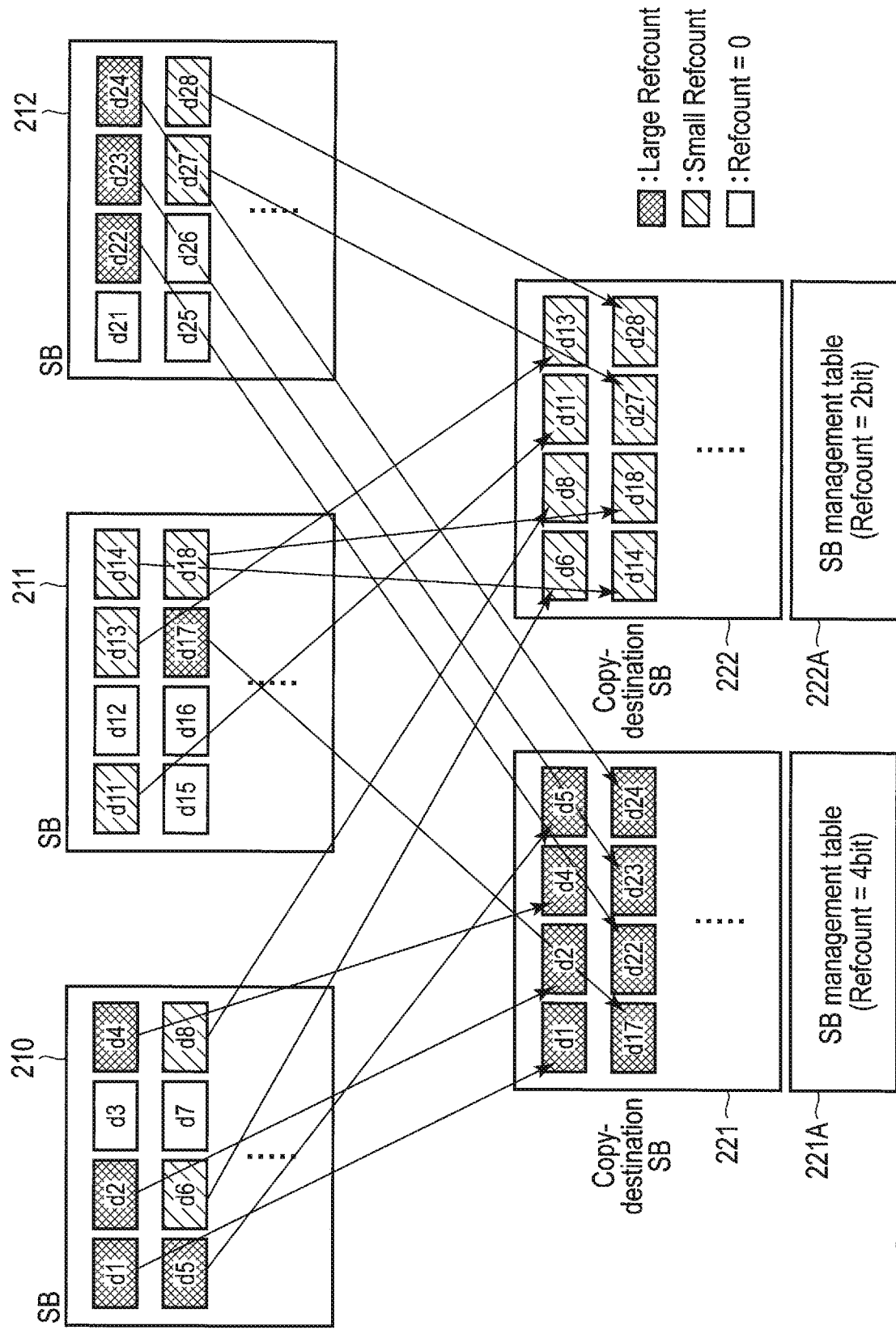
F I G. 21

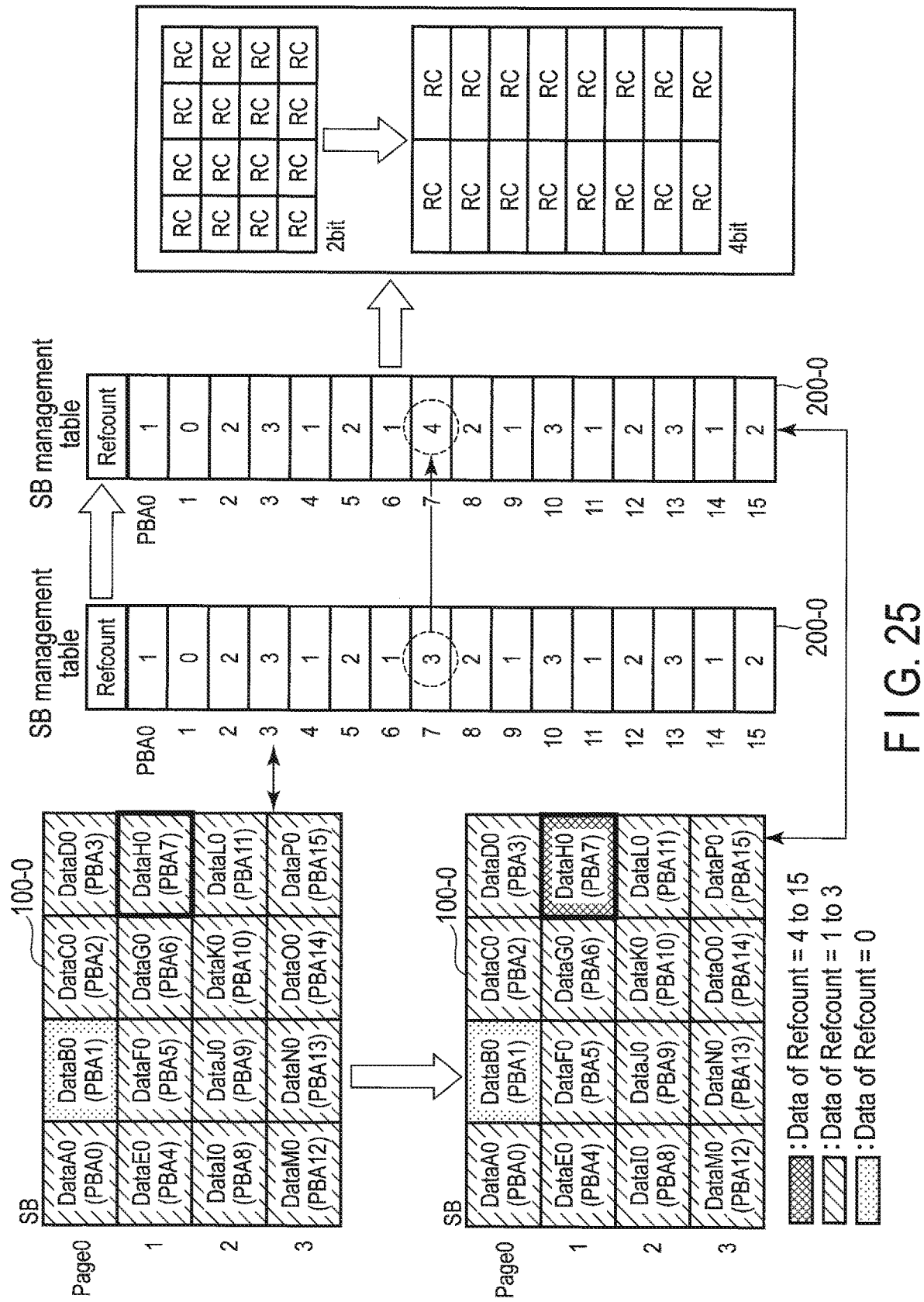
F I G. 25

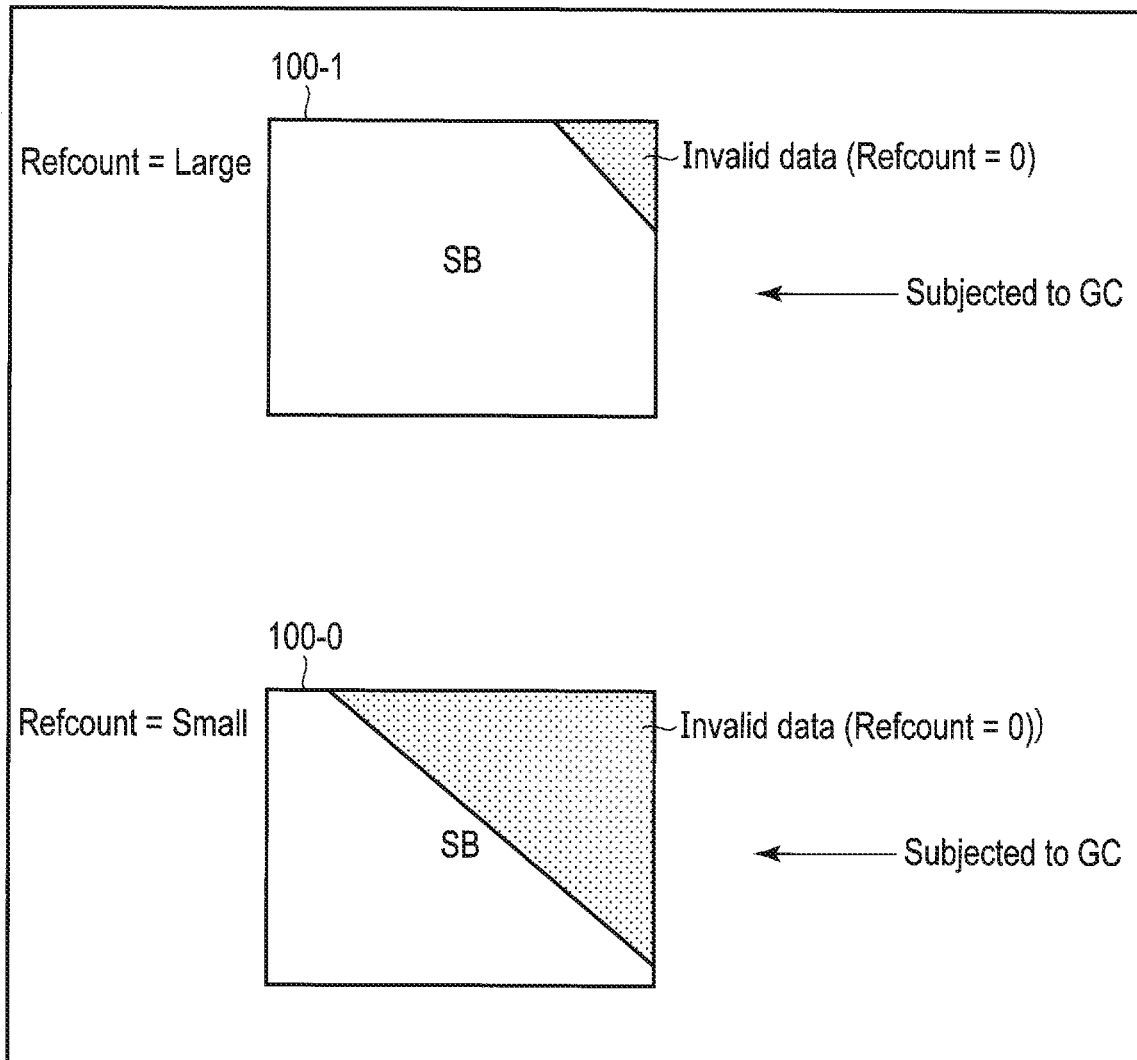
F I G. 26

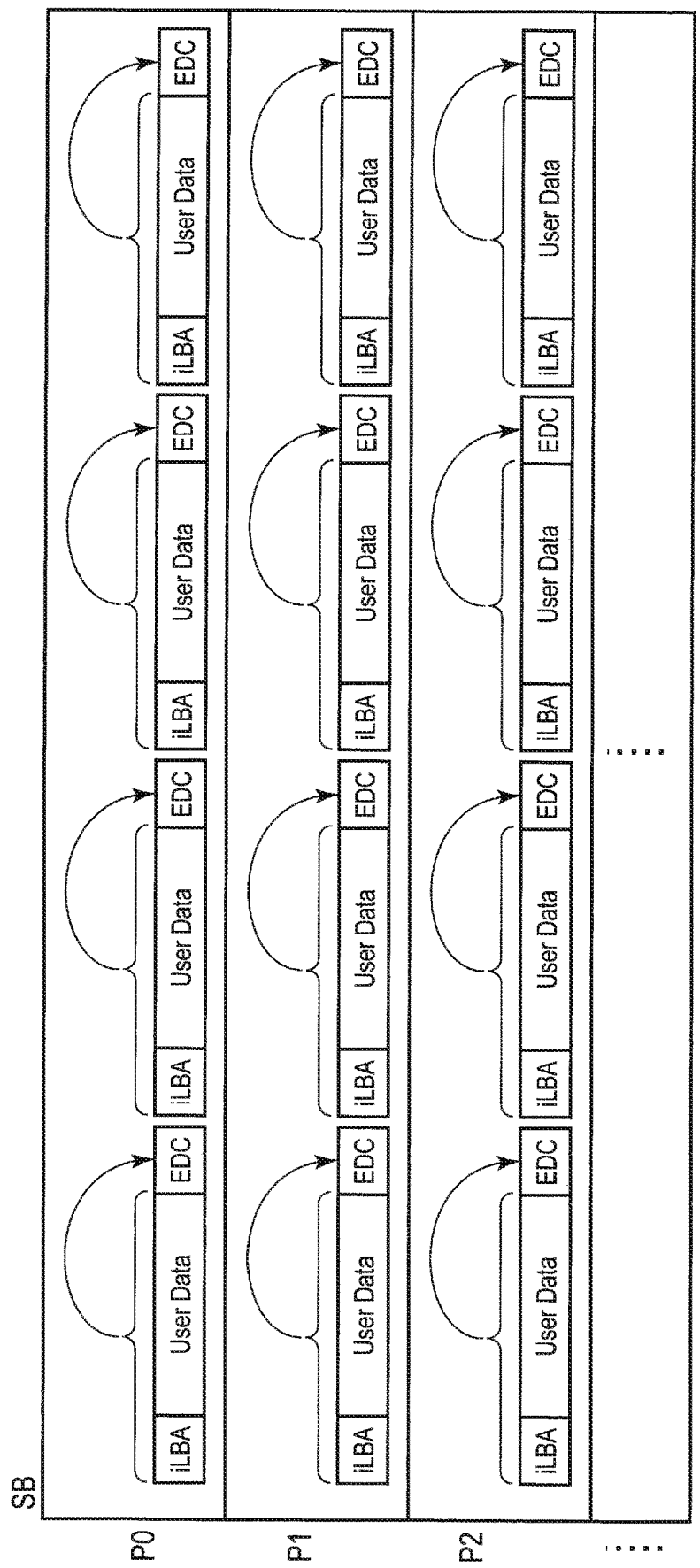
F I G. 29

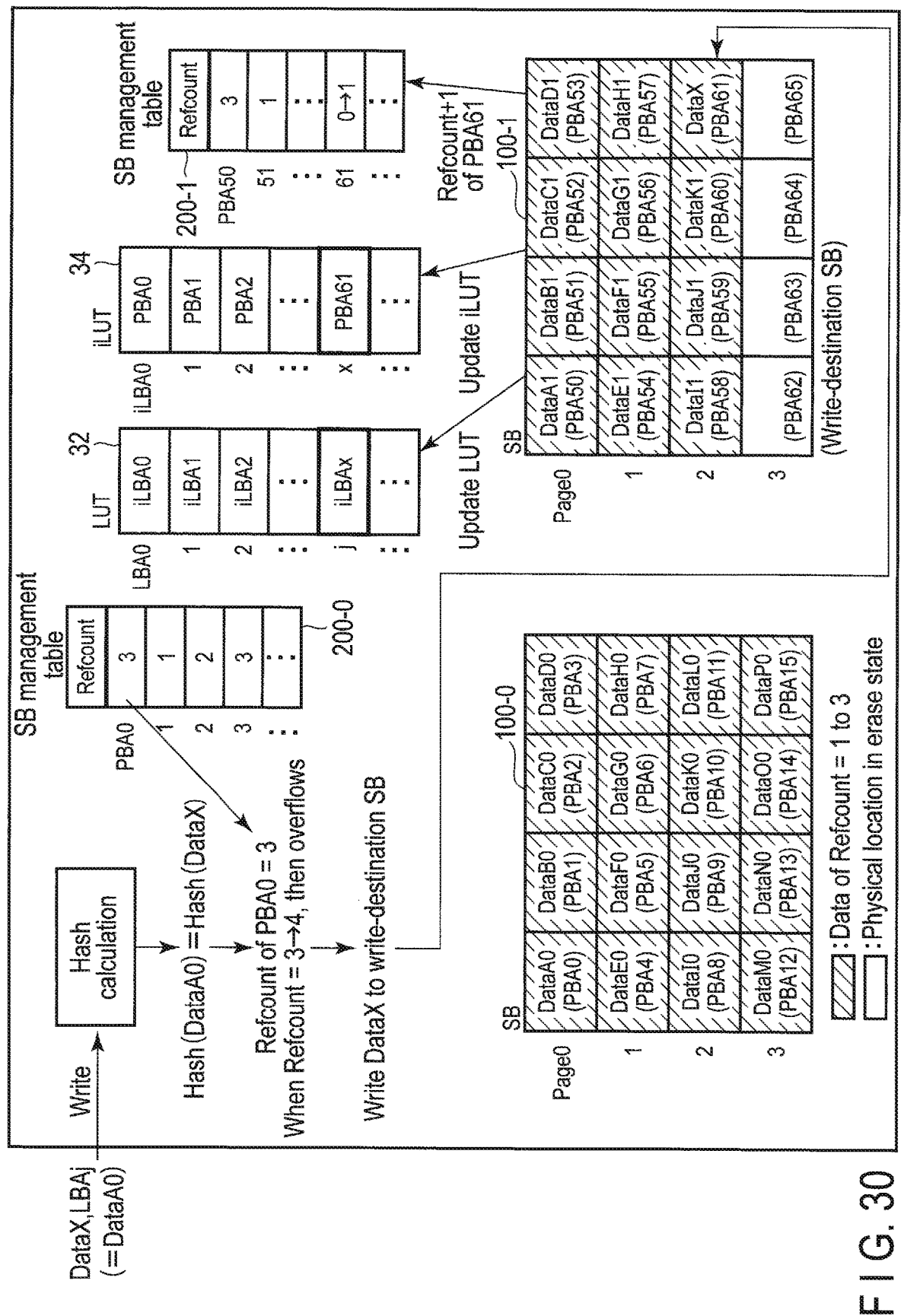
F I G. 30

F.I.G. 31

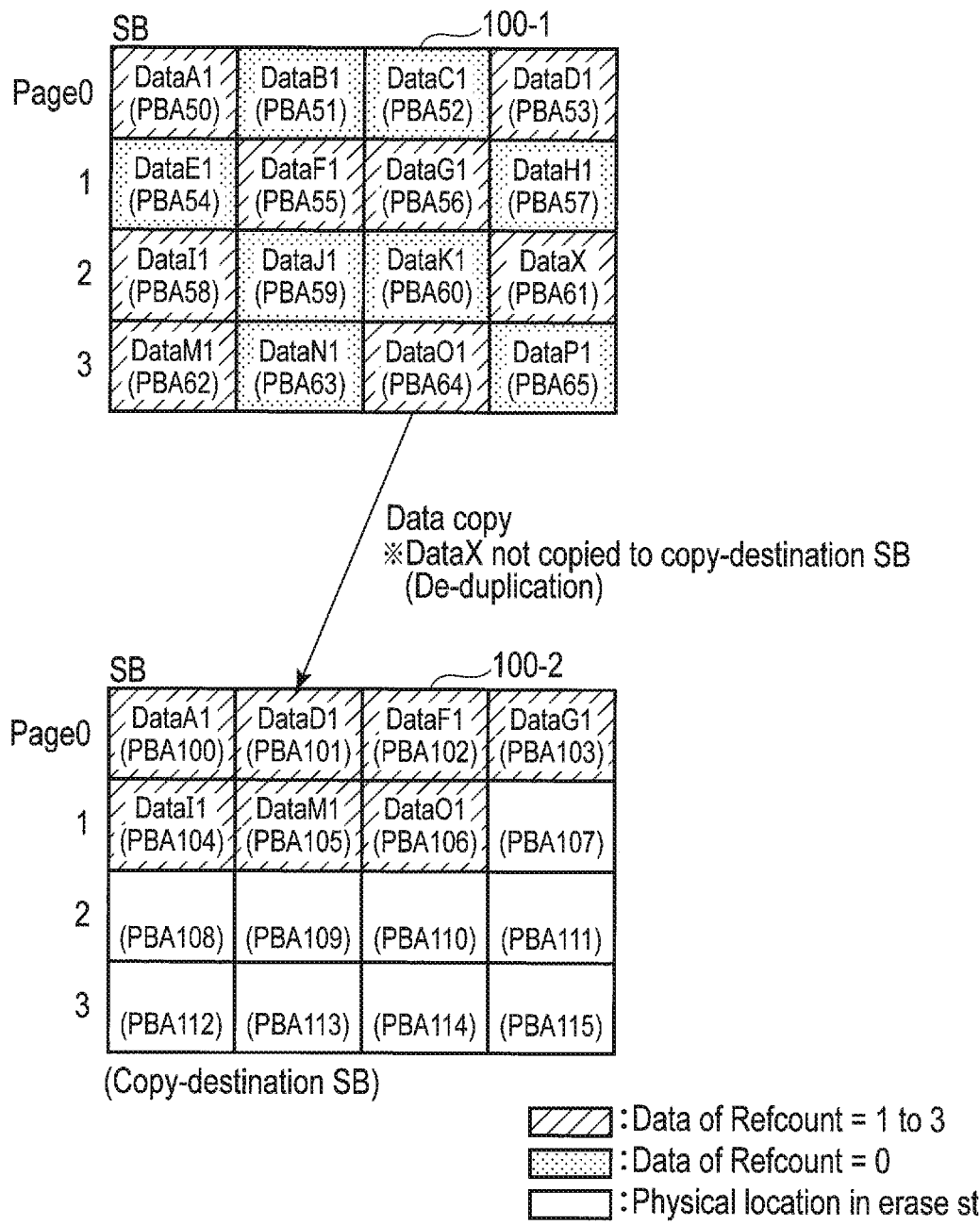
F I G. 32

FIG. 33

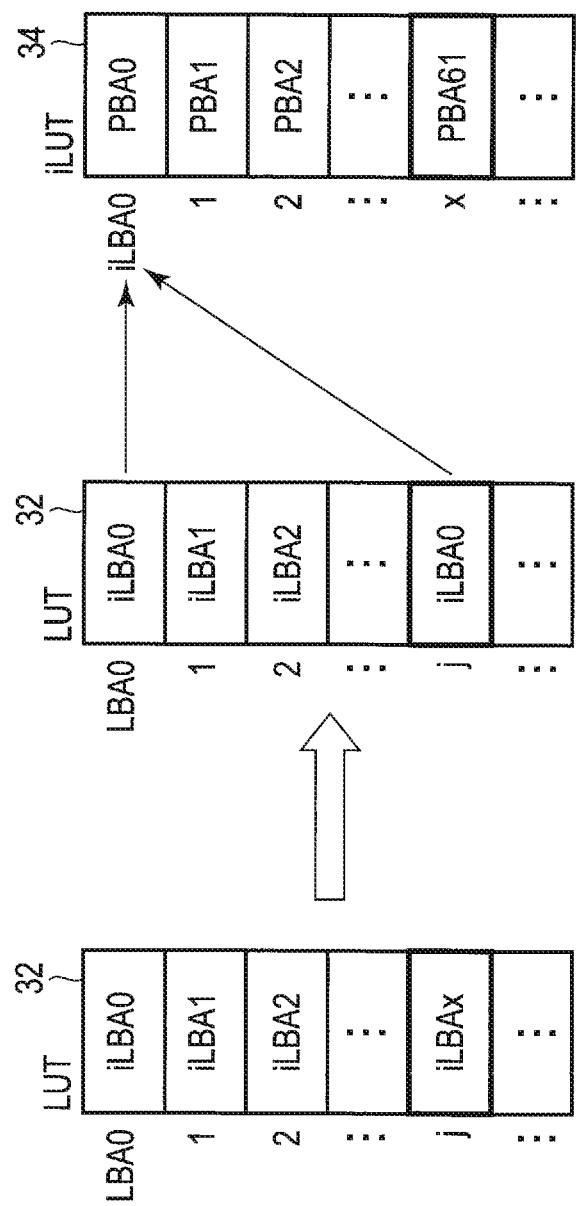
F I G. 34

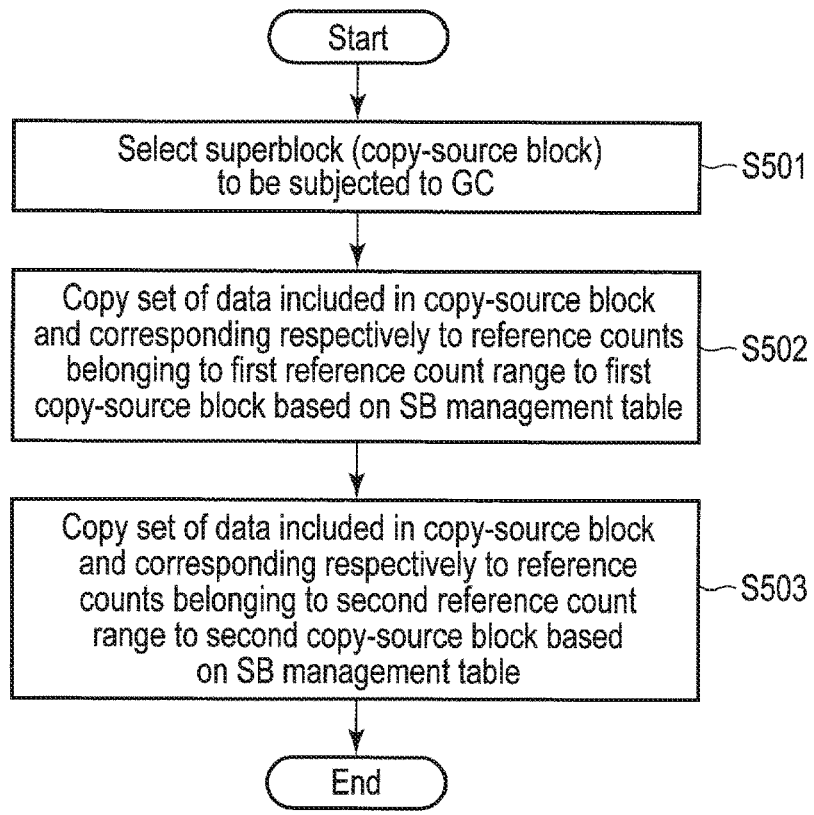
F I G. 35
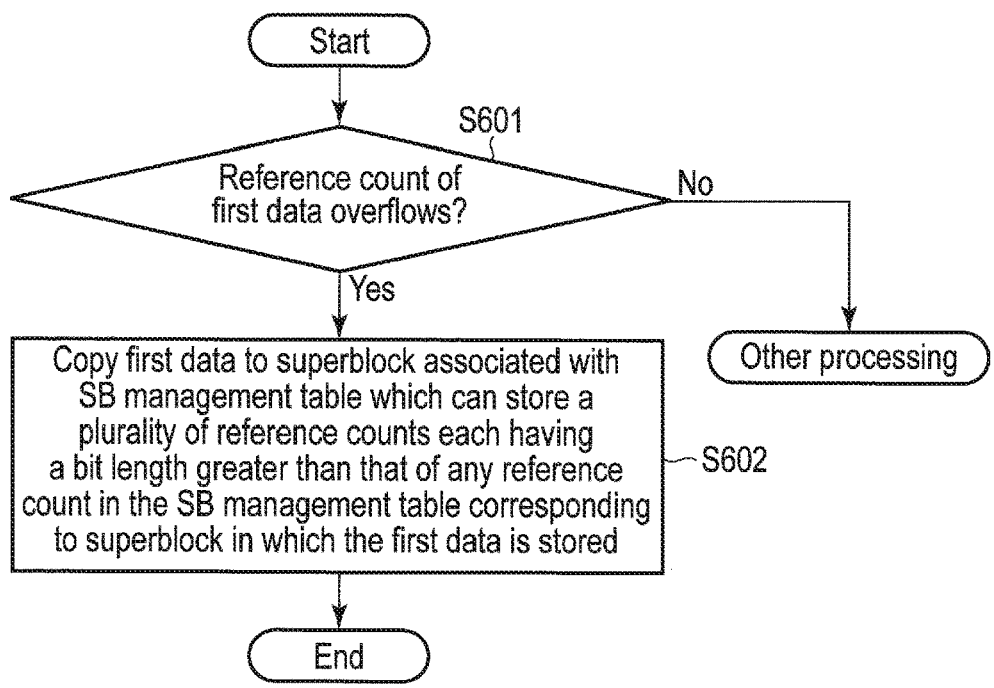
F I G. 36

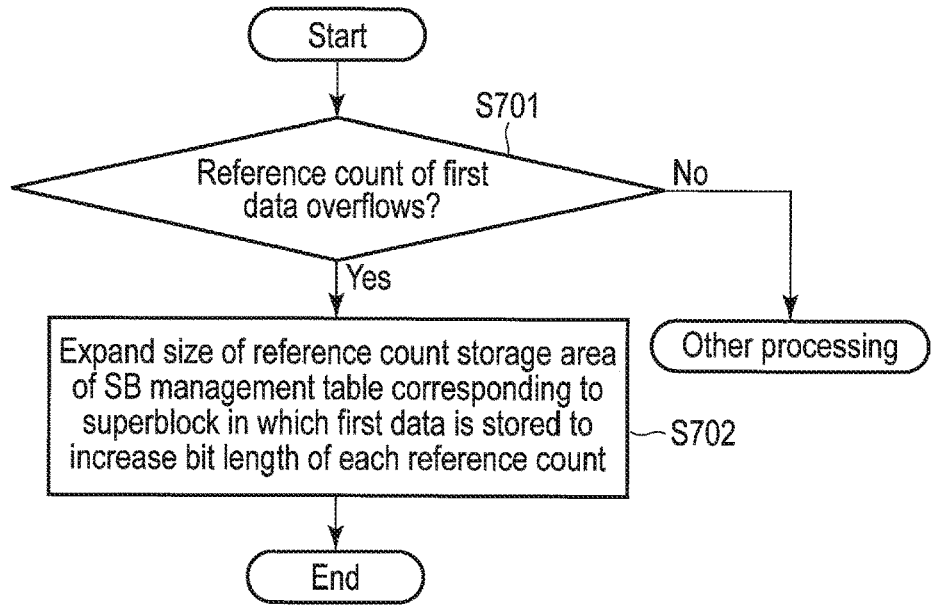
F I G. 37
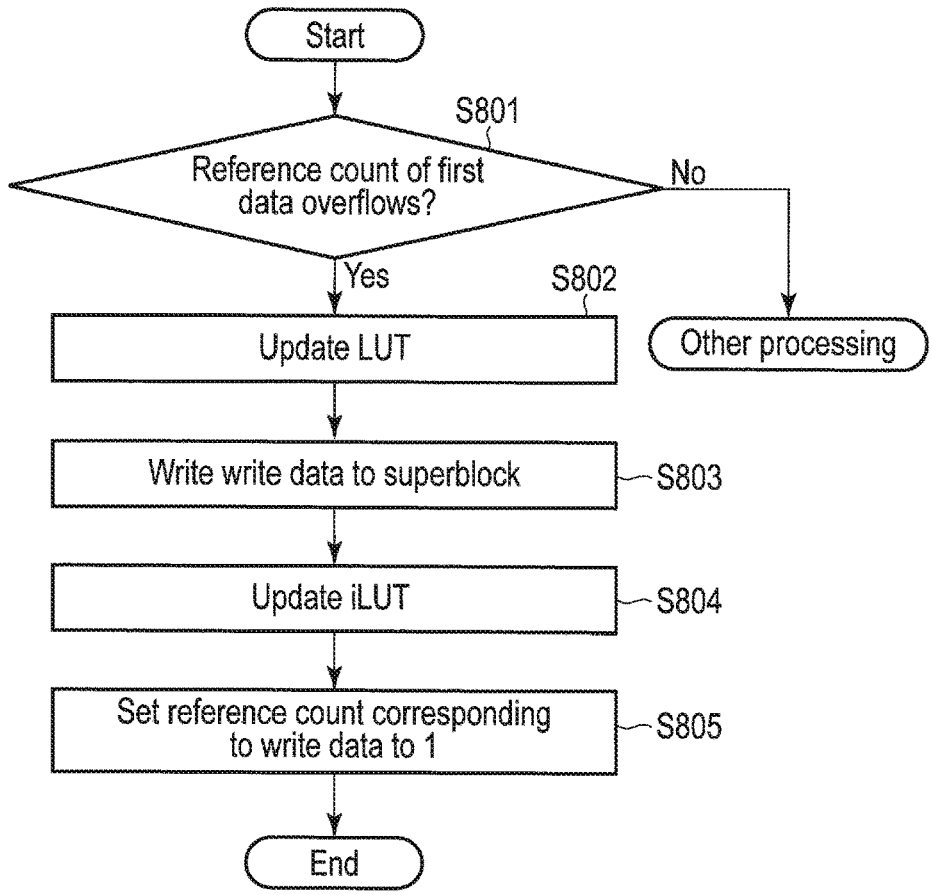
F I G. 38

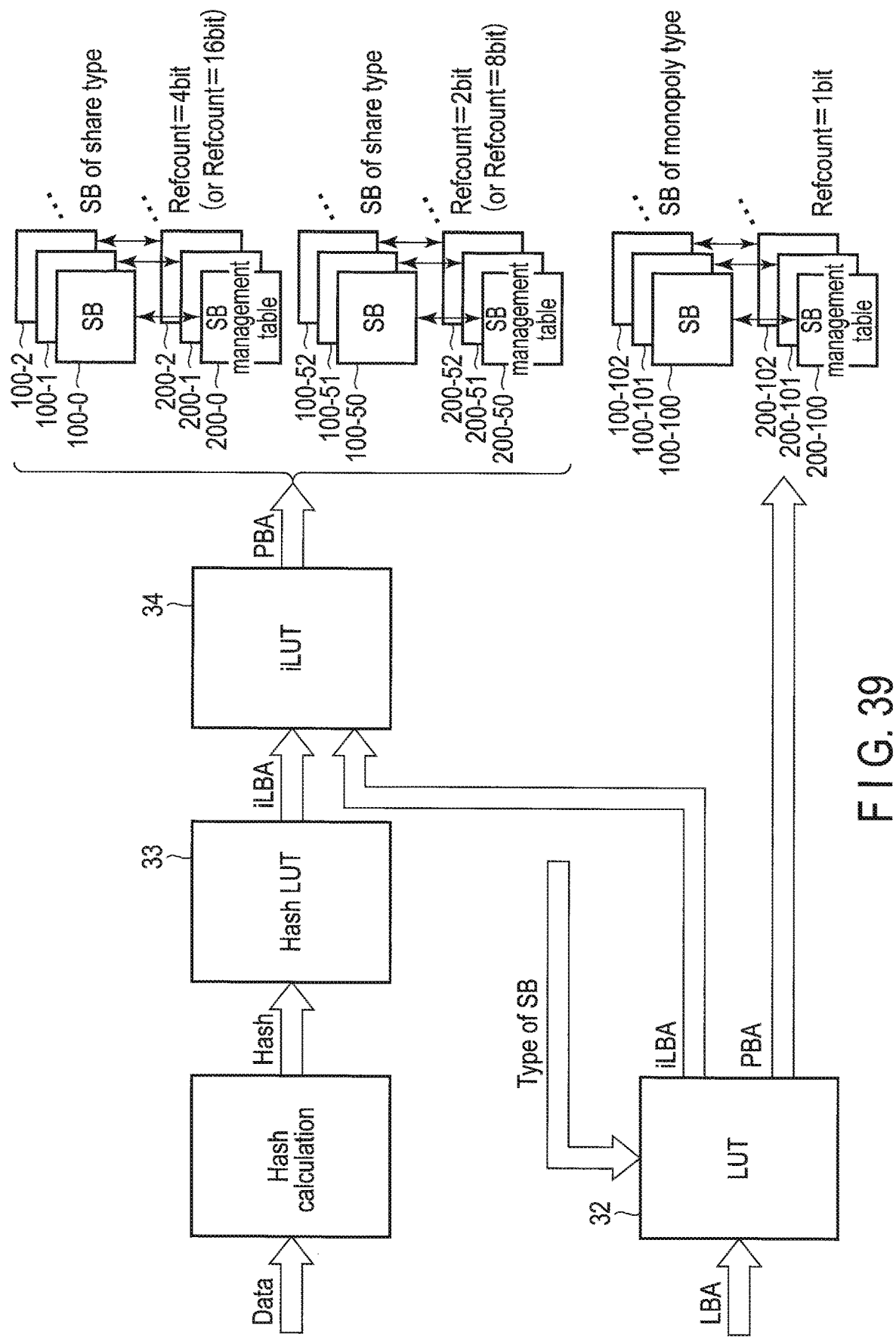
F I G. 39

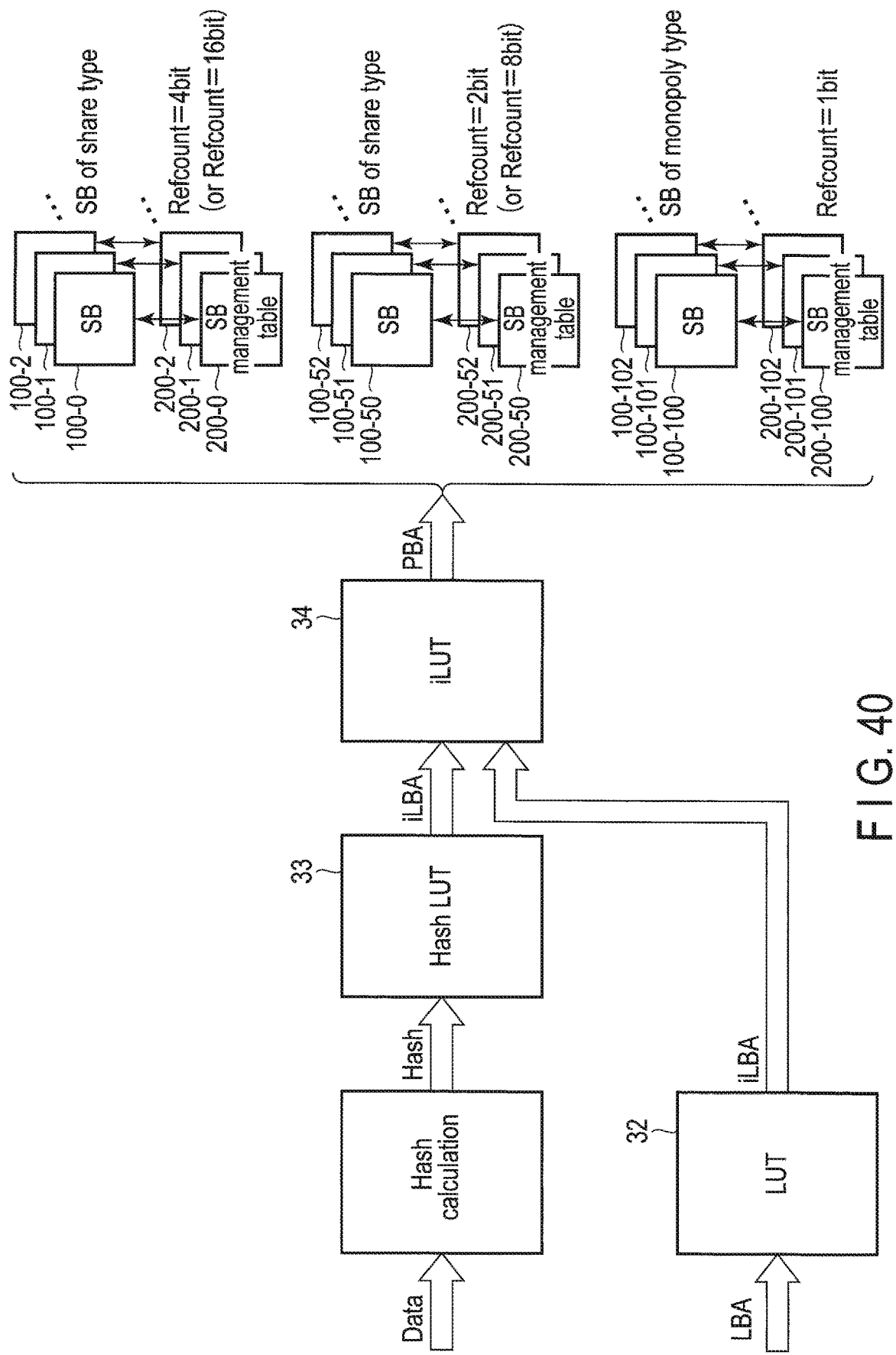
F I G. 40

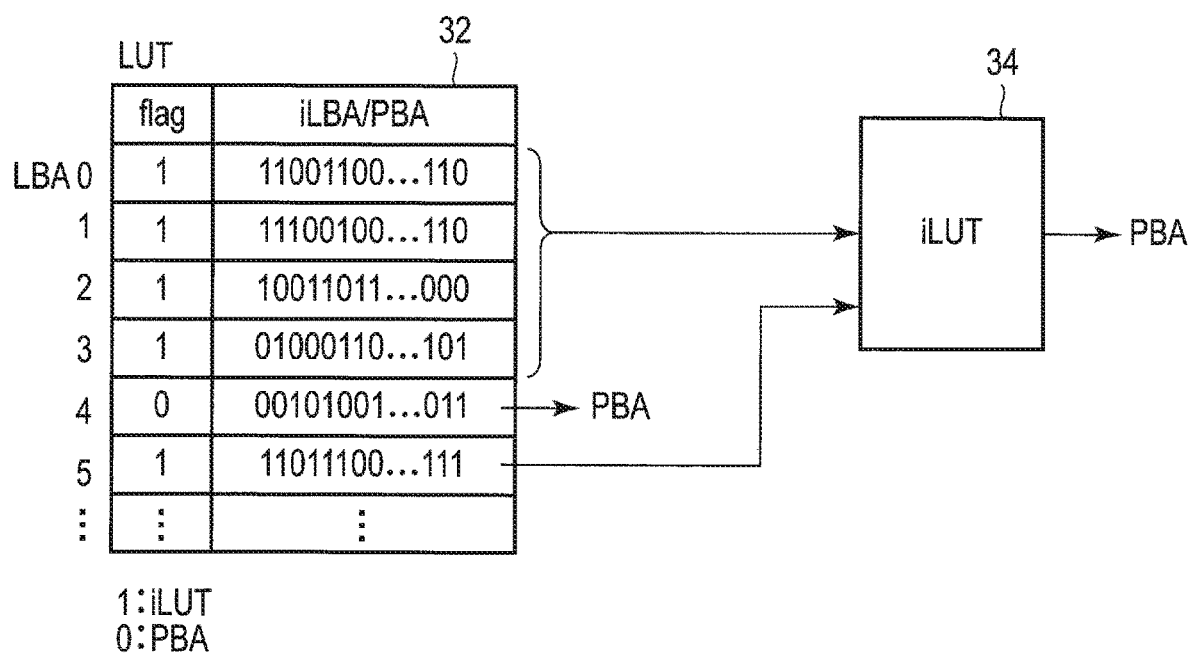
F I G. 41

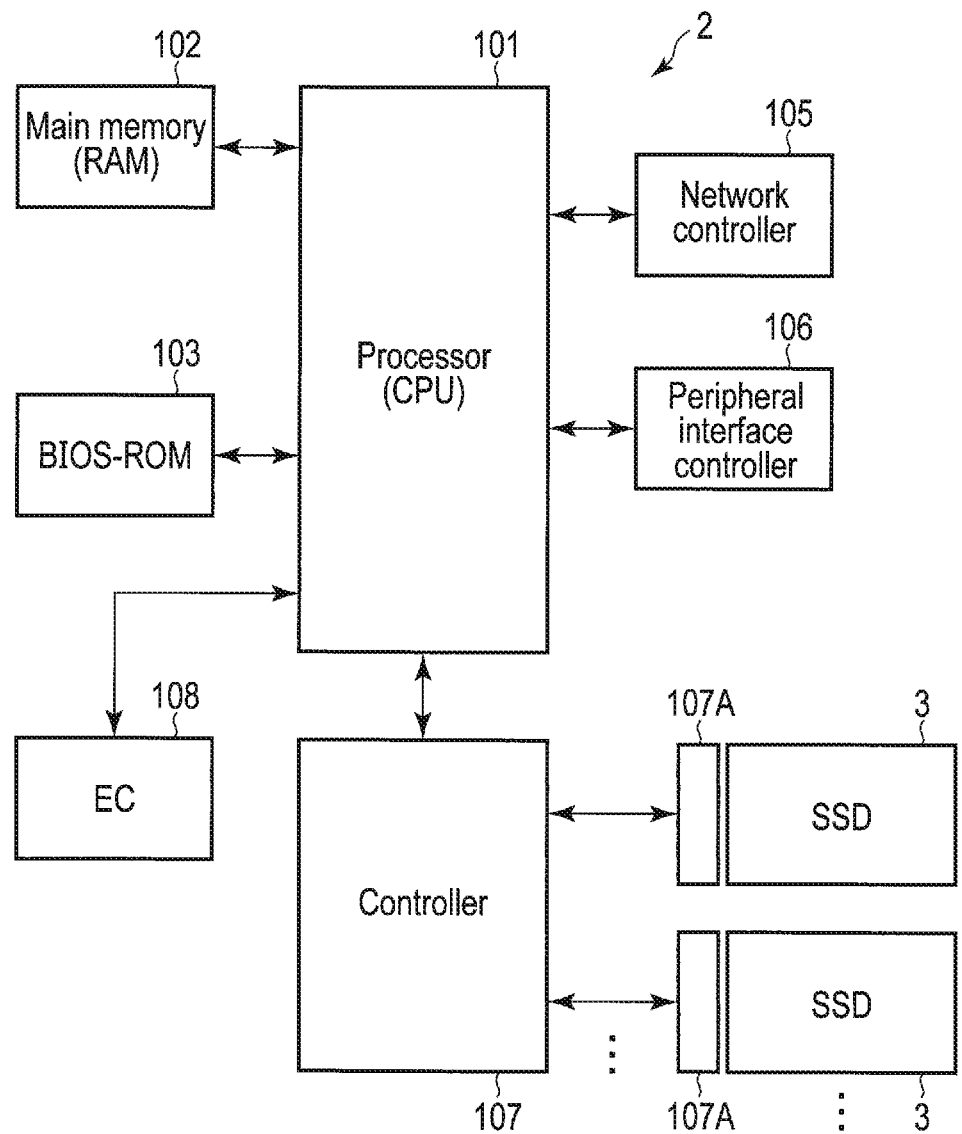
F I G. 42

US 11,132,295 B2

MEMORY SYSTEM AND METHOD FOR CONTROLLING NONVOLATILE MEMORY

CROSS-REFERENCE TO RELATED APPLICATIONS

This application is a continuation of application Ser. No. 15/914,051 filed Mar. 7, 2018 and is based upon and claims the benefit of priority from Japanese Patent Application No. 2017-181686, filed Sep. 21, 2017, the entire contents of which are incorporated herein by reference.

FIELD

Embodiments described herein relate generally to a technique for controlling a nonvolatile memory.

BACKGROUND

In recent years, memory systems comprising a nonvolatile memory are widely used.

As one of such memory systems, a solid state drive (SSD) comprising a NAND flash memory is known. SSD is used as a main storage of various computing devices.

Recently, it is required that a huge amount of data be stored efficiently in a storage.

As technology for improving storage efficiency, de-duplication is known.

But, in the conventional de-duplication technology, a technique of saving a memory source required for storing management data necessary for de-duplication is not taken into consideration.

BRIEF DESCRIPTION OF THE DRAWINGS

FIG. 2 is a block diagram illustrating a configuration example of a nonvolatile memory provided in the memory system of the embodiment.

FIG. 4 is a diagram illustrating a configuration example of a superblock used in the memory system of the embodiment.

FIG. 7 is a block diagram illustrating an address reference structure in the memory system of the embodiment.

FIG. 8 is a block diagram illustrating a configuration example of a superblock management table managed by the memory system of the embodiment.

FIG. 10 is a block diagram illustrating a configuration example of the look-up table (LUT) managed by the memory system of the embodiment.

FIG. 11 is a block diagram illustrating a configuration example of a hash look-up table (HASH LUT) managed by the memory system of the embodiment.

FIG. 13 is a diagram illustrating a data read operation executed by the memory system of the embodiment.

FIG. 15 is a diagram illustrating part of garbage collection operation executed by the memory system of the embodiment.

FIG. 18 is a flowchart illustrating a procedure of the garbage collection operation executed by the memory system of the embodiment.

FIG. 19 is a flowchart illustrating a procedure of the data read operation executed by the memory system of the embodiment.

FIG. 21 is a diagram illustrating an outline of the garbage collection operation which separates data corresponding to a large reference count and data corresponding to a small reference count, executed by the memory system of the embodiment.

FIG. 25 is a diagram illustrating a reference count storage area expansion operation executed by the memory system of the embodiment when the reference count corresponding to a certain data overflows.

FIG. 26 is a diagram illustrating conditions for selecting a block candidate (copy-source block) for garage collection applied to the memory system of the embodiment.

FIG. 29 is a diagram illustrating the relationship between user data and intermediate addresses (iLBA) written to each page in a superblock by the memory system of the embodiment.

FIG. 30 is a diagram illustrating a data write operation executed by the memory system of the embodiment when the reference count corresponding to a certain data overflows.

FIG. 32 is a diagram illustrating remaining part of the de-duplication operation executed by the memory system of the embodiment during the garbage collection.

FIG. 33 is a diagram illustrating a reference count copying operation executed by the memory system of the embodiment in the de-duplication operation during the garbage collection.

FIG. 34 is a diagram illustrating updating operation of the intermediate look-up table (iLUT) executed by the memory system of the embodiment in the de-duplication operation during the garbage collection.

FIG. 35 is a flowchart illustrating a procedure of the GC operation for separating data including large reference counts and data including small reference counts from each other.

FIG. 36 is a flowchart illustrating a procedure of redundant data copying process to be executed when the reference count corresponding to a certain data overflows.

FIG. 37 is a flowchart illustrating a procedure of reference count storage area expanding process to be executed when the reference count corresponding to a certain data overflows.

FIG. 38 is a flowchart illustrating a procedure of data writing process to be executed when the reference count corresponding to a certain data overflows.

FIG. 39 is a diagram illustrating an address reference structure in which an address reference path referring to a physical address directly from a logical address and an address reference path referring to a physical address from a logical address through an intermediate address, mixedly exist.

FIG. 40 is a diagram illustrating an address reference structure referring to a physical address from a logical address through an intermediate address regarding all data.

FIG. 41 is a diagram illustrating a configuration example of the look-up table used in the address reference structure shown in FIG. 40.

FIG. 42 is a block diagram illustrating a configuration example of a host.

DETAILED DESCRIPTION

Figure 1:
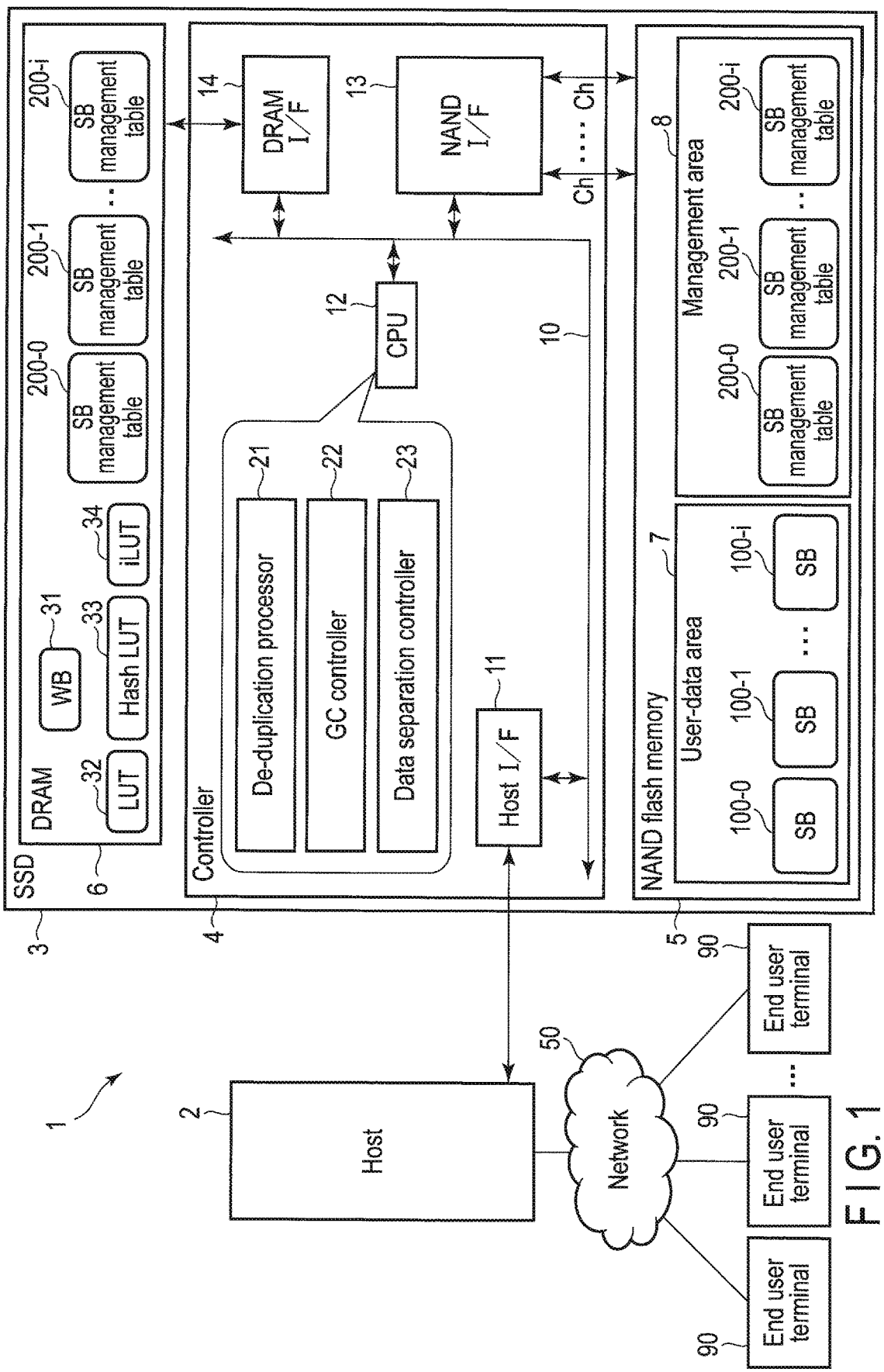
FIG. 1 is a block diagram illustrating a configuration example of a memory system according to an embodiment.

Various embodiments will be described hereinafter with reference to the accompanying drawings.

In general, according to one embodiment, a memory system comprises a nonvolatile memory and a controller electrically connected to the nonvolatile memory, and configured to control the nonvolatile memory. The controller manages a plurality of management tables corresponding to a plurality of first blocks in the nonvolatile memory. Each of the management tables includes a plurality of reference counts corresponding to a plurality of data in a corresponding first block, and each of the reference counts indicates the number of logical addresses referring to corresponding data.

When redundant data which agrees with write data received from a host does not exist in the nonvolatile memory, the controller updates a first translation table managing a corresponding relationship between logical addresses and intermediate addresses to associate non-use first intermediate address with a logical address of the write data, writes the write data to the nonvolatile memory, updates a second translation table managing a corresponding relationship between the intermediate addresses and physical addresses to associate a physical address indicating a location in the nonvolatile memory, in which the write data is written, with the first intermediate address, and sets a reference count corresponding to the write data to 1.

When the redundant data which agrees with the write data already exists in the nonvolatile memory, the controller updates the first translation table without writing the write data to the nonvolatile memory to associate a second intermediate address indicating an entry in the second translation table holding a physical address corresponding to the redundant data with the logical address of the write data, and increments the reference count corresponding to the redundant data by 1.

When the write data is update data of the data already written in the nonvolatile memory, the controller decrements a reference count corresponding to the data already written by 1.

When one of the plurality of first blocks is selected as a copy-source block for garbage collection, the controller copies a set of data included in the copy-source block and corresponding respectively to reference counts belonging to a first reference count range to a first copy-destination block, and copies a set of the data included in the copy-source block and corresponding respectively to reference counts belonging to a second reference count range having a lower limit higher than an upper limit of the first reference count range to a second copy-destination block based on a first management table in the plurality of management tables corresponding to the copy-source block.

First, a structure of an information processing system 1 including a memory system of an embodiment will be explained with reference to FIG. 1.

The memory system is a semiconductor storage device configured to write data to a nonvolatile memory and to read data from the nonvolatile memory. The memory system may be realized as a solid state drive (SSD) 3 including a NAND flash memory.

The information processing system 1 includes a host (host device) 2 and an SSD 3. The host 2 may be an information processing apparatus (computing device) such as a server or a personal computer. When the host 2 is realized as a server, the host (server) 2 may be connected to a plurality of end user (client) terminals 90 via a network 50. The host 2 can provide various kinds of services for the end user terminals 90.

The services to be provided the host (server) 2 may include a service which provides a virtual desktop environment. In this case, the host (server) 2 may function as a virtual desktop infrastructure (VDI) server configured to provide a virtual desktop environment using the virtual desktop infrastructure (VDI). In the host (server) 2 which functions as the VDI server, a plurality of virtual machines which correspond respectively to the end user (client) terminals 90 may be executed. Each of the virtual machines includes OS (virtual desktop OS) and application programs to be executed on OS (virtual desktop OS). The OS/application programs corresponding to the virtual machines may be stored in the SSD 3.

The SSD 3 may be used as a main storage of the information processing apparatus functioning as the host 2. The SSD 3 may be built in the information processing apparatus or may be connected to the information processing apparatus through a cable or a network.

As an interface for interconnecting the host 3 and the SSD 3, SCSI, Serial Attached SCSI (SAS), ATA, Serial ATA (SATA), PCI Express (PCIe) (registered trademark), Ethernet (registered trademark), Fibre channel, NVM Express (NVMe) (registered trademark), etc., may be used.

The SSD 3 may include a controller 4 and a nonvolatile memory (NAND flash memory) 5. The SSD 3 may include a random access memory, for example, a DRAM 6.

The NAND flash memory 5 includes a memory cell array including a plurality of memory cells arranged in a matrix. The NAND flash memory 5 may be a NAND flash memory of two-dimensional structure or a NAND flash memory of three-dimensional structure. The area (storage area) in the NAND flash memory 5 includes a user-data area 7 and a management area 8. The user-data area 7 is an area for storing data (user data) from the host 2. The management area 8 is an area for storing management data for managing the operation of the SSD 3.

As shown in FIG. 2, the memory cell array of the NAND flash memory 5 includes a plurality of physical blocks BLK0 to BLKm-1. The physical blocks BLK0 to BLKm-1 each include a large number of pages (here, pages P0 to Pn-1). The blocks BLK0 to BLKm-1 each function as the addressable smallest unit of erase operation. A physical block may be referred to as an "erase block", "physical erase block" or simply "block". The pages P0 to Pn-1 each include a plurality of memory cells connected to same word line. The pages P0 to Pn-1 are units of data write operation and data read operation.

The physical blocks BLK0 to Bm-1 have a limited number of times of erase count. The erase count may be represented by the number of program/erase cycles. One program/erase cycle of a certain physical block includes the erase operation for setting all the memory cells in this physical block into an erase state and the write operation (program operation) which writes data in each page of this physical block. Since the physical blocks BLK0 to BLKm-1 each have a limited erase count (a limited number of program/erase cycles), it is preferable to equalize the program/erase cycles of the physical blocks BLK0 to BLKm-1 as much as possible.

In this embodiment, the controller 4 shown in FIG. 1 manages a plurality of first blocks each including one or more physical blocks and executes the erase operation in units of first blocks. Therefore, practically, the first block functions as an erase unit. Hereafter, the first block is referred to as a superblock. Note that the superblock may also be referred to as a logical block.

The controller 4 is electrically connected to the NAND flash memory 5, which is a nonvolatile memory, via a NAND interface 13 such as Toggle or Open NAND Flash Interface (ONFI). The controller 4 is a memory controller (control circuit) which controls the NAND flash memory 5. This controller 4 may be realized from one-chip LSI such as a system-on-a-chip (SoC).

Figure 3:
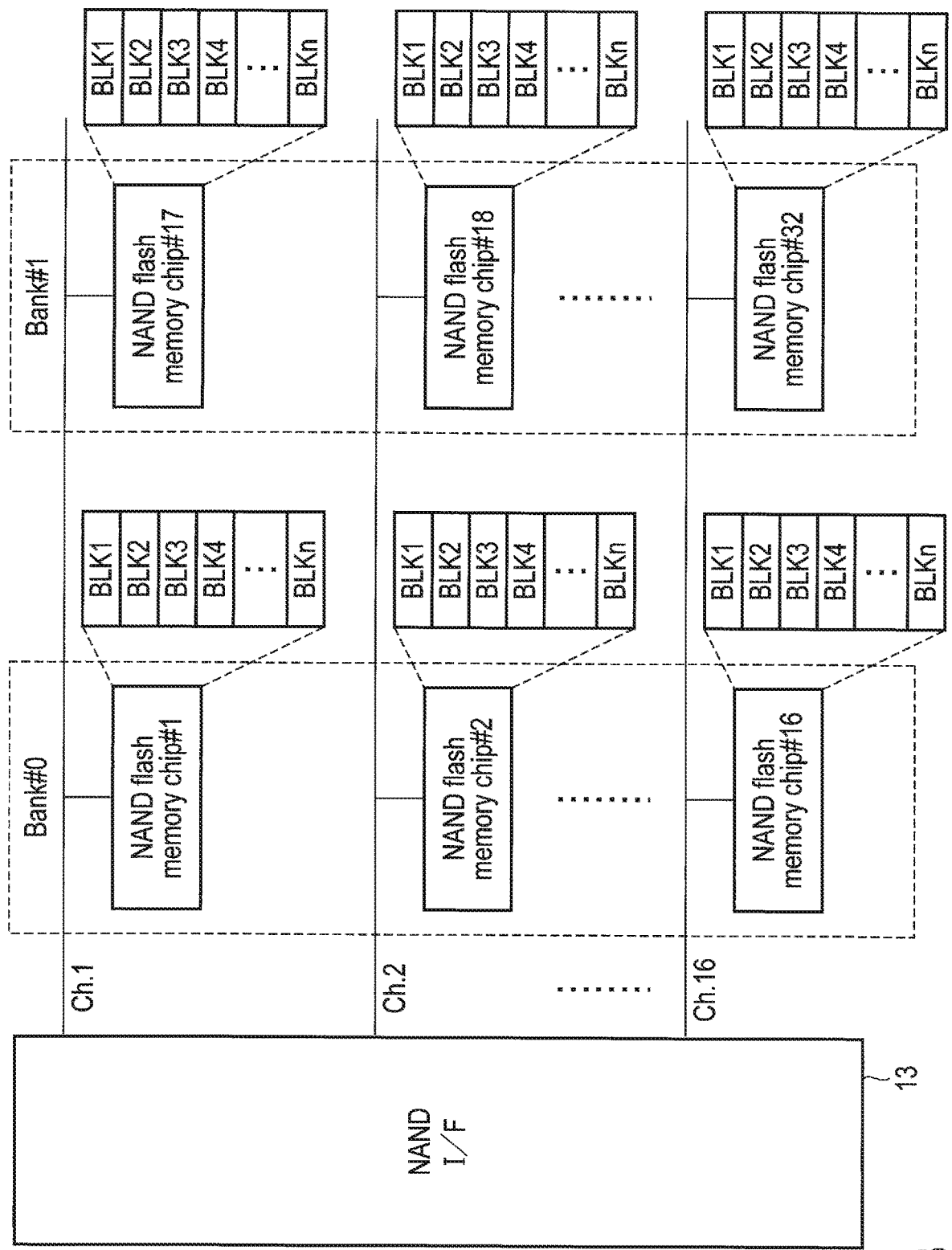
FIG. 3 is a block diagram illustrating the relationship between a plurality of channels and a plurality of NAND flash memory chips used in the memory system of the embodiment.

As shown in FIG. 3, the NAND flash memory 5 includes a plurality of NAND flash memory chips (NAND flash memory dies). The NAND flash memory chips can be operated independently from each other. Therefore, the NAND flash memory chips function as a unit which can be operated in parallel. FIG. 3 illustrates as an example the case where sixteen channels Ch.1 to Ch.16 are connected to the NAND interface 13 and two NAND flash memory chips are connected to each of the sixteen channels Ch.1 to Ch.16. In this case, sixteen NAND flash memory chips #1 to #16 connected to the channels Ch.1 to Ch.16 may be formed as a bank #0, or the rest of sixteen NAND flash memory chips #17 to #32 connected to the channels Ch.1 to Ch.16 may be formed as a bank #1. A bank functions as a unit for operating a plurality of memory modules in parallel by bank interleave. In the configuration example of FIG. 3, a maximum of thirty two NAND flash memory chips can be operated in parallel by sixteen channels and the bank interleave which uses two banks.

Although not limited to this, one superblock may include a total of 32 physical blocks which are selected from NAND flash memory chips #1 to #32, respectively. Note that each of the NAND flash memory chips #1 to #32 may have a multi-plane structure. For example, when each of the NAND flash memory chips #1 to #32 has a multi-plane structure including two plains, one superblock may include a total of 64 physical blocks which are selected from 64 plains corresponding to the NAND flash memory chips #1 to #32.

FIG. 4 illustrate as an example one superblock (SB) including 32 physical blocks, (which are here, a physical block BLK2 in the NAND flash memory chip #1, a physical block BLK3 in the NAND flash memory chip #2, a physical block BLK7 in the NAND flash memory chip #3, a physical block BLK4 in the NAND flash memory chip #4, a physical block BLK6 in the NAND flash memory chip #5, . . . , a physical block BLK3 in the NAND flash memory chip #32).

Note the structure in which one superblock includes only one physical block may be adopted, in which case, one superblock is equivalent to one physical block.

As described above, the controller 4 executes erase operation in the unit of a superblock. Therefore, these thirty two physical blocks included in the same superblock are erased in parallel.

Moreover, in data writing to this superblock, the controller 4 may write data in the order of a page 0 of the physical block BLK2 in the NAND flash memory chip #1, a page 0 of the physical block BLK3 in the NAND flash memory chip #2, a page 0 of the physical block BLK7 in the NAND flash memory chip #3, a page 0 of the physical block BLK4 in the NAND flash memory chip #4, a page 0 of the physical block BLK6 in the NAND flash memory chip #5, . . . , a page 0 of the physical block BLK3 in the NAND flash memory chip #32. Thus, the data can be written to thirty pages in parallel at the maximum. Further, also in data reading from this superblock, the data can be read from thirty two pages in parallel at the maximum.

Next, the structure of the controller 4 shown in FIG. 1 will be described.

The controller 4 is electrically connected to a plurality of NAND flash memory chips via a plurality of channels (for example, sixteen channels). The controller 4 controls the NAND flash memory 5 (the NAND flash memory chips).

The controller 4 may function as a flash translation layer (FTL) configured to execute data management and block management of the NAND flash memory 5. The data management executed by FTL includes (1) management of mapping information indicative of a corresponding relationship between logical addresses and physical addresses of the NAND flash memory 5, and (2) processing for hiding read/write operations performed in units of pages and an erase operations performed in units of blocks (superblocks). The logical address is an address used by a host for addressing the SSD 3. As the logical address, a logical block address (addressing) (LBA) can be used.

In an ordinary SSD, the management of the corresponding relationship (mapping) between the logical addresses and the physical addresses is executed using only the look-up table functioning as a logical-to-physical address translation table. A physical address corresponding to a certain logical address indicates the latest location (latest physical location) in the NAND flash memory to which data of the logical address is written.

In this embodiment, a new address reference path is used to be able to execute an operation for de-duplication in the SSD 3 while maintaining the efficiency of garbage collection.

The new address reference path does not directly refer to a physical address from a logical address, but via through an intermediate address. The corresponding relationship between logical addresses and intermediate addresses is managed by the look-up table (LUT) 32 functioning as a logical-to-intermediate address translation table (first translation table). The corresponding relationship between intermediate addresses and physical addresses is managed by an intermediate look-up table (iLUT) 34 functioning as an intermediate-to-physical address translation table (second translation table).

In this embodiment, when data which agrees with write data (user data) newly received from the host 2, (which will be referred to as "redundant data") is already stored in the NAND flash memory 5, the controller 4 does not write the write data to the NAND flash memory 5. Instead, the controller 4 updates the logical-to-intermediate address translation table (LUT) 32 to associate the intermediate address already associated with the redundant data, i.e., a specific intermediate address indicative of a specific entry in the intermediate-to-physical address translation table (iLUT) 34 holding the physical address corresponding to the redundant data, with the logical address of this write data.

Thus, the same intermediate address can be referred to from two logical addresses including the logical address of the redundant data and the logical address of the write data, and the physical address of the physical location where the redundant data is stored can be referred to from the same intermediate address. As a result, it is possible to refer to the redundant data from both sides of the logical address of the redundant data and the logical address of the write data, thereby improving the storage efficiency.

As can be understood from the above-provided explanation, in this embodiment, two-level address translation is executed using the logical-to-intermediate address translation table (LUT) 32 and the intermediate-to-physical address translation table (iLUT) 34. In the logical-to-intermediate address translation table (LUT) 32, when the write data agrees with a certain already existing data, the same intermediate address as the intermediate address of the already existing data is associated with the logical address of the write data. Thus, in the intermediate-to-physical address translation table (iLUT) 34, each physical address is associated with only one intermediate address regardless of the number of logical addresses referring to the certain data.

Therefore, in the case where data (redundant data) being referred to from a plurality of logical addresses is copied to another superblock by the garbage collection, it suffices only if the controller 4 executes the operation that updates merely one entry in the intermediate-to-physical address translation table (iLUT) 34, which corresponds to the one intermediate address, to the physical address of the copy destination. It is possible assure to be able to refer to the physical address of the copy destination correctly from these logical addresses.

Further, the controller 4 manages a plurality of superblock (SB) management tables 200-0, 200-1, . . . , **200-*i* corresponding to a plurality of superblocks (SB) 100-0, 100-1, . . . , 100-*i* in the user-data area 7**, respectively.

Each of the SB management tables 200-0, 200-1, . . . , **200-*i*** is block management information for managing a plurality of data stored in each respective superblock.

Each of the SB management tables includes a plurality of reference counts corresponding respectively to a plurality of data in each respective superblock. In each of the SB management table, the references counts are arranged in the same order as that of the arrangement of the physical addresses of the corresponding superblock. Each of the reference counts represents the number of the logical addresses referring to the corresponding data, that is, the corresponding location (physical location) in the superblock.

For example, if a certain data is referred to by only one logical address, that is, if the intermediate address associated with the physical address at a physical location where this data is stored is exclusively used only by one logical address, the reference count corresponding to this data is 1.

If a certain data is referred to by two logical addresses, that is, if the intermediate address associated with the physical address at a physical location where this data is stored is shared by two logical addresses, the reference count corresponding to this data is 2.

If a certain data is referred to by three logical addresses, that is, if the intermediate address associated with the physical address at a physical location where this data is stored is shared by three logical addresses, the reference count corresponding to this data is 3.

The controller 4 manages a plurality of reference counts corresponding to a plurality of data in each superblock using the respective one of the SB management tables 200-0, 200-1, . . . , **200-*i*. The SB management tables 200-0, 200-1, . . . , 200-*i* may be loaded to the DRAM 6 from the management area 8 in the NAND flash memory 5 when the SSD 3** is powered on.

The management area 8 in the NAND flash memory 5 also stores other various management information, for example, the logical-to-intermediate address translation table (LUT) 32, a hash LUT 33 and the intermediate-to-physical address translation table (iLUT) 34. The logical-to-intermediate address translation table (LUT) 32, the hash LUT 33 and the intermediate-to-physical address translation table (iLUT) 34 may also be loaded to the DRAM 6 from the management area 8 in the NAND flash memory 5 when the SSD 3 is powered on.

Usually, in the NAND flash memory 5, the data writing to a page can be performed only once per one erase cycle.

For this reason, the controller 4 writes the updating data corresponding to a certain logical address in some other location in the NAND flash memory 5 instead of the location (physical location) in the NAND flash memory 5, where previous data corresponding to this logical address is stored. Then, the controller 4 updates the intermediate-to-physical address translation table (iLUT) 34 and associates the physical address of this other physical location with the intermediate address corresponding to this logical address.

The block management includes management of bad blocks, wear leveling, garbage collection and the like. The wear leveling is an operation for leveling wear in the physical blocks. The garbage collection is an operation for copying the valid data in several copy-source blocks (copy-source superblocks), in which valid data and invalid data mixedly exist, to a copy-destination block (copy-destination superblock) in order to increase the number of data-writable free blocks (free superblocks). Here, the valid data means data linked to a logical address as the latest data and may subsequently be read by the host 2. The invalid data means data which no longer has a possibility of being read by the host 2.

In this embodiment, the reference counts of all the user data included in each of the superblocks (SB) 100-0, 100-1, . . . , 100-*i* are stored in the SB management table corresponding to the respective superblock. In other words, the controller 4 manages a plurality of reference counts corresponding to a plurality of data in each superblock by using the SB management table corresponding to the respective superblock. Thus, the controller 4 can execute data copying operation for garbage collection only based on the group of reference counts in the SB management table corresponding to the copy-source block for the garbage collection. That is, the controller 4 does not copy the data corresponding to a reference count of 0, but copies only the data corresponding to a reference count of non-zero to a copy-destination block from the superblock subjected to the garbage collection (copy-source block of the garbage collection). The superblock subjected to the garbage collection (copy-source block of the garbage collection) is referred to also as a GC-source superblock. Further, a copy-destination block is referred to also as a GC-destination superblock. That is, since the data corresponding to a reference count of 0 is not referred to from any logical address, it is treated as invalid data. The data corresponding to a reference count of non-zero is referred to from one or more logical addresses, it is treated as valid data. The copy-source block in which the data corresponding to a reference count of non-zero has already been moved to a copy-destination block and the data corresponding to a reference count of non-zero no longer exists, is released as a free block (free superblock). Thus, this free superblock can be reused after the erase operation is executed.

In the garbage collection, the controller 4 further copies each of the reference counts of non-zero in the SB management table corresponding to the copy-source block to the SB management table corresponding to the copy-destination block. Thus, after data is copied to a copy-destination block from a copy-source block, the value of the reference count corresponding to each copied data can be managed correctly.

Moreover, the contents of each SB management table are no longer unnecessary when the erase operation of the superblock corresponding to the respective SB management table is executed. Thus, the timing at which the data in a certain superblock become unnecessary and the timing at which the reference counts in the SB management table corresponding to this superblock become unnecessary coincide simultaneously, thereby making it possible to reduce the cost for managing each reference count corresponding to each respective data in each superblock.

The controller 4 may also include the host interface 11, a CPU 12, the NAND interface 13, a DRAM interface 14 and the like. The CPU12, the NAND interface 13 and the DRAM interface 14 may be interconnected to each other via a bus 10.

The host interface 11 receives various commands (for example, a write command, read command, UNMAP/Trim command, and the like) from the host 2.

The CPU 12 is a processor configured to control the host interface 11, the NAND interface 13 and the DRAM interface 14. In response to power-on of the SSD 3, the CPU 12 loads a control program (firmware) stored in the NAND flash memory 5 or a ROM not shown in the figure into the DRAM 6, and executes the firmware to thereby carry out various types of processing. The CPU 12 can execute, in addition to the processing of the FTL described above, for example, command processing for processing various commands from the host 2. The operation of the CPU 12 is controlled by the aforementioned firmware. Note that part or all of each of the FTL processing and command processing may be executed by exclusive hardware in the controller 4.

The CPU 12 can function as a de-duplication processor 21, a garbage collection (GC) controller 22, and a data separation controller 23.

<De-Duplication Processor 21>

The de-duplication processor 21 executes data writing operation for realizing de-duplication in the SSD 3.

When the de-duplication processor 21 receives write data (user data to be written) from the host 2, the de-duplication processor 21 executes the following data writing operation.

(1) When data (that is, redundant data) which agrees with the write data does not exist in the NAND flash memory 5, the de-duplication processor 21 updates the LUT 32, which manages the corresponding relationship between logical addresses and intermediate addresses to associate a non-used first intermediate address with the logical address of the write data. The de-duplication processor 21 writes the write data to one of the superblocks, (which is a write destination superblock). The de-duplication processor 21 updates the iLUT 34 which manages the corresponding relationship between intermediate addresses and physical addresses to associate the physical address indicating the location (physical location) in the NAND flash memory 5, where the write data is written, with the first intermediate address. Then, the de-duplication processor 21 sets the reference count corresponding to this write data as 1.

(2) When redundant data which agrees with the write data already exists in the NAND flash memory 5, the de-duplication processor 21 updates the LUT 32 without writing the write data to one of the superblocks, (which is a write-destination superblock), to associate a second intermediate address indicating an entry in the iLUT 34 holding the physical address corresponding to the redundant data, with the logical address of the write data. Then, the de-duplication processor 21 increments the reference count corresponding to the redundant data by 1.

(3) When the write data is updated data of the data already written in the NAND flash memory 5, the de-duplication processor 21 decrements the reference count corresponding to the data already written by 1.

The de-duplication processor 21 also manages the hash LUT 33. The hash LUT 33 is a translation table managing the corresponding relationship between hash values and intermediate addresses. In the processing of associating intermediate addresses with the logical address of write data, the de-duplication processor 21 may execute the following operations.

(1) The de-duplication processor 21 obtains the hash value of write data.

(2) When intermediate address corresponding to the obtained hash value does not exist in the hash LUT 33, the de-duplication processor 21 determines that redundant data which agrees with the write data does not exist in the NAND flash memory 5. Then, the de-duplication processor 21 assigns non-used intermediate address to the obtained hash value, and stores the corresponding relationship between the obtained hash value and the intermediate address assigned to the obtained hash value in the hash LUT 33. Thus, when redundant data which agrees with write data does not exist in the NAND flash memory 5, the intermediate address assigned to the obtained hash value is associated with the logical address of the write data as the first intermediate address described above.

(3) When intermediate address corresponding to the obtained hash value already exists in the hash LUT 33, the de-duplication processor 21 acquires the physical address associated with the intermediate address corresponding to the obtained hash value by referring the iLUT 34. The de-duplication processor 21 compares the write data with the data stored in the location in the NAND flash memory 5, designated by the acquired physical address. When these data agree with each other, the de-duplication processor 21 determines that redundant data which agrees with the write data which already exists in the NAND flash memory 5. Thus, when redundant data which agrees with the write data already exists in the NAND flash memory 5, the de-duplication processor 21 associates the intermediate address which corresponds to the obtained hash value and already exists in the hash LUT 33 with the logical address of the write data as the second intermediate address described above.

<GC Controller 22>

The GC controller 22 executes the following GC operations based on each of the reference counts in the SB management table corresponding to the copy-source block (copy-source superblock).

(1) When one of a plurality of superblocks 100-1, 100-2, . . . , 100-$i$ is selected as a copy-source block (copy-source superblock) of the garbage collection, the GC controller 22 copies only the data respectively corresponding to a reference counts of non-zero to a copy-destination block (copy-destination superblock) from the copy-source block based on the SB management table corresponding to the copy-source block.

(2) The GC controller 22 updates iLUT 34, and associates physical address each indicating the location in the copy-destination block, where the data corresponding respectively to the reference counts of non-zero are copied, with the intermediate addresses corresponding to the copied data.

(3) The GC controller 22 copies each of the reference counts of non-zero in the SB management table corresponding to the copy-source block to the SB management table corresponding to the copy-destination block.

Thus, in the iLUT 34, the intermediate addresses and the physical addresses are mapped with each other in a one-to-one fashion. Therefore, in the case where the data (redundant data) being referred to from a plurality of logical addresses is copied from a copy-source block to a copy-destination block by the garbage collection (GC), the controller 4 can correctly change the previous physical address (copy-source physical address) of this data into the latest physical address (copy-destination physical address) merely by updating the iLUT 34 only.

Moreover, the controller 4 manages all of reference counts respectively corresponding to a plurality of data stored in a certain superblock using the SB management table corresponding to this superblock. When a certain superblock is selected as a copy-source block subjected to GC, processing of copying only the data corresponding to reference counts of non-zero from the copy-source block to a copy-destination block and processing of copying each of the reference counts of non-zero from the SB management table corresponding to the copy-source block to the SB management table corresponding to the copy-destination block are executed based on the contents of the SB management table corresponding to this superblock. Thus, it is possible to execute the GC operation only based on the contents of the SB management table corresponding to a copy-source block, thereby improving the efficiency of the GC operation while realizing the de-duplication.

<Data Separation Controller 23>

The data separation controller 23 executes the operations of separating data groups including large reference counts and data groups including small reference counts from each other and storing the data groups including large reference counts and the data groups including small reference counts respectively in superblocks different from each other. In other words, the data separation controller 23 executes the following operations to collect the data groups belonging to the same reference count range respectively in the same superblocks.

When one of superblocks 100-0, 100-1, . . . , 100-$i$ is selected as a copy-source block of garbage collection, the data separation controller 23 copies a set of the data respectively corresponding to reference counts included in the copy-source block and belonging to a first reference count range to a first copy-destination block, based on the SB management table corresponding to the copy-source block. Further, the data separation controller 23 copies a set of the data respectively corresponding to the reference count included in the copy-source block and belonging to a second reference count range, which has a lower limit larger than the upper limit of the first reference count range, to a second copy-destination block.

Each of the SB management tables has a reference count storage area which can store a plurality of reference counts each having a certain bit length. As the bit length of each reference count becomes greater, the maximum value of the countable reference count can be increased, but the size of the reference count storage area required to be reserved is increased. If data groups including large reference counts and data groups including small reference counts mixedly exit in one superblock, it is necessary to reserve a reference count storage area such a large size that can store a plurality of reference counts each having a great bit length which can express a large reference count. However, the superblock also includes the data groups including small reference counts. Therefore, a great number of memory resources in the large-size reference count storage area may be wastefully consumed.

In this embodiment, the data groups belonging to the same reference count range are collected in the same superblock. Therefore, it is possible to optimize the size of the reference count storage area which needs to be provided in each SB management table, thereby making it possible to reduce the amount of the memory resource required for the management of each reference count.

Further, the data groups including large reference counts are considered to be those with low probability of being rewritten, that is, the data having long life times. This is because, unless all the data corresponding to each of a great number of logical addresses referring to the data having a large reference count are updated, the reference count corresponding to this data does not become zero. For example, in the case where the SSD 3 is used as a storage of the VDI server described above, if updating of each of a plurality of virtual desktop OSs provided for a plurality of end users is executed, a great number of write demands for writing data having the same contents may be transmitted from the host 2 (VDI server) to the SSD 3. As a result, in the NAND flash memory 5, a great number of data each having a large reference count exist. Data groups having these large reference counts are highly possible to be maintained in a valid state until the next time each virtual desktop OS is updated.

On the other hand, the data groups having small reference counts are the data with relatively high probability to be rewritten, that is, the data having short lifetimes.

If the data groups having large reference counts and the data groups having small reference counts are in such environment that they mixedly exit in the same superblock, the write amplification may increase.

This is because in a superblock in which data groups including large reference counts and data groups including small reference counts mixedly exist, the data groups including small reference counts are invalidated at early timing, whereas the remaining data groups (those including large reference counts) in this superblock may be maintained in a valid state for a long time.

The write amplification (WA) is defined as follows.

$$WA = \text{"a total amount of the data written in SSD"} / \text{"a total amount of data written from host to SSD"}$$

The "total amount of data written in SSD" is equivalent to a sum of the total amount of the data written from the host to the SSD and a total amount of data internally written to the SSD by garbage collection and the like.

An increase in write amplification (WA) causes the increase in the number of times of rewriting (the number of times of programming/erasing) each of the superblocks/physical blocks in the SSD 3. That is, as the write amplification (WA) is larger, it is more easily and sooner that the number of times of programming/erasing of physical blocks reaches its upper limit of the number of times of programming/erasing. As a result, the durability (endurance) and life of the SSD 3 may be degraded.

In this embodiment, the data groups belonging to the same reference count range are collected in the same superblock, and therefore the life times of the data included in the same superblock can be made approximately even. The data groups having approximately even lifetimes mean that they are data groups with a high probability of being invalidated approximately at the same timing by deletion or updating. Superblocks in which all the data have been invalidated are not subjected to GC but made into free blocks. Thus, when the reference counts of the data included in the same superblock are made approximately even, the frequency of execution of GC can be reduced, thereby making it possible to lower the write amplification.

Further, the data separation controller 23 executes processing of changing the conditions for selecting a GC-source superblock (that is, a candidate for a copy-source block) between a superblock group in which the data groups having large reference counts are collected and a superblock group in which the data groups having small reference counts are collected. That is, as the reference count corresponding to data is larger, the probability that the data is rewritten is lower, and therefore the data separation controller 23 selects with higher priority the superblock group in which the data groups having large reference counts are collected as a candidate GC than the superblock group in which the data groups having small reference counts are collected.

More specifically, the data separation controller 23 executes the following operations.

(1) The data separation controller 23 classifies superblocks 100-1, 100-2, . . . , 100-$i$ into the first block group in which a set of the data belonging to the first reference count range are collected and the second block group in which a set of the data belonging to the second reference count range are collected.

(2) As to the first block group, the data separation controller 23 selects the blocks (superblocks) which satisfy the condition that the amount of invalid data is greater than a first threshold as a candidate for a copy-source block for garbage collection.

(3) As to the second block group, the data separation controller 23 selects the blocks (superblocks) which satisfy the condition that the amount of invalid data is less than the first threshold but greater than a second threshold as a candidate for the copy-source block for garbage collection.

In the second block in which a set of data belonging to the second reference count range are collected, that is, the superblock in which the data groups including large reference counts are collected, the invalid data storage area where invalid data are stored are not used to store new data for a long time. This invalid data storage area wastefully consumes the over-provisioning capacity of the SSD 3. In this embodiment, the superblock group in which the data groups including large reference counts are collected can be selected as a candidate GC with higher priority than the superblock group in which the data groups having small reference counts are collected. Therefore, the invalid data storage area in the superblock group in which the data groups including large reference counts are collected can be easily utilized as a memory resource for storing new data. Thus, the substantial over-provisioning capacity of the SSD 3 can be increased, thereby making it possible to lower the write amplification.

The DRAM interface 14 shown in FIG. 1 is a DRAM controller configured to access-control the DRAM 6. A part of the storage area of the DRAM 6 is utilized to store therein a write buffer (WB) 31. Another part of the storage area of the DRAM 6 is utilized to store the LUT 32, hash LUT 33, and iLUT 34 as look-up table caches. The LUT 32, hash LUT 33, and iLUT 34 may be partially stored in a look-up table cache, or each of the LUT 32, hash LUT 33, and iLUT 34 may be entirely stored in a look-up table cache. A still another part of the storage area of the DRAM 6 is utilized for storing SB management tables 200-0, 200-1, . . . , 200-$i$.

Figure 5:
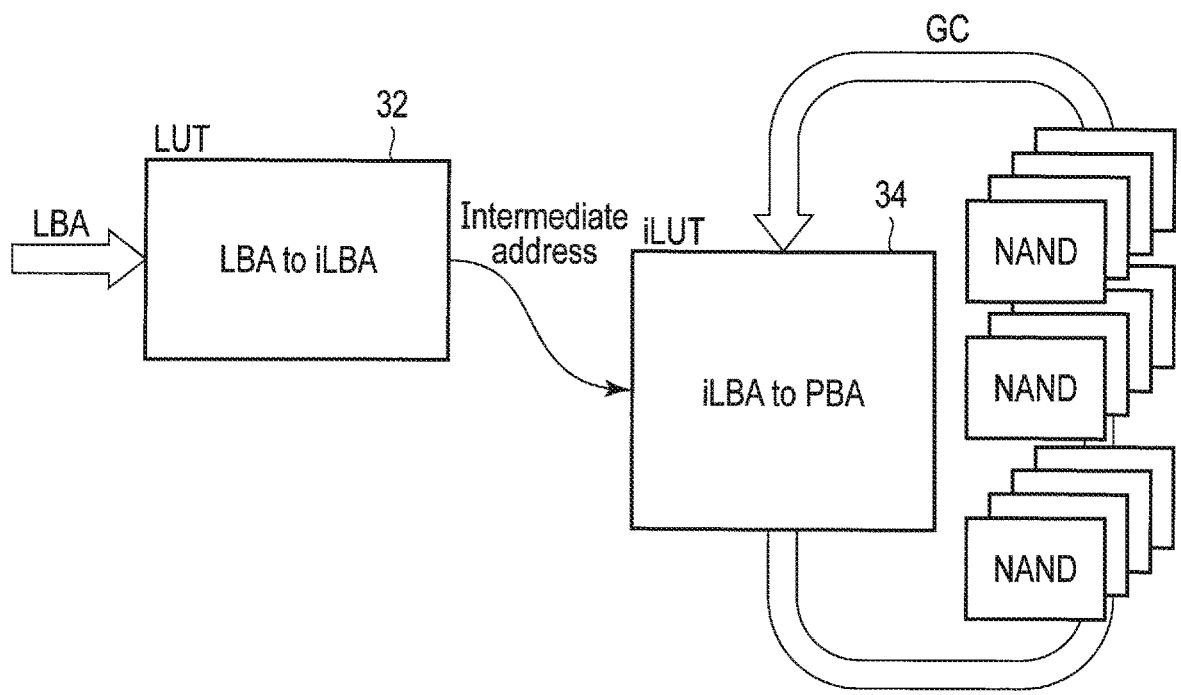
FIG. 5 is a block diagram illustrating a relationship between a look-up table and an intermediate look-up table, managed by the memory system of the embodiment.

FIG. 5 illustrates the relationship between the LUT 32 and the iLUT 34.

As described above, the LUT 32 functions as a logical-to-intermediate address translation table, and manages the corresponding relationship between each logical address LBA and each intermediate address. The intermediate addresses will be each referred to as iLBA hereinafter.

Further, as described above, the iLUT 34 is an intermediate look-up table which functions as an intermediate-to-physical address translation table, and manages the corresponding relationship between each iLBA and each physical address of the NAND flash memory 5. The physical addresses will be each referred to as PBA hereinafter.

When a certain data already existing in the NAND flash memory 5 is referred to from a plurality of LBAs, these LBAs are associated with the same iLBA in the LUT 32. In the iLUT 34, this iLBA is associated with the PBA which indicates the location in the NAND flash memory 5, where this data is stored. Therefore, from these LBAs, the same iLBA can be referred to, and from this same iLBA, the PBA which indicates the location in the NAND flash memory 5, where this data is stored can be referred to.

In the iLUT 34, the iLBAs and the PBAs are mapped with each other in a 1-to-1 fashion. Therefore, in the case where the data (redundant data) being referred to from a plurality of logical addresses is copied from a copy-source block to a copy-destination block by the garbage collection (GC), the controller 4 can correctly change the previous PBA of this data into the latest PBA merely updating the iLUT 34 only.

It is also possible to use such an address translation structure that the same PBA is directly referred to by a plurality of LBAs. Here, however, in the LUT 32, if a certain data is referred to from 1000 LBAs, it is necessary to store the same PBA in each of 1,000 entries corresponding to the 1,000 LBAs, respectively. Therefore, in the case where the data (redundant data) being referred to by 1,000 LBAs is copied from a copy-source block to a copy-destination block by the garbage collection (GC), the controller 4 is required to update the PBA in each of the 1,000 entries.

In this embodiment, even if a certain data is referred to by 1,000 LBAs, these LBAs refers to one iLBA, and the PBAs of the data are associated with only this iLBA. Therefore, it suffices if the controller 4 updates only the PBA of one entry in the iLUT 34, in which this PBA is stored.

Figure 6:
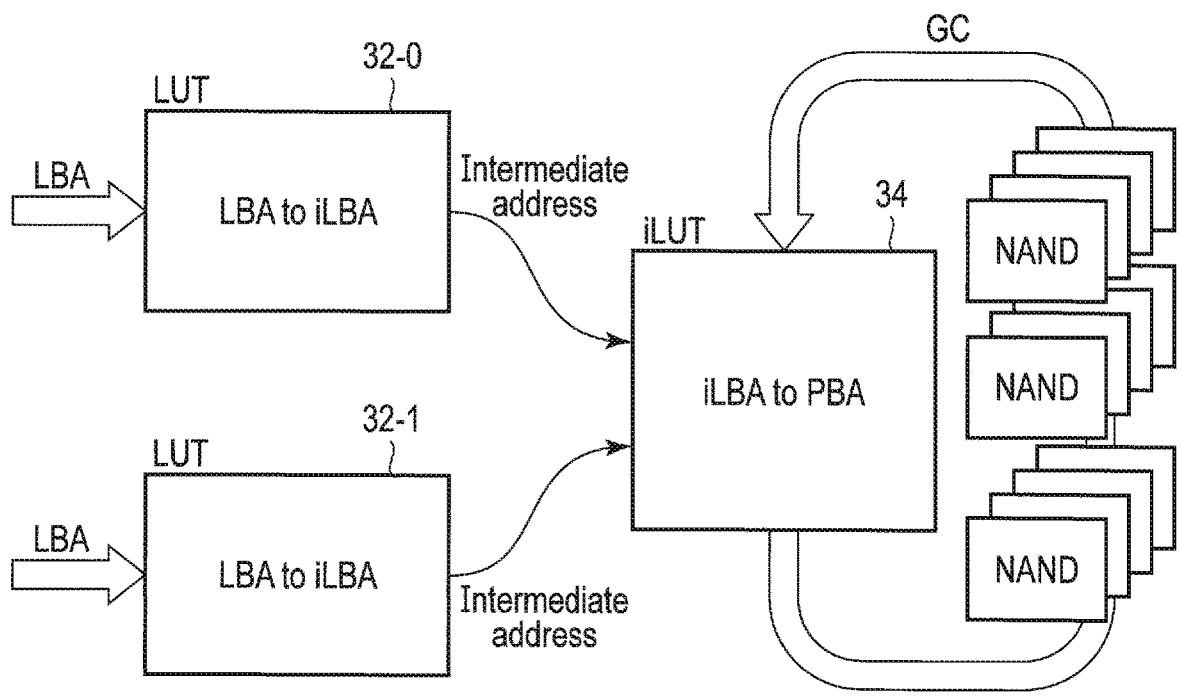
FIG. 6 is a block diagram illustrating a relationship between two look-up tables and an intermediate look-up table, managed by the memory system of the embodiment.

As shown in FIG. 6, the iLUT 34 may be referred to from a plurality of LUTs 32. FIG. 6 illustrate the case where the iLUT 34 is referred to from two LUTs, namely, LUT 32-0 and LUT 32-1. The LUT 32-0 may be LUT which manages the corresponding relationship between each LBA and each respective iLBA, which correspond to a certain name space, and the LUT 32-1 may be LUT which manages the corresponding relationship between each LBA and each respective iLBA, which corresponds to another name space. To each name space, an LBA range which starts from LBA0 is assigned. Write/read commands from the host 2 may include an identifier (name space ID) which designates a specific name space. The host 2 may transmit, in reply to an I/O request from a certain end user, the write/read command including a name space ID which designates a specific name space assigned to the end user, to the SSD 3. Further, the host 2 may transmit, in reply to an I/O request from another end user, the write/read command including a name space ID which designates another specific name space assigned to this end user, to the SSD 3.

FIG. 7 shows a configuration of address reference.

The controller 4 of the SSD 3 receives write data and an LBA corresponding to the write data from the host 2. The size of the write data corresponding to one LBA may be, for example, 4 Kbytes (4 KB).

The controller 4 obtains the hash value of the write data received from the host 2. The algorithm for hash calculation is not limited, but any algorithm can be used. It suffices only if the bit width of the hash value obtained by hash calculation is less in bit width than the size of the write data, for example, 4 KB (=32768 bits). The bit width of the hash value obtained by hash calculation may as well be 256 bits. The controller 4 assigns a certain iLBA to the obtained hash value, and stores the hash value obtained and the iLBA assigned to the obtained hash value in the hash LUT 33.

The iLBA may be assigned to the obtained hash value in the following manner.

That is, if an iLBA corresponding to the obtained hash value does not exist in the hash LUT 33, the controller 4 determines that data (redundant data) which agrees with the write data does not exist in the NAND flash memory 5 and assigns an arbitrary iLBA to this hash value. Then, the controller 4 stores the obtained hash value and the iLBA assigned to this hash value in hash LUT 33. The iLBA thus assigned is notified to the LUT 32. In the LUT 32, this notified iLBA is associated with an LBA corresponding to the write data received from the host 2. The controller 4 writes the write data to one of the superblocks (write-destination superblocks) 100-0, 100-1, 100-2, . . . . Then, the controller 4 updates the iLUT 34 and associates the physical address (PBA) which indicates the location (physical location) in the NAND flash memory 5, where the write data is written, with the iLBA thus assigned. The controller 4 updates the SB management table corresponding to the write-destination superblock, and sets the reference count corresponding to this write data as 1.

If an iLBA corresponding to the obtained hash value already exists in the hash LUT 33, the controller 4 determines that data (redundant data) which agrees with this write data may already exist in the NAND flash memory 5.

In this case, the controller 4, first, acquires an iLBA corresponding to the obtained hash value from the hash LUT 33. The controller 4 acquires a PBA corresponding to this iLBA from the iLUT 34, and reads the data stored in the location in the NAND flash memory 5, which is designated by the PBA acquired. Then, the controller 4 compares the write data with the read data. If the write data and the read data agree with each other, the controller 4 determines that data (redundant data) which agrees the write data already exists in the NAND flash memory 5. In this case, the write data is not written in any of the superblocks (write-destination superblocks) 100-0, 100-1, 100-2, . . . . The controller 4 notifies, to the LUT 32, the iLBA corresponding to the obtained hash value, that is, the iLBA referring to the entry in the iLUT 34 holding the PBA which indicates the location in the NAND flash memory 5, where the redundant data is stored. In the LUT 32, the iLBA thus notified is associated with the LBA corresponding to the write data received from the host 2. Then, the controller 4 updates the SB management table corresponding to the superblock in which the redundant data is stored, and increment the reference count corresponding to this redundant data by 1.

FIG. 8 shows a configuration example of the superblock management table.

For simplification, FIG. 8 illustrates the case where superblock (SB) 100-0 includes Page0 to Pagek each capable of storing four 4-KB data. Further, a physical address (PBA) is allocated to the physical location where each 4-KB data is stored.

In Page0, DataA is stored in the physical location corresponding to PBA0, DataB in the physical location corresponding to PBA1, DataC in the physical location corresponding to PBA2, and DataD in the physical location corresponding to PBA3.

Further in Page1, DataE is stored in the physical location corresponding to PBA4, DataF in the physical location corresponding to PBA5, DataG in the physical location corresponding to PBA6, and DataH in the physical location corresponding to PBA7.

Similarly, in Pagek, DataW is stored in the physical location corresponding to PBAn-3, DataX in the physical location corresponding to PBAn-2, DataY in the physical location corresponding to PBAn-1, and DataZ in the physical location corresponding to PBAn.

The superblocks (SB) 100-1, 100-2, . . . also have a configuration similar to that of the superblock (SB) 100-0.

The SB management tables 200-0, 200-1, 200-2, . . . are provided to correspond to the superblocks (SB) 100-0, 100-1, 100-2, . . . , respectively. In each SB management table, a plurality of reference counts (Refcount) corresponding respectively to a plurality of data stored in the corresponding superblock (SB) are stored. The references counts (Refcount) are arranged in the order of the arrangement of the physical addresses (PBA) of the corresponding superblock (SB).

For example, in the SB management table 200-0 corresponding to the superblock (SB) 100-0, the reference counts corresponding respectively to the data in the superblock (SB) 100-0 are managed in the following manner.

The SB management table 200-0 manages n+1 reference counts (Refcount) corresponding to PBA0 to PBAn of the superblock (SB) 100-0. These n+1 reference counts (Refcount) are arranged in the order of arrangement of PBA0 to PBAn in the SB management table 200-0.

Refcount "3" stored in a top location in the SB management table 200-0 corresponding to PBA0 is a reference count corresponding to DataA stored in the physical location corresponding to PBA0, and it indicates that the number of the logical addresses (LBA) referring to DataA is 3.

In an ordinary SSD without the structure of de-duplication, three user data corresponding to these three LBA are written to the NAND flash memory. Here, if the user-data size corresponding to one LBA is 4 Kbytes, 12 Kbytes of memory resource is consumed for the writing of three 4-Kbyte data.

In this embodiment, only one of the three user data corresponding to these three LBA is written to the NAND flash memory 5. Therefore, the consumption of memory resource can be reduced to 4 Kbytes. Thus, the SSD 3 can compress the user data to be written to the SSD 3 by the de-duplicating function.

Refcount "4" stored in the second location in the SB management table 200-0 corresponding to PBA1 is a reference count corresponding to DataB stored in the physical location corresponding to PBA1, and it indicates that the number of the logical addresses (LBA) referring to DataB is 4.

Similarly, Refcount "0" stored in the n+1-st location in the SB management table 200-0 corresponding to PBAn is a reference count corresponding to DataZ stored in the physical location corresponding to PBAn, and it indicates that the number of the logical addresses (LBA) which referring to DataZ is zero.

Similarly, in each of the SB management tables 200-1, 200-2, . . . , a plurality of reference counts corresponding respectively to a plurality of data in the respective superblocks (SB) 100-1, 100-2, . . . , are arranged in the order of arrangement of PBAs in the corresponding superblock (SB).

Figure 9:
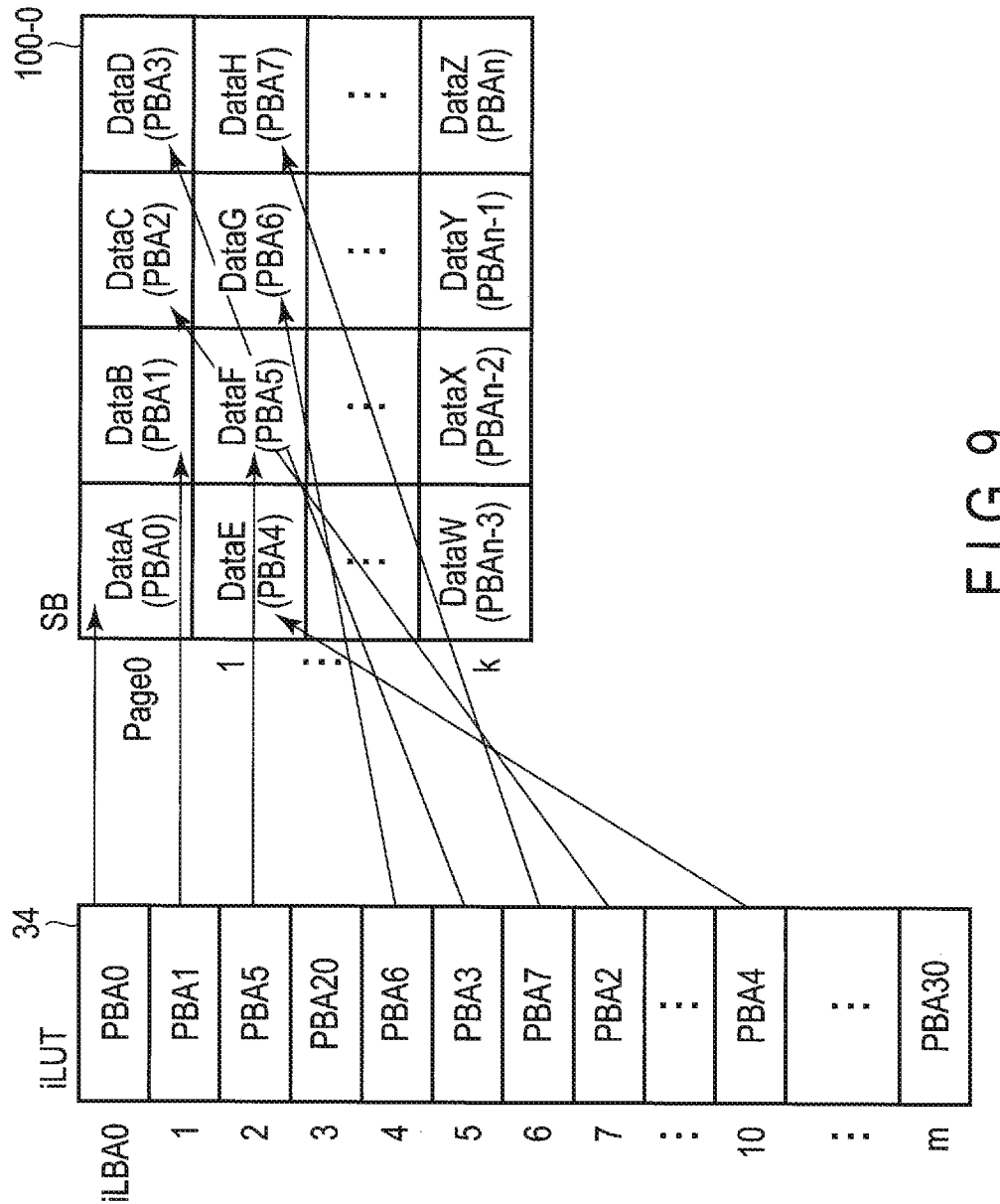
FIG. 9 is a block diagram illustrating a configuration example of the intermediate look-up table (iLUT) managed by the memory system of the embodiment.

FIG. 9 shows a configuration example of the intermediate look-up table (iLUT) 34.

The iLUT 34 manages the corresponding relationship between each intermediate address (iLBA) and each physical address (PBA) of the NAND flash memory 5.

The iLUT 34 may include m+1 entries corresponding to iLBA0 to iLBAm. For example, the entry corresponding to iLBA0 is used to store a PBA (here, PBA0) which indicates the location (physical location) in the NAND flash memory 5, where the data corresponding to one or more LBAs to which iLBA0 is assigned is stored. The entry corresponding to iLBA1 is used to store a PBA (here, PBA1) which indicates the location (physical location) in the NAND flash memory 5, where the data corresponding to one or more LBAs to which iLBA1 is assigned, is stored.

FIG. 10 shows a configuration example of the look-up table (LUT) 32.

The LUT 32 manages the corresponding relationship between each logical address (LBA) and each intermediate address (iLBA).

The LUT 32 may include j+1 entries corresponding to LBA0 to LBAj.

For example, the entry corresponding to LBA0 is used to store an iLBA (here, iLBA0) assigned to LBA0. The entry corresponding to LBA1 is used to store an iLBA (here, iLBA1) assigned to LBA1. The entry corresponding to LBA2 is used to store an iLBA (here, iLBA7) assigned to LBA2. Similarly, the entry corresponding to LBA10 is used to store an iLBA (here, iLBA0) assigned to LBA10, and the entry corresponding to LBAj is used to store an iLBA (here, iLBA0) assigned to LBAj.

FIG. 11 shows a configuration example of the hash look-up table (hash LUT) 33.

The Hash LUT 33 manages the corresponding relationship between each hash value (Hash (Data)) and each intermediate address (iLBA).

The hash look-up table (hash LUT) 33 includes a plurality of entries, and each entry stores a certain hash value (Hash (Data)) and the intermediate address (iLBA) assigned to the hash value (Hash (Data)). Basically, different iLBAs are assigned to different hash values, respectively. The SSD 3 obtains a hash value of write data from the host 2. Here, if the obtained hash value does not exist in the hash LUT 33, the SSD 3 assigns a non-used arbitrary iLBA to the obtained hash value and stores the corresponding relationship between the obtained hash value and the assigned iLBA in the hash LUT 33.

FIG. 11 illustrates as an example the case where iLBA0 is assigned to the hash value (Hash (DataA)) of DataA, iLBA1 to the hash value (Hash (DataB)) of DataB, iLBA7 to the hash value (Hash (DataC)) of DataC, iLBA5 to the hash value (Hash (DataD)) of DataD, iLBA10 to the hash value (Hash (DataE)) of DataE, iLBA2 to the hash value (Hash (DataF)) of DataF, iLBA4 to the hash value (Hash (DataG)) of DataG, and iLBA6 to the hash value (Hash (DataH)) of DataH.

Next, the address translation executed in this embodiment will be described with reference to FIG. 12.

Let us assume here the case where the SSD 3 receives, from the host 2, five new write data each having a size of 4 KB, namely, DataA, DataB, DataC, DataD and DataE. Further note that DataA, DataB, DataC and DataD are different from each other in contents, that is, they contain bit strings different from each other, but DataE agrees with DataA.

The hash values of DataA, DataB, DataC and DataD (Hash(DataA), Hash(DataB), Hash(DataC) and Hash (DataD)) are calculated, and each of non-used intermediate addresses (iLBA) is assigned to each of these hash values.

Figure 12:
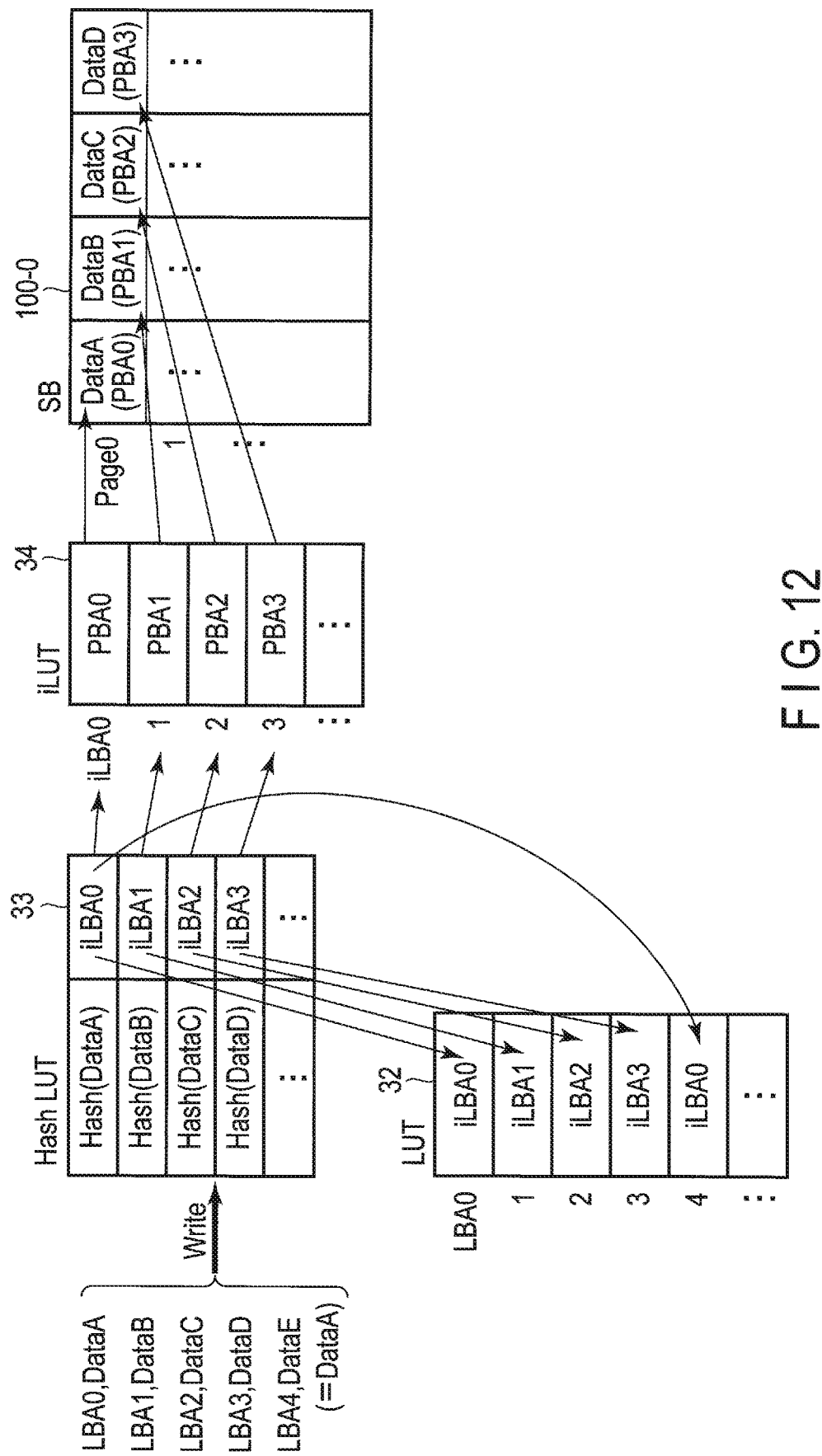
FIG. 12 is a block diagram illustrating an address translation operation performed by the memory system of the embodiment.

FIG. 12 illustrates as an example the case where iLBA0 is assigned to Hash(DataA), iLBA1 is assigned to Hash (DataB), iLBA2 is assigned to Hash(DataC) and iLBA3 is assigned to Hash(DataD). The hash LUT 33 stores the corresponding relationship between four hash values and four iLBAs, that is, a pair of Hash(DataA) and iLBA0, a pair of Hash(DataB) and iLBA1, a pair of Hash(DataC) and iLBA2, and a pair of Hash(DataD) and iLBA3. Further, the LUT 32 is updated and thus iLBA0 is associated with LBA0 corresponding to DataA, iLBA1 is associated with LBA1 corresponding to DataB, iLBA2 is associated with LBA2 corresponding to DataC, and iLBA3 is associated with LBA3 corresponding to DataD.

DataA, DataB, DataC and DataD are written to one of the superblocks (the superblock (SB) 100-0 in FIG. 12). This superblock (SB) 100-0 is a superblock allocated as a current write-destination block (a current write-destination superblock). Then, the iLUT 34 is updated, and thus PBA0 indicating the physical location in the write-destination superblock (SB) 100-0, where DataA is written, is associated with iLBA0, PBA1 indicating the physical location in the write-destination superblock (SB) 100-0, where DataB is written, is associated with iLBA1, PBA2 indicating the physical location in write-destination superblock (SB) 100-0, where DataC is written, is associated with iLBA2, and PBA3 indicating the physical location in the write-destination superblock (SB) 100-0, where DataD is written, is associated with iLBA3. Note that the updating of the iLUT 34 may be executed before the writing of DataA, DataB, DataC and DataD to the superblock (SB) 100-0.

The hash value (Hash(DataE)) of DataE agrees with hash value (Hash(DataA)) of DataA. Therefore, iLBA (here, iLBA0) corresponding to Hash(DataE) (=Hash(DataA)) already exists in the hash LUT 33. In this case, the data stored in the physical location designated by PBA0 corresponding to iLBA0, (which is, here, DataA) and DataE are compared with each other, to determine whether or not DataE agrees with DataA.

If DataE agrees with DataA, DataE is not written to the superblock (SB) 100-0 (de-duplication). Then, the LUT 32 is updated and iLBA (here, iLBA0) which corresponds to Hash (DataE) and already exists in the hash LUT 33 is associated with LBA4 corresponding to DataE.

Next, the data read operation executed in this embodiment will be described with reference to FIG. 13.

When the controller 4 of the SSD 3 receives a read command including LBA4 from the host 2, the controller 4 refers to the LUT 32. Since the intermediate address corresponding to LBA4 is iLBA0, the controller 4 refers to the iLUT 34 based on iLBA0. The physical address corresponding to iLBA0 is PBA0. Therefore, the controller 4 reads DataA from the physical location in the SB 100-0, specified by PBA0, and returns DataA to the host 2.

Figure 14:
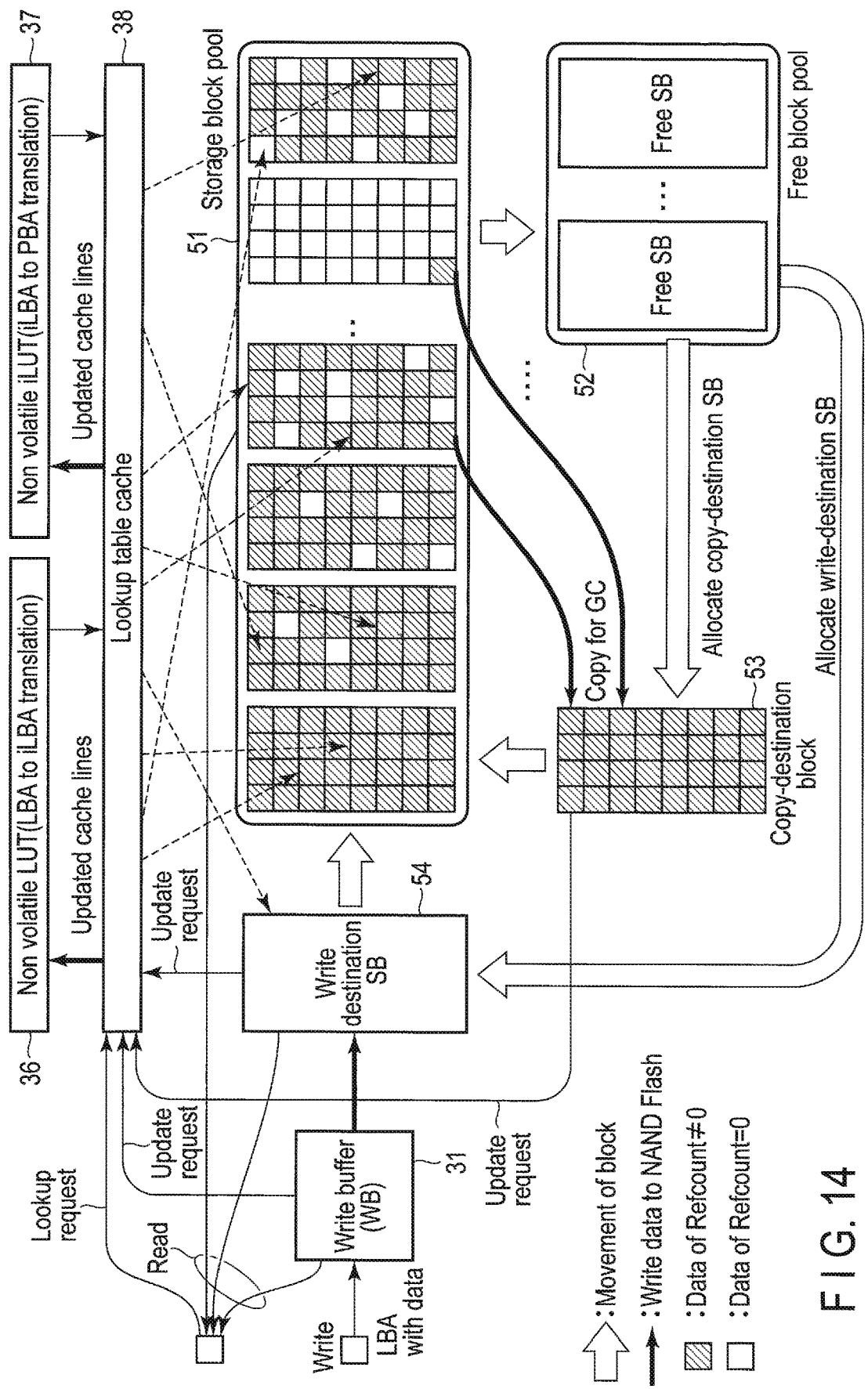
FIG. 14 is a block diagram illustrating a structure for user-data management executed by the memory system of the embodiment.

FIG. 14 shows the structure for the user-data management.

As shown in FIG. 14, the look-up table cache 38 is used to hold a part of each of the entire LUT 32 and the entire iLUT 34 stored in the management area 8 of the NAND flash memory 5, on the DRAM 6. Further, as shown in FIG. 14, a nonvolatile LUT 36 illustrates the contents of the entire LUT 32 stored in the management area 8 of the NAND flash memory 5, and a nonvolatile iLUT 37 illustrates the contents of the entire iLUT 33 stored in the management area 8 of the NAND flash memory 5.

When the target address translation data (LBA-to-iLBA translation data or iLBA-to-PBA translation data) does not exist in the look-up table cache 38 (cache miss), the target address translation data is read from the NAND flash memory 5 (the nonvolatile LUT 36 or nonvolatile iLUT 37), and the contents of a certain cache line to be replaced in the look-up table cache 38 are replaced by the address translation data thus read. When the address translation data currently held in this cache line to be replaced is already updated, the contents of the address translation data currently held in this cache line to be replaced is written back to the NAND flash memory 5 (nonvolatile LUT 36 or nonvolatile iLUT 37) (Updated cache lines).

The states of each superblock (SB) in the user-data area 7 is classified mainly into an active block (active superblock) currently storing valid data and a free block (free superblock) currently not storing valid data. In this embodiment, data corresponding to reference counts of non-zero are treated as valid data, whereas data corresponding to a reference count of zero are treated as invalid data.

Each of the superblocks (SB) which are active blocks is managed by a list called a storage block pool (active block pool) 51. On the other hand, each of the superblocks (SB) which are free blocks is managed by a list called a free block pool 52.

In this embodiment, the controller 4 allocates one superblock (free superblock) selected from the free block pool 52 as a write-destination block (write-destination superblock) to which write data received from the host 2 is to be written. Here, the controller 4, first, executes the erase operation to each physical block in the selected superblock (free superblock), and thus sets each physical block in this superblock into an erase state, which is writable. When the current write-destination superblock is entirely filled with the write data from the host 2, the controller 4 moves the current write-destination superblock 54 to the storage block pool 51 and allocates one new superblock (free superblock) as a new write-destination superblock from the free block pool 52.

When the reference counts of all the data in a certain superblock in the storage block pool 51 becomes zero by updating of data, unmapping, garbage collection (GC) and the like, the controller 4 moves this superblock to the free block pool 52.

In the GC operation, the controller 4 allocates one superblock (free superblock) selected from the free block pool 52 as a copy-destination block (copy-destination superblock) 53 for the GC. Here, the controller 4, first, executes the erase operation to each physical block in the selected superblock (free superblock) and sets each physical block in this superblock into the erase state, which is writable. The controller 4 selects one or more superblocks in the storage block pool 51 as copy-source blocks (copy-source superblocks). When the current copy-destination block 53 is entirely filled with the data copied from the copy-source blocks (copy-source superblocks), the controller 4 moves the current copy-destination block 53 to the storage block pool 51. Further, the controller 4 moves the copy-source blocks which no longer include the data corresponding to reference counts of non-zero stopped by the GC to the free block pool 52.

The write operation, read operation and GC operation will now be described.

<Write Operation>

When a write command including write data and LBA from the host 2 is received by the SSD 3, the write data is temporarily stored in a write buffer (WB) 31.

If redundant data which agrees with the write data does not exist in the NAND flash memory 5, a non-use iLBA is assigned to LBA of the write data. Then, the controller 4 updates the LUT 32 and associates the assigned iLBA with the LBA of the write data. Here, the controller 4 may send out a look-up table cache update request for associating the assigned iLBA with the LBA of the write data to the look-up table cache 38. Thus, the look-up table cache 38 (LUT 32) is updated, and the assigned iLBA is associated with the LBA of the write data. Then, this write data is written to the write-destination superblock (SB) 54. When write data is written to the write-destination superblock (SB) 54, the controller 4 updates the iLUT 34 and associates PBA indicating the physical location where the write data is written with the assigned iLBA described above. Here, the controller 4 may send out the look-up table cache update request for associating PBA indicating the physical location where write data is written with the assigned iLBA to the look-up table cache 38. Thus, the look-up table cache 38 (iLUT 34) is updated, and this PBA is associated with the assigned iLBA.

If redundant data which agrees with the write data already exists in the NAND flash memory 5, the iLBA assigned to the redundant data is assigned to LBA of the write data. Then, the controller 4 updates LUT 32 and associates the iLBA assigned to the redundant data with the LBA of the write data. Here, the controller 4 may send out the look-up table cache update request for associating the iLBA assigned to the redundant data with the LBA of the write data to the look-up table cache 38. Thus, the look-up table cache 38 (LUT 32) is updated, and the assigned iLBA is associated with the LBA of the write data. Since this write data agrees with the redundant data, the controller 4 does not execute the write operation of writing this write data to the write-destination superblock (SB) 54. Thus, the de-duplication is executed.

<Read Operation>

If a read command including LBA from the host 2 is received, the controller 4 acquires iLBA corresponding to the LBA designated by this read command with reference to the look-up table cache 38 (LUT 32). Here, the controller 4 may send out a look-up table cache (LUT) lookup request for acquiring iLBA corresponding to designated LBA to the look-up table cache 38.

Subsequently, the controller 4 acquires PBA with reference to the look-up table cache 38 (iLUT 34) based on the acquired iLBA. Here, the controller 4 may send out the look-up table cache (iLUT) lookup request for acquiring the PBA corresponding to the acquired iLBA to the look-up table cache 38.

Then, the controller 4 reads data from the physical location designated by the acquired PBA and returns the read data to the host 2. Here, in some cases, the PBA corresponding to LBA included in the read command corresponds to one of active blocks in the storage block pool (active block pool) 51 or the physical location in the write-destination superblock, or to the physical location in the write buffer 31.

<GC Operation>

The controller 4 allocates one superblock (free superblock) selected from the free block pool 52 as a copy-destination block (copy-destination superblock) 53.

Further, the controller 4 selects one active block (active superblock) which is determined to require GC operation, from the active blocks (active superblocks) in the storage block pool (active block pool) 51 as a superblock (copy-source superblock) to be subjected to GC. Here, when the amount of invalid data stored in the active block (active superblock) exceeds a threshold, the active block (active superblock) may be determined to require the GC operation.

The controller 4 copies only the data respectively corresponding to reference counts of non-zero, from the copy-source block to the copy-destination block 53 based on the SB management table corresponding to the copy-source block. Then, the controller 4 updates the iLUT 34 and associates PBA indicating each of the physical locations in the copy-destination block 53, to which the data are copied, with the iLBAs respectively corresponding to the data thus copied. Here, the controller 4 may send out the look-up table cache update request for associating the PBAs which indicate the physical locations where the write data are written with the assigned iLBAs, to the look-up table cache 38. Thus, the look-up table cache 38 (iLUT 34) is updated, and the PBAs are associated with the iLBAs corresponding to the copied data described above.

If the copy-destination block 53 is filled with the data of reference counts of non-zero, the copy-destination block 53 is moved to the storage block pool (active block pool) 51 and managed as an active block (active superblock).

The garbage collection executed in this embodiment will be described with reference to FIGS. 15 and 16. Here, for simplification of illustration, such a case is assumed that each of superblocks (SB) 100-0, 100-1, and 100-2 includes Page0 to Page3 and four 4-KB data are stored in each Page.

FIG. 15 illustrates the case where data included in the superblock (SB) 100-0 and corresponding respectively to reference counts of non-zero are copied to superblock (SB) 100-2 by garbage collection.

In the superblock (SB) 100-0, DataA0 to DataP0 are stored respectively in the physical locations designated respectively by PBA0 to PBA15, and, of these, DataA0, DataB0, DataG0, DataH0, DataI0, DataK0, DataN0 and DataP0 are the data corresponding to reference counts (Refcount) of non-zero. On the other hand, DataC0, DataD0, DataE0, DataF0, DataJ0, DataL0, DataM0 and DataO0 are data corresponding to a reference count (Refcount) of zero. The reference counts (Refcount) of these data stored in the superblock (SB) 100-0 are arranged in the SB management table 200-0 in the order of arrangement of PBA0 to PBA15.

FIG. 15 illustrates the reference count (Refcount) of DataA0 stored in the physical location designated by PBA0 is "1", the reference count (Refcount) of DataB0 stored in the physical location designated by PBA1 is "2", the reference count (Refcount) of DataC0 stored in the physical location designated by PBA2 is "0", the reference count (Refcount) of DataD0 stored in the physical location designated by PBA3 is "0", . . . , the reference count (Refcount) of DataP0 stored in the physical location designated by PBA15 is "2".

Now, if the superblock (SB) 100-0 is selected as a superblock (copy-source block) to be subjected to GC, the controller 4 copies only the data corresponding to reference counts (Refcount) of non-zero and included in the superblock (SB) 100-0 a copy-destination superblock (here, the superblock (SB) 100-2) based on the superblock (SB) SB management table corresponding to 100-0 (here, the SB management table 200-0). FIG. 15 illustrates that DataA0, DataB0, DataG0, DataH0, DataI0, DataK0, DataN0 and DataP0 are respectively copied to the physical locations designated by PBA100 to PBA107 of a copy-destination superblock (here, the superblock (SB) 100-2).

Subsequently, the controller 4 copies each of reference counts of non-zero from an SB management table (here, the SB management table 200-0) corresponding to the super-block (copy-source block) to be subjected to GC, to an SB management table (here, the SB management table 200-2) corresponding to a copy-destination superblock (SB). More specifically, the reference counts (here, 1, 2, 2, 3, 2, 1, 1 and 2) corresponding respectively to DataA0, DataB0, DataG0, DataH0, DataI0, DataK0, DataN0 and DataP0 managed in the SB management table 200-0 corresponding to the copy-source superblock (superblock (SB) 100-0), are copied to the SB management table 200-2 corresponding to the copy-destination superblock (superblock (SB) 100-2). The reference count (Refcount) of zero is not copied.

As shown in FIG. 15, after the copying of the reference counts (Refcount) of non-zero, consequently, the reference counts (1, 2, 2, 3, 2, 1, 1 and 2) corresponding respectively to DataA0, DataB0, DataG0, DataH0, DataI0, DataK0, DataN0 and DataP0 are arranged in the order of arrangement of PBA100 to PBA107 in the SB management table 200-2.

Further, the iLUT 34 is updated and PBAs respectively indicating the physical locations in the copy-destination superblock, to which data are copied, are associated respectively with the iLBAs corresponding to the copied data. FIG. 15 illustrates that PBA100 which designates the physical location of DataA0 in the copy-destination superblock is associated with iLBA0 corresponding to DataA0; PBA101 which designates the physical location of DataB0 in the copy-destination superblock with iLBA1 corresponding to DataB0; PBA102 which designates the physical location of DataG0 in the copy-destination superblock with iLBA4 corresponding to DataG0; PBA103 which designates the physical location of DataH0 in the copy-destination superblock with iLBA6 corresponding to DataH0; PBA104 which designates the physical location of DataI0 in the copy-destination superblock with iLBA12 corresponding to DataI0; PBA105 which designates the physical location of DataK0 in the copy-destination superblock with iLBA9 corresponding to DataK0; PBA106 which designates the physical location of DataN0 in the copy-destination superblock with iLBA13 corresponding to DataN0; and PBA107 which designates the physical location of DataP0 in the copy-destination superblock with iLBA17 corresponding to DataP0. In each superblock, a pair of 4-KB user data and iLBA corresponding to the user data may be stored for each user data. Thus, the controller 4 can easily recognize iLBA0 corresponding to DataA0, iLBA1 corresponding to DataB0, iLBA4 corresponding DataG0, iLBA6 corresponding to DataH0, iLBA12 corresponding to DataI0, iLBA9 corresponding to DataK0, iLBA13 corresponding to DataN0, and iLBA17 corresponding to DataP0 by referring to the copy-source block, thereby making it possible to easily update the iLUT 34.

Figure 16:
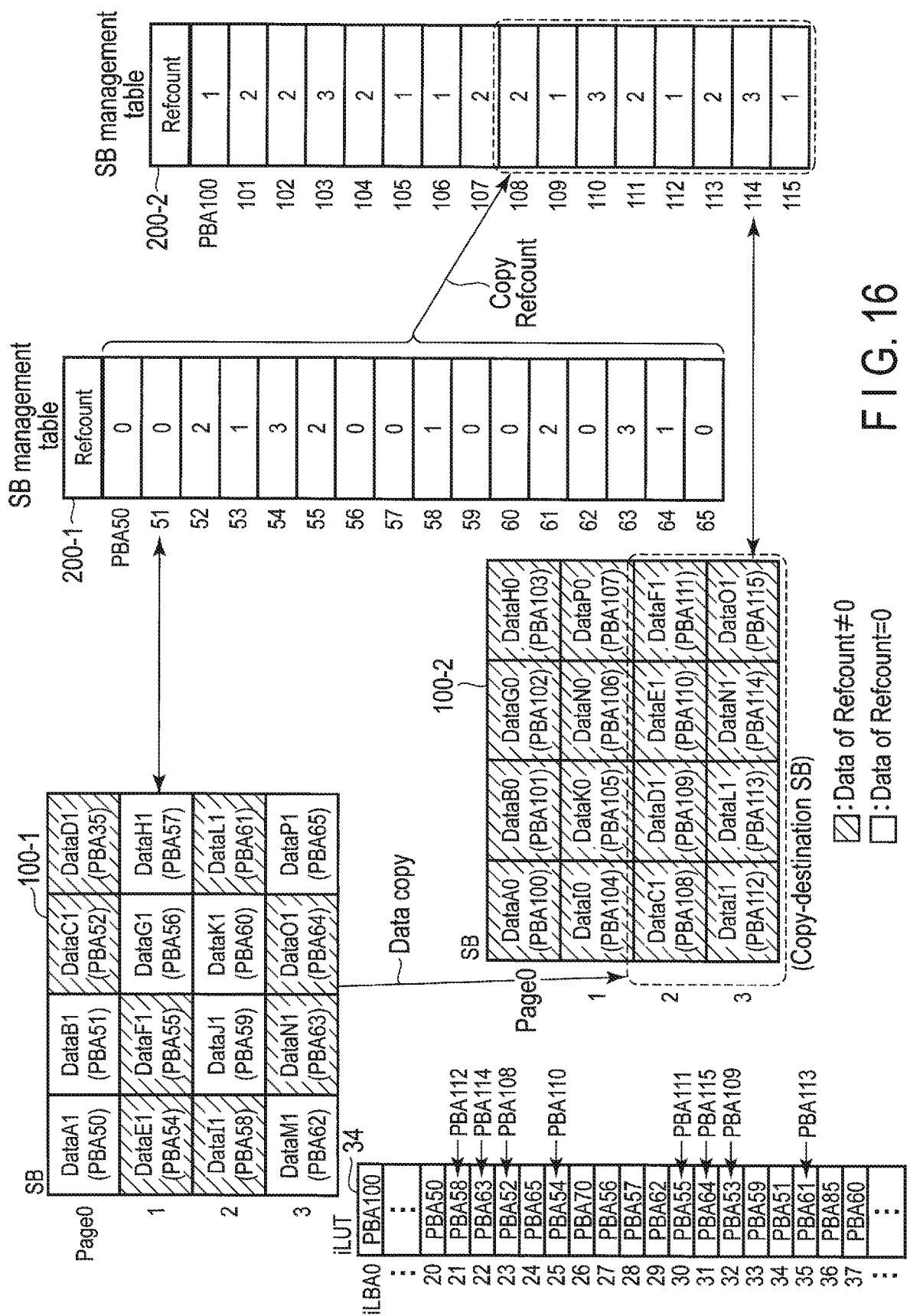
FIG. 16 is a diagram illustrating the remaining part of the garbage collection operation executed by the memory system of the embodiment.

FIG. 16 illustrates the case where the data included in the superblock (SB) 100-1 and corresponding respectively to reference counts of non-zero are copied to the superblock (SB) 100-2 by garbage collection to the superblock (SB) 100-1 after the execution of the garbage collection to the superblock (SB) 100-0.

In the physical locations in the superblock (SB) 100-1, designated respectively by PBA50 to PBA65, DataA1 to DataP1 are respectively stored, and, of these, DataC1, DataD1, DataE1, DataF1, DataI1, DataL1, DataN1 and DataO1 are data having reference counts (Refcount) of non-zero. On the other hand, DataA1, DataB1, DataG1, DataH1, DataJ1, DataK1, DataM1 and DataP1 are data having a reference count (Refcount) of zero. The reference counts (Refcount) of the data stored in the superblock (SB) 100-1 are arranged in the order of arrangement of PBA50 to PBA65 in the SB management table 200-1.

FIG. 16 illustrates that the reference count (Refcount) of DataA1 stored in the physical location designated by PBA50 is "0", the reference count (Refcount) of DataB1 stored in the physical location designated by PBA51 is "0", the reference count (Refcount) of DataC1 stored in the physical location designated by PBA52 is "2", the reference count (Refcount) of DataD1 stored in the physical location designated by PBA53 is "1", . . . , the reference count (Refcount) of DataP1 stored in the physical location designated by PBA65 is "0".

Now, when the superblock (SB) 100-1 is selected as a superblock (copy-source block) subjected to GC, the controller 4 copies only the data included in the superblock (SB) 100-1 and corresponding to reference counts (Refcount) of non-zero to a copy-destination superblock (here, the superblock (SB) 100-2) based on the SB management table (here, SB management table 200-1) corresponding to the superblock (copy-source block) subjected to GC. FIG. 16 illustrates the case where DataC1, DataD1, DataE1, DataF1, DataI1, DataL0, DataI1 and DataO1 are copied respectively to the physical locations designated by PBA108 to PBA115 of the copy-destination superblock (here, the superblock (SB) 100-2).

Subsequently, the controller 4 copies the reference counts of non-zero from the SB management table (here, the SB management table 200-1) corresponding to the superblock copy-source block subjected to GC to the SB management table (here, the SB management table 200-2) corresponding to the copy-destination superblock (SB). More specifically, the reference counts (Refcount) of DataC1, DataD1, DataE1, DataF1, DataI1, DataL0, DataN1 and DataO1 managed in the SB management table 200-1 corresponding to the copy-source superblock (superblock (SB) 100-1) are copied to the SB management table 200-2 corresponding to the copy-destination superblock (the superblock (SB) 100-2). As illustrated in FIG. 16, after the copying of the reference counts (Refcount), consequently, the reference counts of DataC1, DataD1, DataE1, DataF1, DataI1, DataL0, DataI1 and DataO1, respectively, are arranged in the order of arrangement of PBA108 to PBA115 in the SB management table 200-2.

Further, the iLUT 34 is updated and PBAs which indicate the physical locations in the copy-destination superblock, to which data are copied are associated with the respective iLBAs corresponding to the copied data. FIG. 16 illustrates that PBA108 which designates the physical location of DataC1 in the copy-destination superblock is associated with iLBA23 corresponding to DataC1; PBA109 which designates the physical location of DataD1 in the copy-destination superblock with iLBA32 corresponding to DataD1; PBA110 which designates the physical location of DataE1 in the copy-destination superblock with iLBA25 corresponding to DataE1; PBA111 which designates the physical location of DataF1 in the copy-destination superblock with iLBA30 corresponding to DataF1; PBA112 which designates the physical location of DataI1 in the copy-destination superblock with iLBA21 corresponding to DataI1; PBA113 which designates the physical location of DataI1 in the copy-destination superblock with iLBA35 corresponding to DataI1; PBA114 which specifies the physical location of DataI1 in the copy-destination superblock with iLBA22 corresponding to DataI1; and PBA115 which designates the physical location of DataO1 in the copy-destination superblock with iLBA31 corresponding to DataO1.

As described above, the garbage collection can be executed merely by using only the reference count data in the SB management table corresponding to the copy-source block without changing the relationship between the LBAs and iLBAs managed in the LUT 32.

Figure 17:
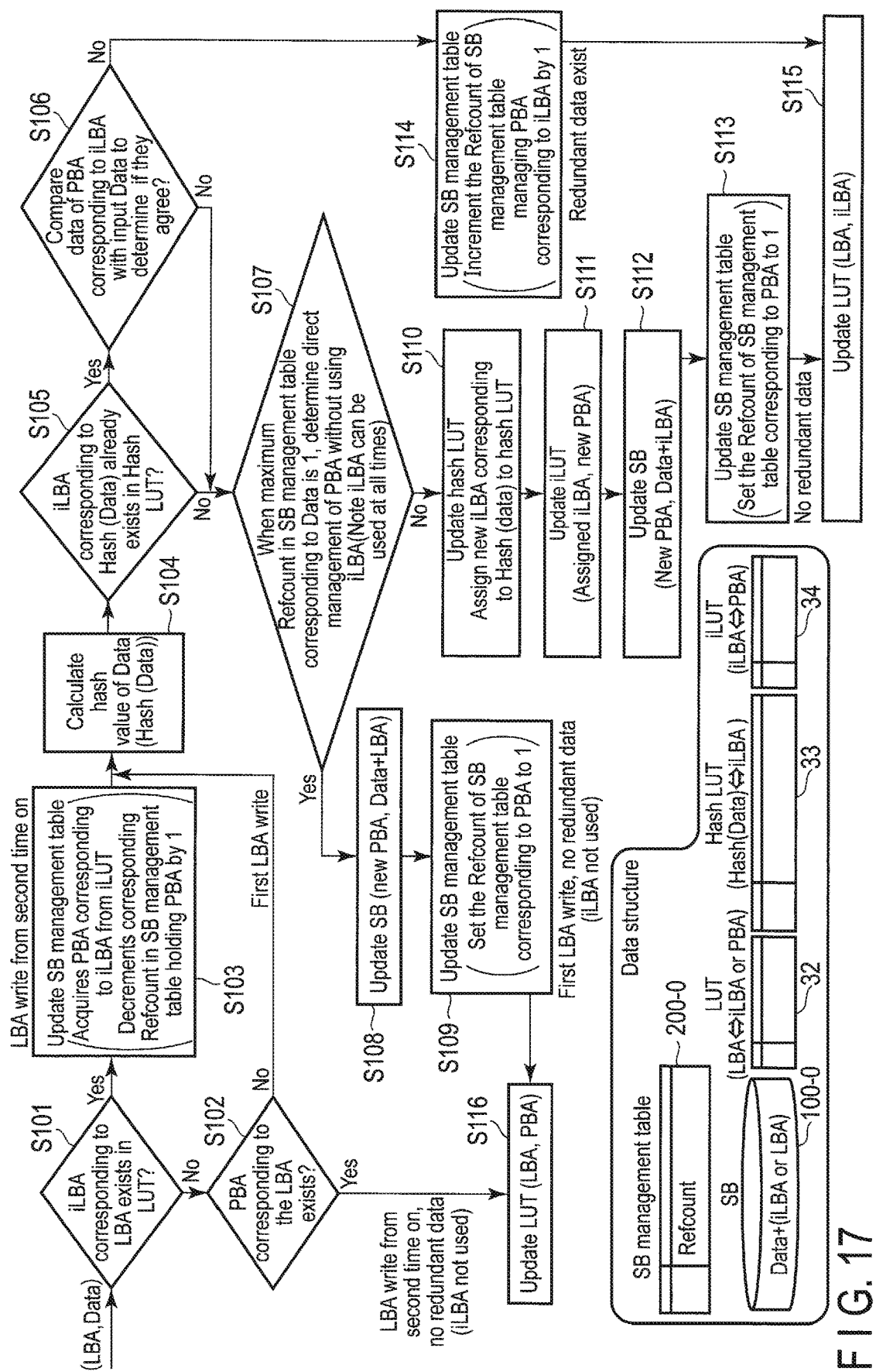
FIG. 17 is a flowchart illustrating a procedure of data write operation executed by the memory system of the embodiment.

FIG. 17 is a flowchart illustrating the procedure of the data write operation in this embodiment.

FIG. 17 illustrates in the lower left part thereof the data structure of the SB management table 200-0, superblock (SB) 100-0, LUT 32, hash LUT 33, and iLUT 34. In the SB management table 200-0, the reference counts (Refcount) corresponding respectively to the data stored in the superblock (SB) 100-0 are arranged. The superblock (SB) 100-0 stores the data and also iLBAs or LBAs corresponding to the data. The LUT 32 stores the corresponding relationship between each LBA and each iLBA. When redundant data which agrees with a certain write data does not exist in the NAND flash memory 5, not iLBA but PBA may be associated directly with LBA of this write data. Here, in the superblock (SB) 100-0, not a pair of this write data and iLBA, but a pair of this write data and LBA corresponding to this write data may be stored. The hash LUT 33 manages the corresponding relationship between each hash value (the hash of data (Data)) and each iLBA. The iLUT 34 manages the corresponding relationship between each iLBA and each PBA.

Next, the write operation will be described.

The controller 4, first, determines whether or not an iLBA corresponding to an LBA included in a write command received from the host 2 exists in the LUT 32 (step S101). If an iLBA corresponding to the LBA included in the write command does not exist in the LUT 32 (NO in step S101), the controller 4 then determines whether or not a PBA corresponding to the LBA included in the write command exists in the LUT 32 (step S102). If an iLBA/PBA corresponding to the LBA included in the write command does not exist in the LUT 32 (NO in step S102), the write data included in the write command means not update data of the data already written in the NAND flash memory 5, but the data to be firstly written (the first writing of LBA). In this case, the operation proceeds to step S104, which will be described later.

If an iLBA corresponding to the LBA included in the write command exists in the LUT 32 (YES in step S101), the controller 4 determines that the write data is update data of the data already written in the NAND flash memory 5. That is, the writing of this write data is not the first writing, but the second or later writing (the second or later writing of LBA). In this case, the SB management table 200-0 is updated (step S103). Here, the controller 4 decrements the reference count corresponding to the data already written by 1. This is because the write data (update data) is different from the data already written (pre-update data); therefore the pre-update data is no longer referred to from LBA of this write data. At this time, the controller 4 acquires PBA corresponding to the iLBA corresponding to the LBA included in the write command from the iLUT 34, and decrements the reference count (Refcount) of the data corresponding to the acquired PBA in the SB management table 200-0 only by "1".

Next, the controller 4 calculates the hash value of the write data (step S104). Then, the controller 4 determines whether or not an iLBA corresponding to the hash value obtained by the calculation exists in the hash LUT 33 (step S105). If an iLBA corresponding to the obtained hash value already exists in the hash LUT 33 (YES in step S105), the controller 4, with reference to the iLUT 34, acquires the data of the PBA corresponding to the iLBA corresponding to the obtained hash value and compares the acquired data with the received write data (input data) to determine whether or not both data agree with each other (step S106). If both data agree with each other (YES in step S106), redundant data which agrees with the write data exists in the NAND flash memory 5. In this case, the write data is not written to the write-destination superblock (superblock (SB) 100-0), but the SB management table 200-0 which manages the reference count (Refcount) of the PBA corresponding to the iLBA assigned to the obtained hash value is updated, and the reference count (Refcount) corresponding to the PBA is incremented only by "1" (step S114). Further, the LUT 32 is updated and the iLBA corresponding to the obtained hash value is associated with the LBA included in the write command (step S115).

On the other hand, if both data do not agree with each other (NO in step S106), redundant data does not exist in the NAND flash memory 5. Moreover, also if an iLBA corresponding to the obtained hash value does not exist in the hash LUT 33 (NO in step S105), redundant data does not exist.

In the case of NO in step S106 or NO in step S105, the controller 4 determines whether or not the maximum reference count (Refcount) in the reference counts (Refcount) managed in the SB management table 200-0 corresponding to the write-destination superblock (superblock (SB) 100-0), to which the write data is written is "1" (step S107). If the maximum reference count (Refcount) is "1" (YES in step S107), PBA may be associated directly with LBA without using iLBA. Naturally, iLBA may always be used.

If the maximum reference count (Refcount) is not "1" (NO in step S107), the hash LUT 33 is updated (step S110). Here, a new iLBA (non-use iLBA) is assigned to the hash value obtained in step S104. Then, the corresponding relationship between the obtained hash value and the assigned iLBA is stored in the hash LUT 33. In the case of NO in step S105, an iLBA already exists in the entry in the hash LUT 33, which corresponds to the hash value obtained in step S104, a new iLBA (non-use iLBA) may be added to this entry.

Further, the iLUT 34 is updated and the PBA which indicates the physical location in the NAND flash memory 5, to the write data is to be written, is associated with the assigned iLBA (step S111).

Furthermore, the write-destination superblock (superblock (SB) 100-0) is updated (step S112). At this time, the write data is written, together with the assigned iLBA, to the physical location corresponding to the PBA (new PBA) in the write-destination superblock (superblock (SB) 100-0), to which the write data is to be written.

Furthermore, the SB management table 200-0 corresponding to the write-destination superblock (superblock (SB) 100-0) is updated (step S113). At this time, the reference count (Refcount) corresponding to the write data, that is, the reference count (Refcount) corresponding to the PBA of the physical location to which this write data is written is set as "1".

Moreover, the LUT 32 is updated and the assigned iLBA is associated with the LBA included in the write command (step S115).

If the maximum reference count (Refcount) is "1" (YES in step S107), the data currently referred to from a plurality of LBAs does not exist in the write-destination superblock (superblock (SB) 100-0). In that case, it can be judged that the write data written to the write-destination superblock (superblock (SB) 100-0) can be managed directly by PBA without using iLBA. Note that even in this situation, iLBA may as well be used for the management.

Subsequently, the write-destination superblock (superblock (SB) 100-0) is updated (step S108). At this time, the write data is written, together with the LBA included in the write command, to the physical location corresponding to the PBA (new PBA) in the write-destination superblock (superblock (SB) 100-0), to which the write data is to be written.

Then, the SB management table 200-0 corresponding to the write-destination superblock (superblock (SB) 100-0) is updated (Step S109). At this time, the reference count (Refcount) corresponding to the write data (Refcount), that is, the reference count (Refcount) corresponding to the PBA of the physical location, to which this write data is written, is set as "1".

Further, the LUT 32 is updated and the PBA of the physical location, to which the write data is written, is associated with the LBA included in the write command (step S116).

Furthermore, if a PBA corresponding to the LBA included in the write command exists in the LUT 32 (YES in step S102), the writing of write data is the second time or later (the second or later writing of LBA). Moreover, since an iLBA corresponding to the LBA included in the write command does not exist, redundant data does not exist, in which situation, the data can be managed without using iLBA.

Then, the write data is written to the write-destination superblock (superblock (SB) 100-0). The LUT 32 is updated and a new PBA which designates the physical location to which the write data is written, is associated with the LBA included in the write command (step S116).

FIG. 18 is a flowchart illustrating the procedure of the garbage collection.

The controller 4 selects a superblock to be subjected to GC as a superblock (copy-source block) subjected to GC (step S201). Next, the controller 4 specifies PBA corresponding to a reference count (Refcount) of non-zero with reference to the SB management table (step S202).

Subsequently, the controller 4 copies the data stored in the physical location corresponding to the specified PBA, that is, the data corresponding to the reference count of non-zero, to the copy-destination block (Step S203). After that, the controller 4 updates the iLUT 34 and associates the PBA which indicates the physical location in the copy-destination block, to which the copied data is stored, with the iLBA corresponding to this copied data (step S204). In step S204, the controller 4 further copies the reference count (Refcount) corresponding to this copied data to the SB management table corresponding to the copy-destination block.

Next, the controller 4 determines whether or not data corresponding to the reference count (Refcount) of non-zero exists in the superblock (copy-source block) subjected to GC (step S205).

If data corresponding to the reference count (Refcount) of non-zero exists in the superblock (copy-source block) subjected to GC (NO in step S205), the operation shifts to processing of step S202. Note that the processings of steps S202 to S204 are repeated until data corresponding to the reference count (Refcount) of non-zero no longer exists in the superblock (copy-source block) subjected to the GC.

If data corresponding to the reference count (Refcount) of non-zero no longer exists in the superblock (copy-source block) subjected to GC (YES in step S205), the garbage collection is completed.

FIG. 19 is a flowchart illustrating the procedure of the data read operation in this embodiment.

When a read command is received from the host 2 (YES in step S301), the controller 4 acquires iLBA corresponding to the LBA included in the read command with reference to the LUT 32 (step S302). Next, the controller 4 acquires PBA corresponding to the acquired iLBA with reference to the iLUT 34 (step S303). Then, the controller 4 reads the data stored in the physical location corresponding to the acquired PBA (step S304).

Figure 20:
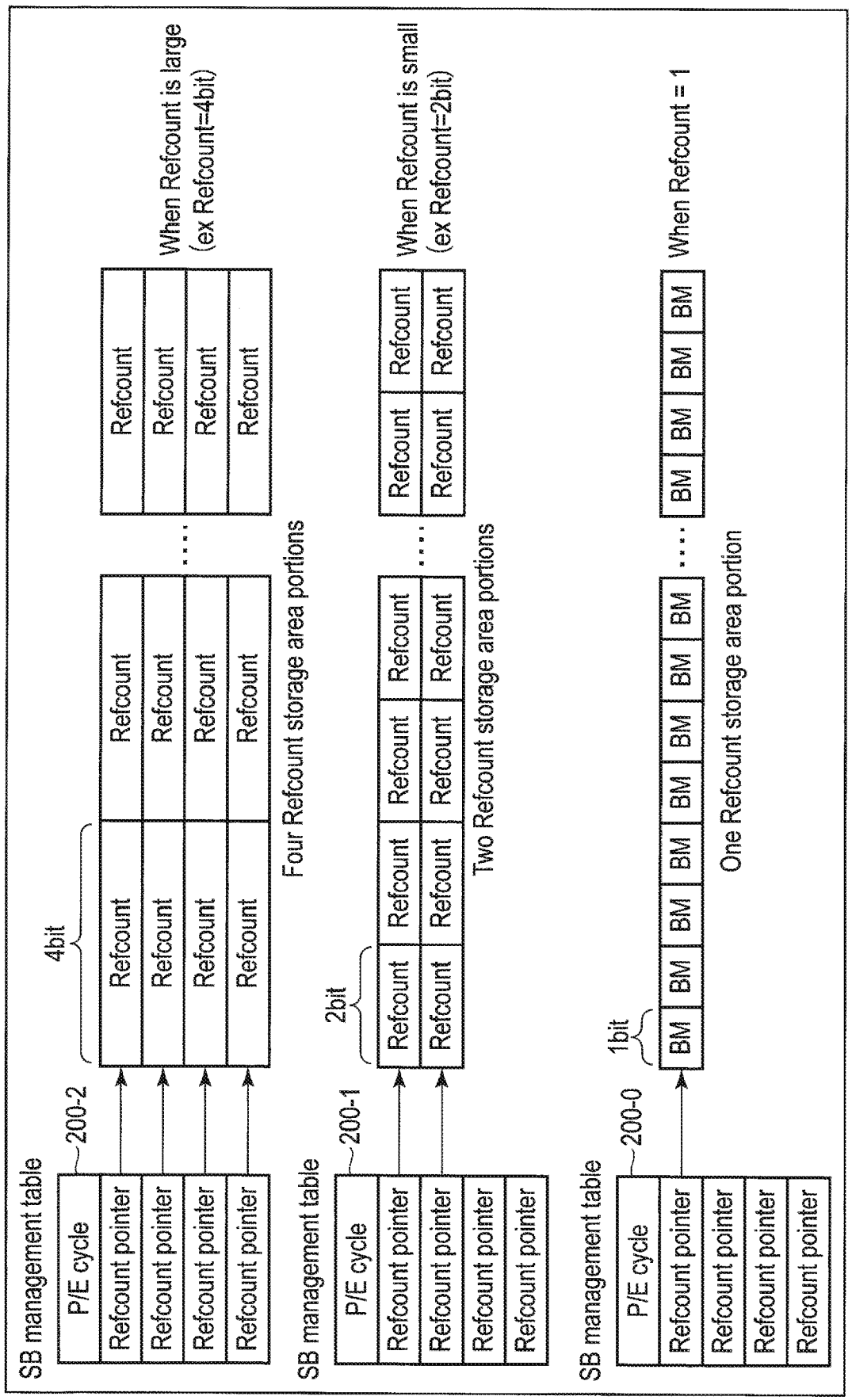
FIG. 20 is a diagram illustrating a configuration example of a reference count storage area in each superblock management table managed by the memory system of the embodiment.

FIG. 20 shows a configuration example of the reference count storage area in each superblock management table.

The SB management table is provided in each superblock (SB). The SB management table holds various management data (metadata) regarding the corresponding superblock (SB). Examples of the management data (metadata) may include the number of program/erase cycles of the corresponding superblock (SB) and the amount of invalid data (or the amount of valid data) of the corresponding superblock (SB).

Further, the SB management table includes a reference count storage area for storing all the data storable in the corresponding superblock (SB) and the reference counts of these data. One reference count pointer in each SB management table points the location of one reference count storage area portion for a certain size (for example, 1024 bits). Each SB management table includes a plurality of reference count pointers. Thus, a plurality of reference count storage area portions are associated with each SB management table. These reference count storage areas are used as reference count storage areas for the corresponding SB management table.

For example, when the size of one superblock is 4 GB, 1 M pieces of 4-KB data are stored in one superblock. In this case, one SB management table requires a reference count storage area which can hold 1 M pieces of reference counts.

If the bit length of one reference count is 2 bits, "00" is used to indicate that the corresponding data is not being referred to from any logical address, "01" is used to indicate that the corresponding data is being referred to from one logical address, "10" is used to indicate that the corresponding data is being referred to from two logical addresses, and "11" is used to indicate the corresponding data is being referred to from three logical addresses. Therefore, the value of the manageable maximum reference count is 3.

If the bit length of one reference count is 3 bits, the value of the manageable maximum reference count is 7. If it is 4 bits, the value of the manageable maximum reference count is 15. If it is 8 bits, the value of the manageable maximum reference count is 255.

Thus, the value of the manageable maximum reference count increases as the bit length of the reference count is greater, but the amount of the memory resource consumed by the reference count storage area is also increased.

Usually, the values of the reference counts differ from one data to another in many cases. Therefore, in the same superblock, data with different reference counts mixedly exist. Such a situation that data with different reference counts mixedly exist in the same superblock may become a factor of wasting the memory resource secured for the reference count storage area.

In this embodiment, the data groups including large reference counts and the data groups including small reference counts are separated from each other by the GC. Thus, data which belong to the same reference count range can be stored in the same superblock. As a result, in a superblock in which data groups including large reference counts are collected, SB management tables including large-size reference count storage area portions in which a great number of reference counts each having a great bit length can be stored can be secured, whereas in a superblock in which data groups including small reference counts are collected, SB management tables including small-size reference count storage area portions in which a great number of reference counts each having a less bit length can be stored, can be secured.

Therefore, each SB management table is configured to be able to vary the sizes of the reference count storage area portions. Each SB management table may include in advance the same number of reference count pointers as that of the reference count storage area portions required to constitute a reference count storage area of the maximum size.

FIG. 20 illustrates, as an example, three kinds of SB management tables including reference count storage areas of different sizes.

The SB management table 200-0 is set up as an SB management table including a reference count storage area of the minimum size which can store a plurality of reference counts each being of 1 bit.

In the SB management table 200-0, of all the reference count pointers included in this SB management table, only 1,000 reference count pointers are used. One reference count pointer indicates the location of one reference count storage area portion having a bit length of 1024 bits. The bit length of each reference count is 1 bit. Therefore, the reference count storage area portion includes 1024 bit map flags (BM) respectively corresponding to 1024 pieces of 4-KB data. When a reference count (bit map flag)="0", it indicates that the number of logical addresses referring to the corresponding 4-KB data is zero. When a reference count (bit map flag)="1", it indicates that the number of logical addresses referring to the corresponding 4-KB data is 1.

The SB management table 200-1 is set up as an SB management table including a reference count storage area which can store a plurality of reference counts each having 2 bits.

In the SB management table 200-1, of all the reference count pointers included therein, 2,000 reference count pointers are utilized. One reference count pointer indicates the location of one reference count storage area portion having a length of 1,024 bits. The bit length of each reference count is 2 bits. One reference count storage area portion includes 512 reference counts. Therefore, two reference count storage area portions are used to store 1,024 reference counts corresponding respectively to 1,024 pieces of 4-KB data.

The SB management table 200-2 is set up as SB management table including a reference count storage area which can store a plurality of reference counts each having 4 bits.

In the SB management table 200-2, of all the reference count pointers included therein, 4,000 reference count pointers are utilized. One reference count pointer indicates the location of one reference count storage area portion having a length of 1,024 bits. The bit length of each reference count is 4 bits. One reference count storage area portion includes 256 reference counts. Therefore, four reference count storage area portions are used to store 1,024 reference counts corresponding respectively to 1,024 pieces of 4-KB data.

The superblock (SB) 100-0 associated with the SB management table 200-0 is used as a superblock (SB) for storing the data of reference counts (Refcount)=0 to 1.

The superblock (SB) 100-1 associated with the SB management table 200-1 is used mainly as a superblock (SB) for storing the data of reference counts (Refcount)=2 to 3.

The superblock (SB) 100-2 associated with the SB management table 200-2 is used mainly as a superblock (SB) for storing the data of reference counts (Refcount)=4 to 15.

FIG. 21 briefly illustrates the garbage collection which separates data corresponding to large reference counts (Refcount) and data corresponding to small reference counts (Refcount) from each other.

Here, copy-destination superblocks (SB) 221 and 222 are allocated. Further, SB management tables 221A and 222A are associated respectively with copy-destination superblocks (SB) 221 and 222. Here, the SB management table 221A includes a reference count storage area which can store a plurality of reference counts (Refcount) each having a 4-bit length, and the SB management table 222A includes a reference count storage area which can store a plurality of reference counts (Refcount) each having a 2-bit length.

The superblock (SB) 210 stores data d1, data d2, data d4 and data d5, which include large reference counts (Refcount=4 to 15), data d6 and data d8, which include small reference counts (Refcounts=1 to 3), data d3 and d7, which include a reference count (Refcount) of zero, and the like.

The superblock (SB) 211 stores data d17 including large reference counts (Refcount=4 to 15), data d11, data d13, data d14 and data d18, which include small reference counts (Refcount=1 to 3), data d12, data d15 and data d16, which include a reference count of zero, and the like.

The superblock (SB) 212 stores data d22, data d23 and data d24, which include large reference counts (Refcount=4 to 15), data d27 and data d28, which include small reference counts (Refcount=1 to 3), data d21, data d25 and data d26, which include a reference count of zero, and the like.

When the superblock (SB) 210 is selected as a superblock (copy-source block) subjected to GC, the controller 4 copies a set of data included in the superblock (SB) 210 and including reference counts belonging to the first reference count range (here, 1 to 3) to the copy-destination superblock (SB) 222, and a set of data included in the superblock (SB) 210 and including reference counts belonging to the second reference count range (here, 4 to 15), which has a lower limit larger than the upper limit (here, 3) of the first reference count range, to the copy-destination superblock (SB) 221, based on the SB management table corresponding to the superblock (SB) 210.

More specifically, the data d1, data d2, data d4, and data d5 including large reference counts (Refcount=4 to 15) are copied to the copy-destination superblock (SB) 221, and the data d6 and data d8 including small reference counts (Refcount=1 to 3) are copied to the copy-destination superblock (SB) 222.

Next, when the superblock (SB) 211 is selected as a superblock (copy-source block) subjected to GC, the controller 4 copies a set of data included in the superblock (SB) 211 and including reference counts belonging to the first reference count range (here, 1 to 3) to the copy-destination superblock (SB) 222, and a set of data included in the superblock (SB) 211 and including reference counts belonging to the second reference count range (here, 4 to 15), which has a lower limit larger than the upper limit (here, 3) of the first reference count range, to the copy-destination superblock (SB) 221, based on the SB management table corresponding to the superblock (SB) 211.

More specifically, the data d17 including large reference counts (Refcount=4 to 15) are copied to the copy-destination superblock (SB) 221, and the data d11, data d13, data d14 and data d18 including small reference counts (Refcount=1 to 3) are copied to the copy-destination superblock (SB) 222.

Next, when the superblock (SB) 212 is selected as a superblock (copy-source block) subjected to GC, the controller 4 copies a set of data included in the superblock (SB) 212 and including reference counts belonging to the first reference count range (here, 1 to 3) to the copy-destination superblock (SB) 222, and a set of data included in the superblock (SB) 212 and including reference counts belonging to the second reference count range (here, 4 to 15), which has a lower limit larger than the upper limit (here, 3) of the first reference count range, to the copy-destination superblock (SB) 221, based on the SB management table corresponding to the superblock (SB) 212.

More specifically, the data d22, data d23 and data d24 including large reference counts (Refcount=4 to 15) are copied to the copy-destination superblock (SB) 221, and the data d27 and data d28 including small reference counts (Refcount=1 to 3) are copied to the copy-destination superblock (SB) 222.

Thus, in the GC operation, the copy-destination block to which data is to be copied is changed according to the value of the reference count (Refcount) of the data. As a result, it becomes possible to collect data belonging to the same reference count range in the same superblock. Therefore, only data groups including large reference counts can be collected in a superblock associated with an SB management table which can store a plurality of reference counts each having a great bit length, whereas only data groups including small reference counts can be collected in a superblock associated with an SB management table which can store a plurality of reference counts each having a less bit length. Thus, the amount of consumption of the memory resource for the reference count storage area can be sharply reduced as compared to the situation where data including different reference counts mixedly exist in the same superblock.

The data groups belonging to the same reference count range have approximately similar lifetimes. Therefore, it becomes possible to increase the probability that the data included in the same superblock are invalidated approximately at the same timing, and thus the frequency of execution of GC can be reduced. As a result, it is possible to lower the write amplification, and the lifetime of the SSD 3 can be expanded to the maximum.

Figure 22:
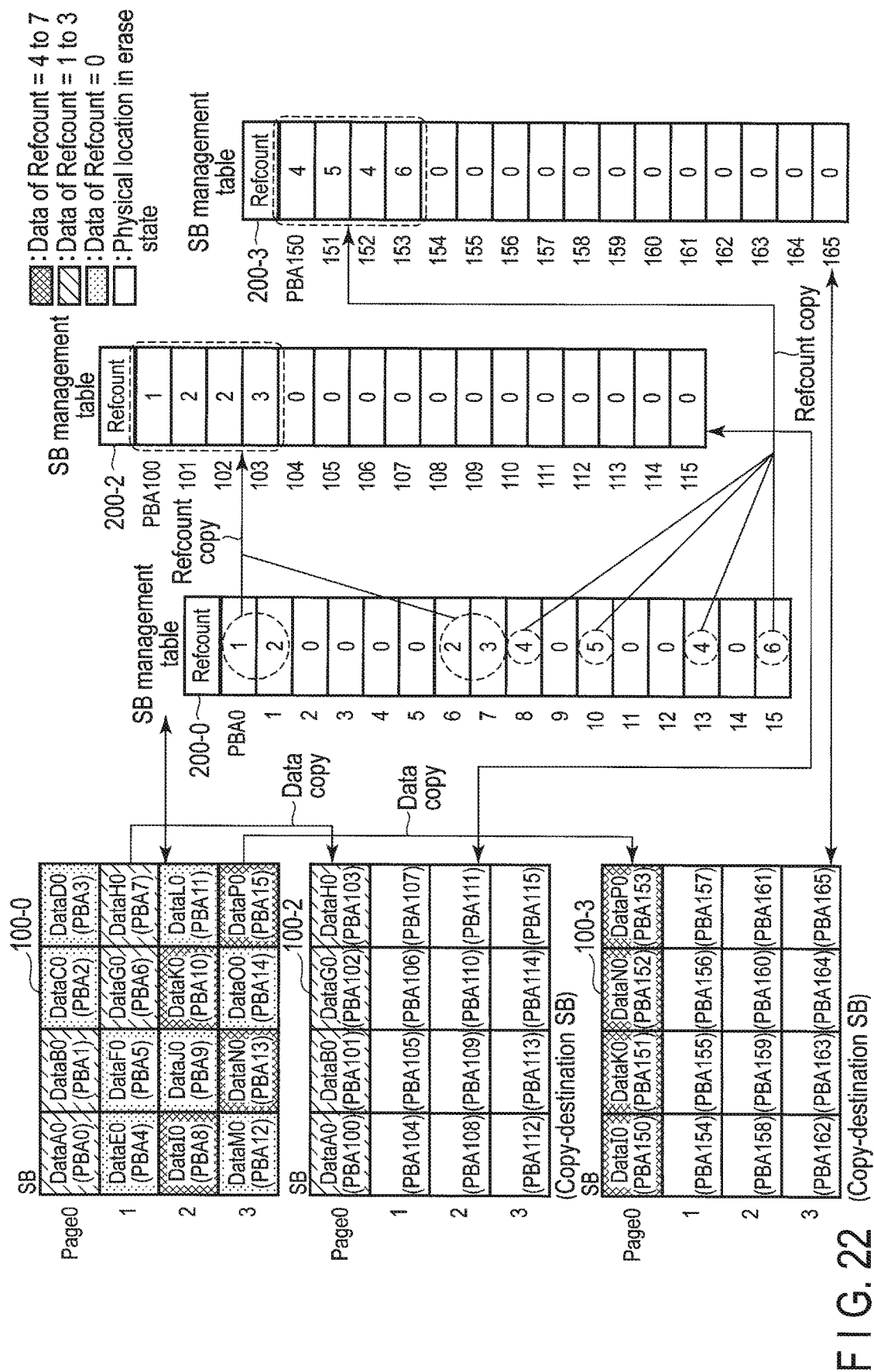
FIG. 22 is a diagram illustrating a data copying operation and a reference count copying operation included in the garbage collection operation executed by the memory system of the embodiment.

FIG. 22 illustrates the data copying operation and reference count copying operation included in the garbage collection.

Here, the superblock (SB) 100-0 is selected as a superblock (copy-source block of GC) subjected to GC, and the superblocks (SB) 100-2 and 100-3 are allocated as copy-destination superblocks.

Moreover, the SB management tables 200-0, 200-2 and 200-3 are associated respectively with the superblocks (SB) 100-0, 100-2 and 100-3. Further, the SB management table 200-2 includes a reference count storage area which can store a plurality of reference counts (Refcount) each having a 2-bit length, whereas the SB management table 200-3 includes a reference count storage area which can store a plurality of reference counts (Refcount) having a 3-bit length.

The superblock (SB) 100-0, which is a superblock (copy-source block of GC) subjected to GC, stores DataA0, DataB0, DataG0, DataH0, DataI0, DataK0, DataN0 and DataP0 corresponding to reference counts of non-zero, and DataC0, DataD0, DataE0, DataF0, DataJ0, DataL0, DataM0 and DataO0 corresponding to a reference count of zero.

DataI0, DataK0, DataN0 and DataP0, which are data corresponding to reference counts (Refcount)=4 to 7 are stored respectively in the physical locations designated by PBA8, PBA10, PBA13 and PBA15 in the superblock (SB) 100-0. DataA0, DataB0, DataG0 and DataH0, which are data corresponding to reference counts (Refcount)=1 to 3 are stored respectively in the physical locations designated by PBA0, PBA1, PBA6 and PBA7 in the superblock (SB) 100-0. DataC0, DataD0, DataE0, DataF0, DataJ0, DataL0, DataM0 and DataO0, which have a reference count of zero are stored respectively in the physical locations corresponding to PBA2, PBA3, PBA4, PBA5, PBA9, PBA11, PBA12 and PBA14 in the superblock (SB) 100-0.

The SB management table 200-0 corresponding to the superblock (SB) 100-0 stores the reference counts (Refcount) of the data stored in the superblock (SB) 100-0.

When the GC operation is started on the superblock (SB) 100-0, DataA0, DataB0, DataG0 and DataH0 in the superblock (SB) 100-0 are copied respectively to the physical locations designated by PBA100, PBA101, PBA102 and PBA103 in the superblock (SB) 100-2, which is a copy-destination superblock. Based on this, the reference counts ("1", "2", "2" and "3") corresponding respectively to DataA0, DataB0, DataG0 and DataH0 managed in the SB management table 200-0 are copied to the SB management table 200-2 corresponding to superblock (SB) 100-2, which is a copy-destination superblock. At this time, in the SB management table 200-2, the reference counts ("1", "2", "2" and "3") corresponding respectively to DataA0, DataB0, DataG0 and DataH0 are continuously arranged in this order.

Further, DataI0, DataK0, DataN0 and DataP0 in the superblock (SB) 100-0 are copied respectively to the physical locations designated by PBA150, PBA151, PBA152 and PBA153 in the superblock (SB) 100-3, which is a copy-destination superblock. Based on this, the reference counts ("4" "5", "4" and "6") corresponding respectively to DataI0, DataK0, DataN0 and DataP0 managed in the SB management table 200-0 are copied to the SB management table 200-3 corresponding to the superblock (SB) 100-3, which is a copy-destination superblock. At this time, in the SB management table 200-2, the reference counts ("4", "5", "4" and "6") corresponding respectively to DataI0, DataK0, DataN0 and DataP0 are continuously arranged in this order.

Figure 23:
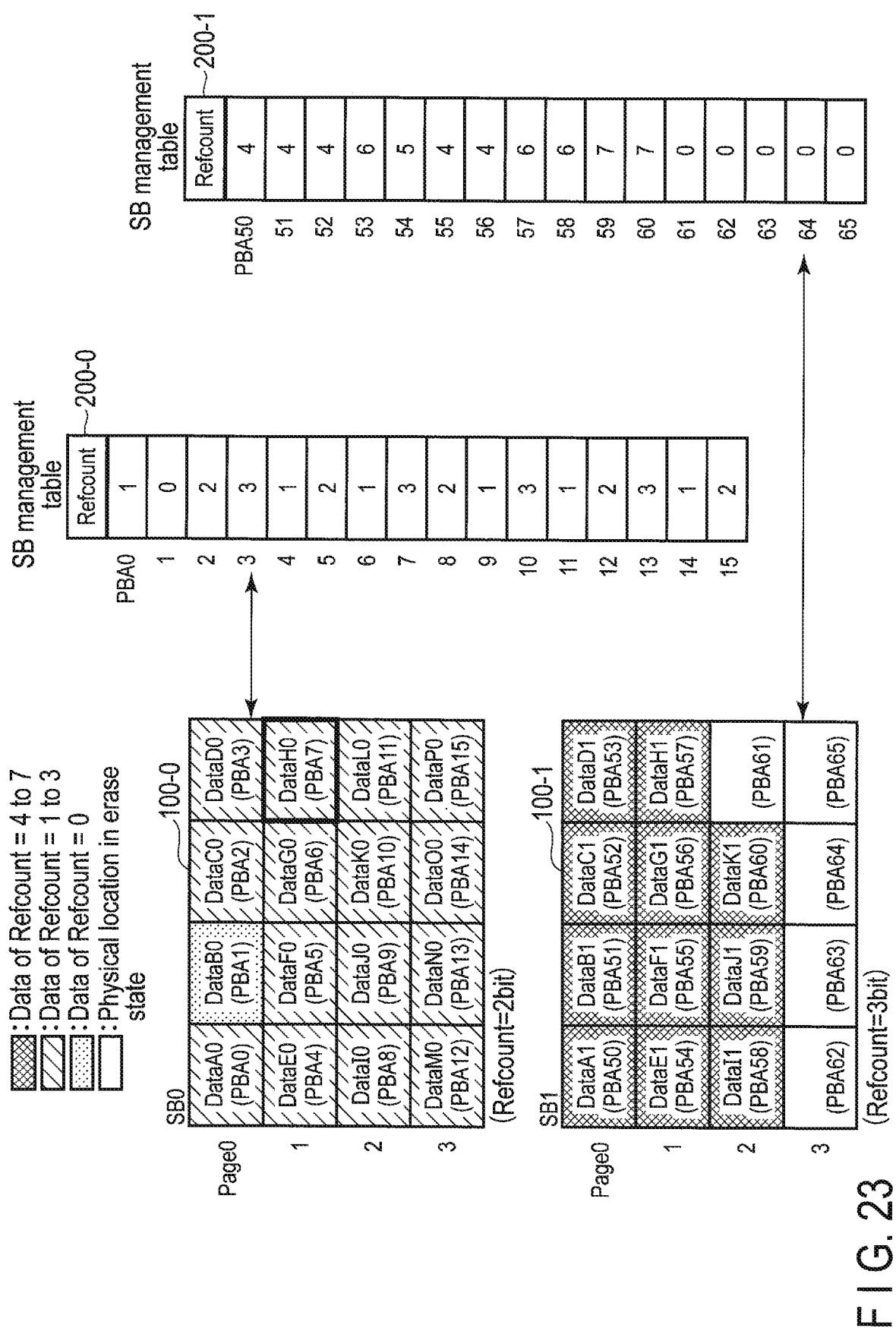
FIG. 23 is a diagram illustrating part of the data copying operation executed by the memory system of the embodiment when the reference count corresponding to a certain data overflows.
Figure 24:
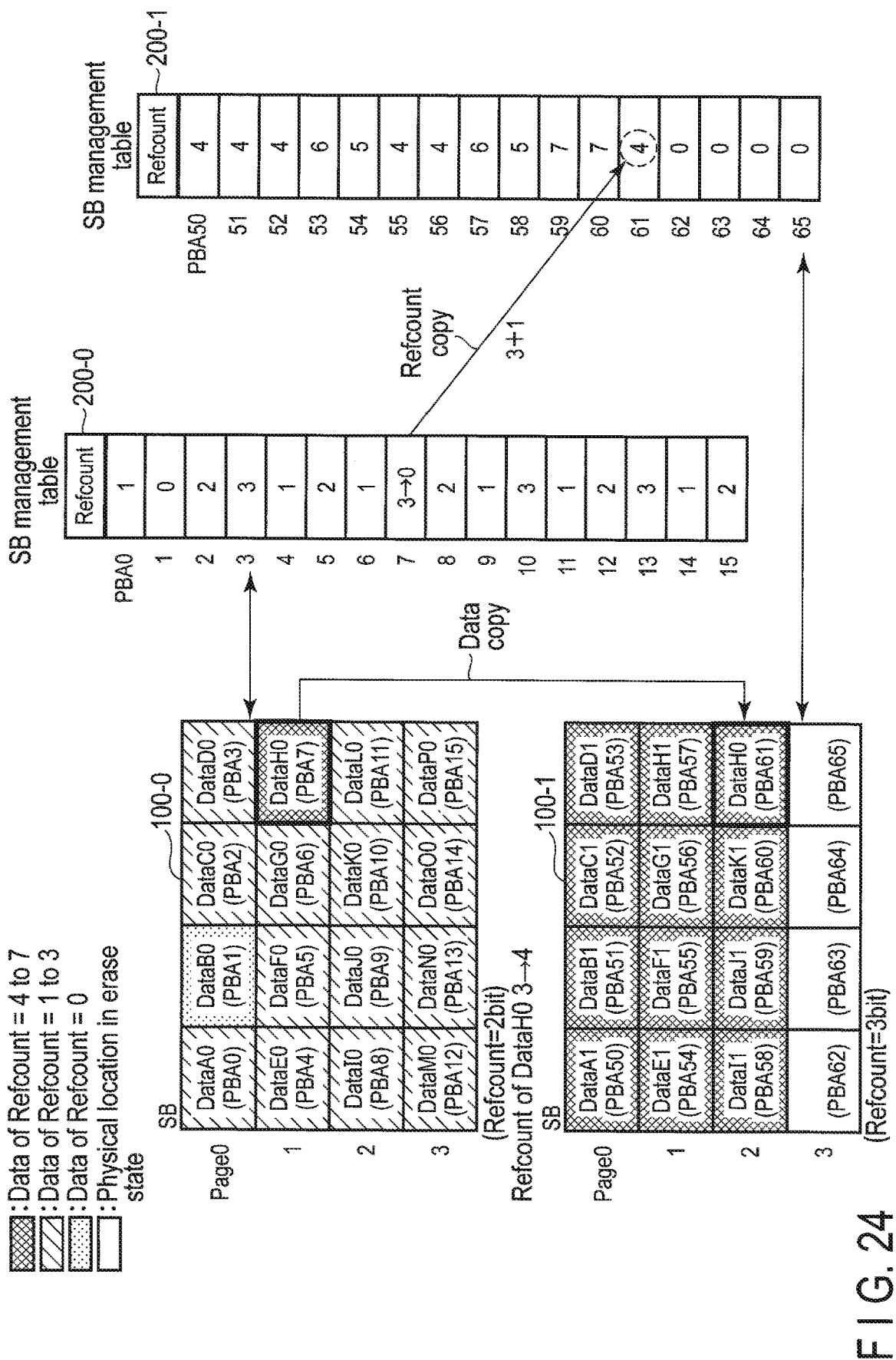
FIG. 24 is a diagram illustrating the remaining part of the data copying operation executed by the memory system of the embodiment when the reference count corresponding to a certain data overflows.

FIGS. 23 and 24 illustrate the data copying operation to be executed when the reference counts (Refcount) corresponding to a certain data overflows. Here, let us assume that the SB management table 200-0 associated with superblock (SB) 100-0 includes a reference count storage area which can store a plurality of reference counts (Refcount) each having a 2-bit length, and the SB management table 200-1 associated with the superblock (SB) 100-1 includes a reference count storage area which can store a plurality of reference counts (Refcount) each having a 3-bit length.

The superblock (SB) to 100-0 stores data corresponding to reference counts (Refcount)=1 to 3, namely, DataA0, DataC0, DataD0, DataE0, DataF0, DataG0, DataH0, DataI0, DataJ0, DataK0, DataL0, DataM0, DataN0, DataO0 and DataP0 respectively in the physical locations designated by PBA0, PBA2, PBA3, PBA4, PBA5, PBA6, PBA7, PBA8, PBA9, PBA10, PBA11, PBA12, PBA13, PBA14 and PBA15, and also data corresponding to a reference count (Refcount)=0, namely, DataB0 in the physical location designated by PBA1.

The superblock (SB) 100-1 stores data corresponding to reference counts=4 to 7, namely, DataA1, DataB1, DataC1, DataD1, DataE1, DataF1, DataG1, DataH1, DataI1, DataJ1 and DataK1, respectively, in the physical locations designated by PBA50, PBA51, PBA52, PBA53, PBA54, PBA55, PBA56, PBA57, PBA58, PBA59 and PBA60. No data is stored in the physical locations designated by PBA61 to PBA65, which correspond to the physical locations (usable physical locations) of an erase state.

The value of the reference count corresponding to DataH0 stored in the superblock (SB) 100-0 is "3". Therefore, the value of the reference count corresponding to DataH0 exceeds (overflows) the maximum value (here, 3) expressible by the bit length (here, 2 bits) of each reference count, which can be stored in the reference count storage area of the SB management table 200-0 when write data which agrees with DataH0 is received from the host 2.

In this case, as shown in FIG. 24, the controller 4 copies DataH0 to the superblock (SB) 100-1 associated with the SB management table 200-1 including the reference count storage area which can store a plurality of reference counts each having a bit length greater than that of the SB management table 200-0. DataH0 is copied to the next usable physical location (here, the physical location designated by PBA61) in the superblock (SB) 100-1. Based on this, the reference count (Refcount) of PBA7, which indicates the physical location in the copy-source superblock (superblock (SB) 100-0), to which DataH0 is stored, is updated to 0 from 3. This operation is carried out to invalidate the data stored in the physical location designated by PBA7. Further, the reference count (here "4") of DataH0 is copied to the location in the SB management table 200-1, which corresponds to PBA61.

The reference count storage area expansion to be executed when a reference count (Refcount) corresponding to a certain data overflows will be described with reference to FIG. 25. Here, the SB management table 200-0 associated with the superblock (SB) 100-0 includes a reference count storage area which can store a plurality of reference counts having a 2-bit length.

Now, the superblock (SB) to 100-0 stores data corresponding to reference counts (Refcount)=1 to 3, namely, DataA0, DataC0, DataD0, DataE0, DataF0, DataG0, DataH0, DataI0, DataJ0, DataK0, DataL0, DataM0, DataN0, DataO0 and DataP0 respectively in the physical locations designated by PBA0, PBA2, PBA3, PBA4, PBA5, PBA6, PBA7, PBA8, PBA9, PBA10, PBA11, PBA12, PBA13, PBA14 and PBA15, and also data corresponding to a reference count (Refcount)=0, namely, DataB0 in the physical location designated by PBA1.

When the value of the reference count corresponding to DataH0 in the superblock (SB) 100-0 exceeds the maximum value expressible by the bit length of each reference count which can be stored in the reference count storage area of the SB management table 200-0 by reception of a write command from the host 2, which includes write data agreeing with DataH0, the controller 4 expands the size of the reference count storage area of the SB management table 200-0 to elongate the bit lengths of the reference counts which can be stored in the reference count storage area of the SB management table 200-0.

More specifically, when a write command which includes write data agreeing with DataH0 is received from the host 2, the reference count (Refcount) of DataH0 is increased from 3 to 4. In this case, the reference count (Refcount) of DataH0 exceeds (overflows) the maximum value of the reference count storable in the reference count storage area of the SB management table 200-0 corresponding to superblock (SB) 100-0. At this time, as shown in the right-hand side of FIG. 25, the size of the reference count storage area of the SB management table 200-0 is expanded to change the bit length of each reference count from 2 bits to 4 bits, for example. In this case, the controller 4 may release the previous reference count storage area, and in place, may reserve a larger-size reference count storage area.

Then, the controller 4 increments the reference count corresponding to DataH0 by 1, and thus changes the reference count corresponding to DataH0 from "3" to "4".

Next, the conditions for selecting a candidate block for garage collection (copy-source block) will be described with reference to FIG. 26.

Based on the amount of invalid data (or the amount of valid data) in each of superblocks (SB), the controller 4 selects a candidate for the block (copy-source block) to be subjected to GC from these superblocks (SB). In this case, the controller 4 selects a superblock in which data including large reference counts are collected, with higher priority than a superblock (SB) in which data including small reference counts are collected, as a candidate copy-source block for GC. That is, since as the reference count of data is larger, the probability that the data should be rewritten is low. Therefore, as to superblocks (SB) in which data including large reference counts are collected, the controller 4 selects them as candidate copy-source blocks for GC even if they have a more amount of valid data than superblocks (SB) in which data including less reference counts are collected.

The superblocks (SB) are classified into a superblock (SB) group in which a set of data belonging to the first reference count range are collected and a superblock (SB) group in which a set of data belonging to the second reference count range are collected.

FIG. 26 illustrates that the superblock (SB) 100-0 is classified into a superblock (SB) group in which data belonging to a certain reference count range (first reference count range) are collected, more specifically, a superblock (SB) group in which data having small reference counts are collected, and the superblock (SB) 100-1 is classified into a superblock (SB) group in which data belonging to a reference count range (the second reference count range) having a lower limit larger than the upper limit of the first reference count range are collected, that is, a superblock (SB) group in which data including large reference counts are collected.

Here, when the condition that the amount of invalid data is greater than a threshold Xa is satisfied, the controller 4 selects the superblock (SB) 100-0 as a candidate for the copy-source block to be subjected to GC. On the other hand, as to the superblock (SB) 100-1, the controller 4 selects it as a candidate of the copy-source block to be subjected to GC, when the condition that the amount of invalid data is greater than a threshold Xb, which is a value less than the threshold Xa, is satisfied.

As described above, the probability of data being rewritten is lower, as the reference count of the data is larger. Therefore, usually the data in the superblock (SB) in which data having large reference counts are collected are continuously used for a long period and the probability of this superblock (SB) being reused to store other data is low. Thus, the over-provisioning of the SSD 3 is decreased by the amount of invalid data (data having a reference count of zero) existing in the superblock (SB) in which the data including large reference counts are collected. In this embodiment, as described above, a superblock (SB) in which data including large reference counts are collected is selected as a candidate for the copy-source block to be subjected to GC, even if it includes a more amount of valid data than that of a superblock (SB) in which data including reference count smalls are collected. Thus, the over-provisioning of the SSD 3 can be decreased, thereby making it possible to reduce the write amplification.

Figure 27:
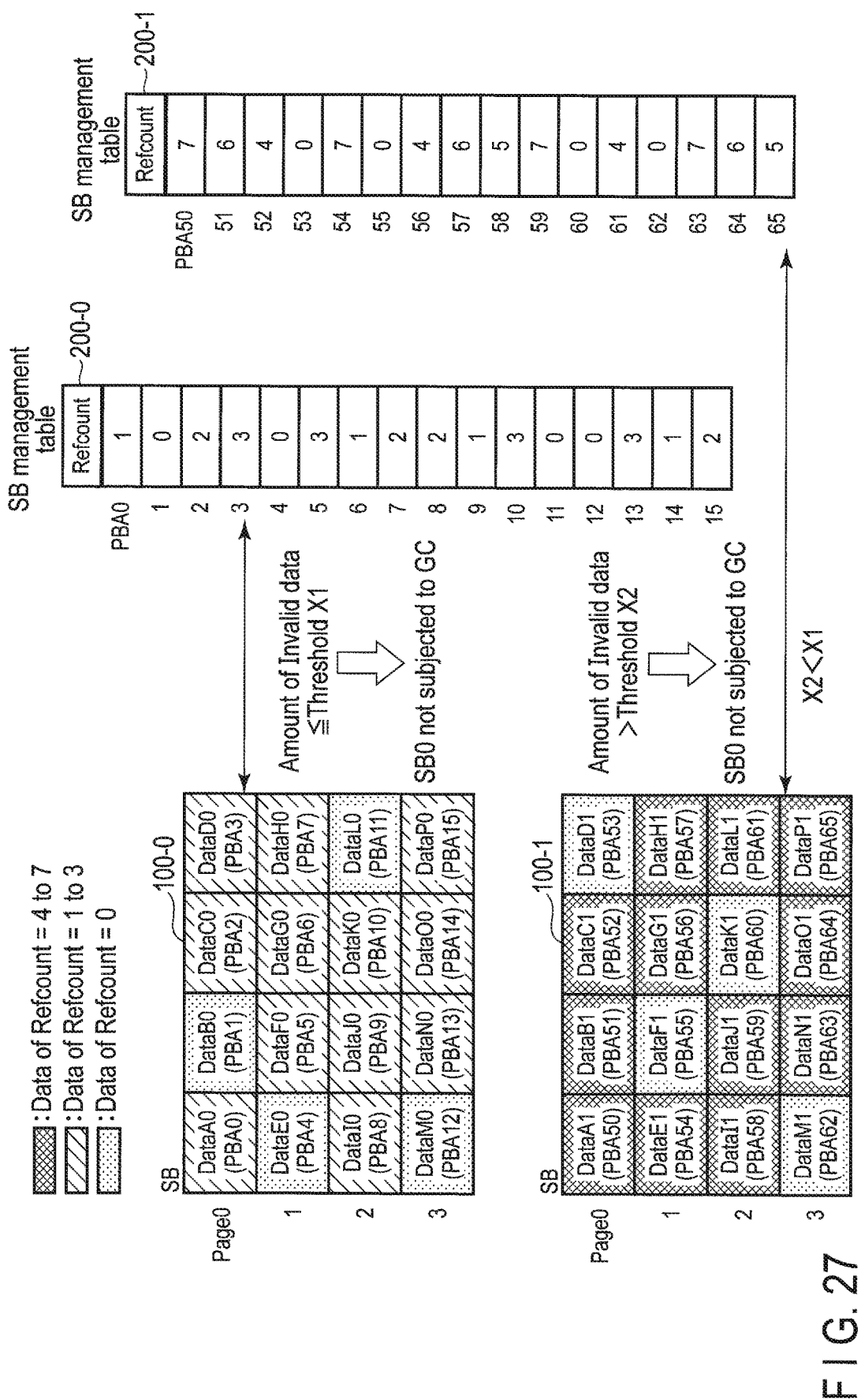
FIG. 27 is a diagram illustrating selection of a copy-source block candidate executed by the memory system of the embodiment.

FIG. 27 shows the operation of selecting a candidate for the copy-source block to be subjected to GC.

In the superblock (SB) 100-0, data corresponding to reference counts=1 to 3 are collected. The superblock (SB) 100-0 stores DataA0 to DataP0 in the physical locations designated by PBA0 to PBA15, respectively. Of the data stored in the superblock (SB) 100-0, those having a reference count of zero are known to be DataB0 designated by PBA1, DataE0 which are designated by PBA4, DataL0 designated by PBA11 and DataM0 designated by PBA12, from the SB management table 200-0. The controller 4 selects the superblock (SB) 100-0 as a candidate for the block to be subjected to GC, that is, a candidate for the copy-source block for the GC on the condition that the amount of invalid data of the superblock (SB) 100-0 is greater than the threshold X1. The amount of invalid data may be expressed by the number of the data which have a reference count of zero. In this case, the current amount of invalid data of the superblock (SB) 100-0 is 4. If the threshold X1 is set to 4, the above-described condition is not satisfied, and therefore the superblock (SB) 100-0 is not selected as a candidate for the copy-source block to be subjected to GC.

In the superblock (SB) 100-1, the data corresponding to reference counts=4 to 7 are collected. The superblock (SB) 100-1 stores DataA1 to DataP1 in the physical locations designated by PBA50 to PBA65, respectively. Of the data stored in the superblock (SB) 100-1, those having a reference count of zero are known to be DataD1 designated by PBA53, DataF1 designated by PBA55, DataK1 designated by PBA60, and DataM1 designated by PBA62, from the SB management table 200-1. The controller 4 selects the superblock (SB) 100-1 as a candidate for the block to be subjected to GC, that is, a candidate for the copy-source block for GC, on the condition that the amount of the invalid data in the superblock (SB) 100-1 is greater than the threshold X2. The current amount of the invalid data in the superblock (SB) 100-1 is 4, which is the same as the amount of the invalid data of the superblock (SB) 100-0. The threshold X2 is less than the threshold X1. If the threshold X1 is set to 4, the threshold X2 is set to a value of 3 or less. Thus, the superblock (SB) 100-1 satisfies the condition, and therefore it is selected as a candidate for the copy-source block for GC.

Figure 28:
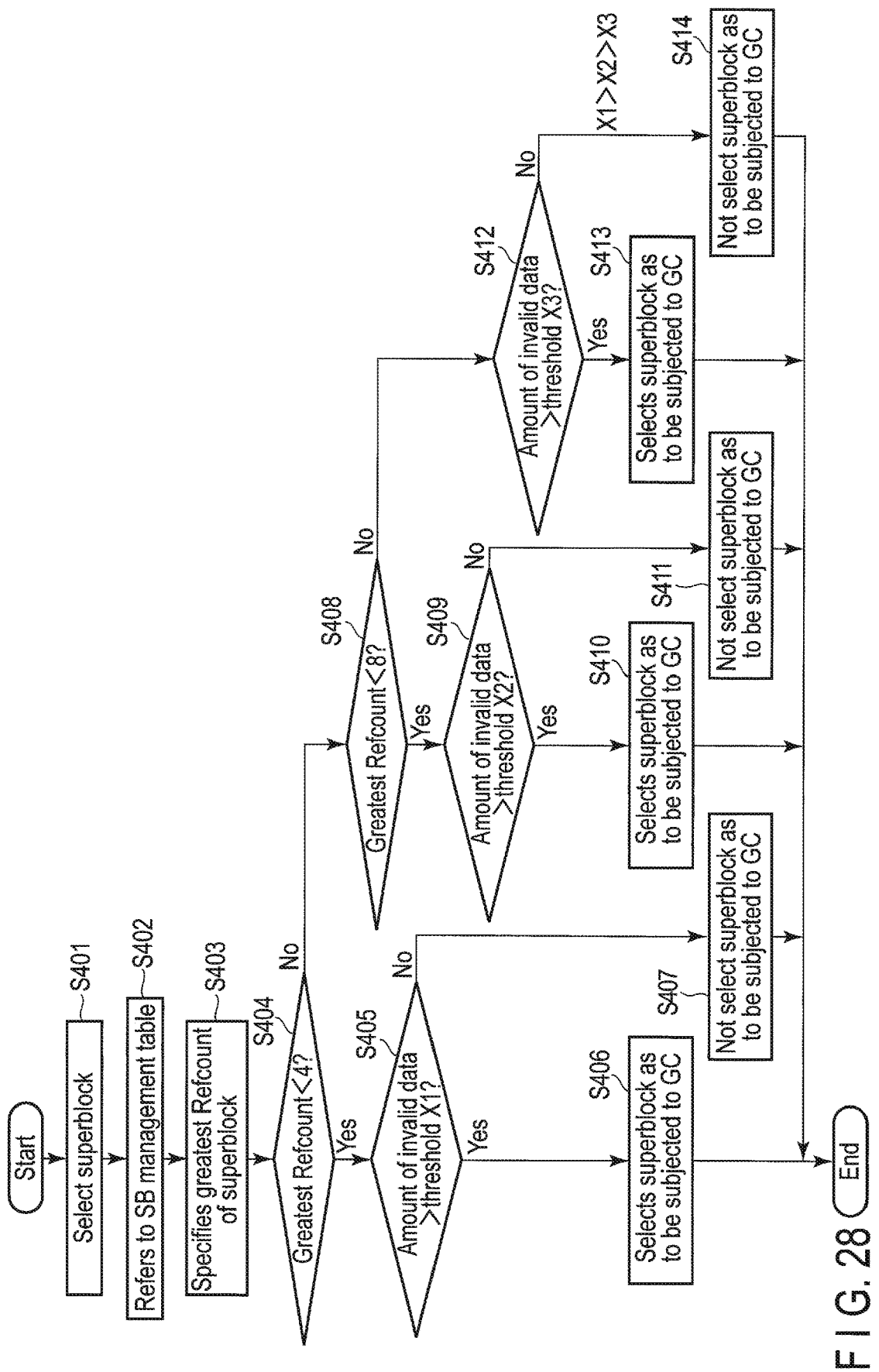
FIG. 28 is a flowchart illustrating a procedure of the selection of a copy-source block candidate executed by the memory system of the embodiment.

FIG. 28 is a flowchart which shows the procedure of the operation of selecting a candidate for the copy-source block. Here, for simplification of the explanation, let us suppose that all the superblocks (SB) of the NAND flash memory 5 are classified into a superblock (SB) group in which data belonging to a reference count range of 1 to 3 are collected, a superblock (SB) group in which data belonging to a reference count range of 4 to 7 are collected, and a superblock (SB) group in which data belonging to a reference count range of 8 to 15 are collected.

First, the controller 4 selects a superblock (SB) (step S401). Then, the controller 4 refers to the SB management table associated with the selected superblock (SB) (step S402), and specifies the greatest reference count (Refcount) from the reference counts (Refcount) of all the data stored in the selected superblock (SB) (step S403).

If the specified greatest reference count (Refcount) is less than 4 (YES in step S404), the controller 4 determines that the selected superblock (SB) belongs to the superblock (SB) group in which the data belonging to the reference count range of 1 to 3 are collected. Then, the controller 4 determines whether or not the amount of the invalid data of the selected superblock (SB) is greater than the threshold X1 (step S405).

If the amount of the invalid data is greater than the threshold X1 (YES in step S405), the controller 4 selects the selected superblock (SB) as a candidate for the superblock (copy-source block) to be subjected to GC (step S406). If the amount of the invalid data is less than threshold X1 (NO in step S405), the controller 4 does not select the selected superblock (SB) as a candidate for the superblock (copy-source block) to be subjected to GC (step S407).

If the specified greatest reference count (Refcount) is 4 or greater and less than 8 (NO in step S404 and YES in step S408), the controller 4 determines that the selected superblock (SB) belongs to the superblock (SB) group in which the data belonging to the reference counts range of 4 to 7 are collected. Then, the controller 4 determines whether or not the amount of the invalid data of the selected superblock (SB) is greater than the threshold X2 (<X1) (step S409).

If the amount of the invalid data is greater than the threshold X2 (YES in step S409), the controller 4 selects the selected superblock (SB) as a candidate for the superblock (copy-source block) to be subjected to GC (step S410). If the amount of the invalid data is less than the threshold X2 (NO in step S409), the controller 4 does not select the selected superblock (SB) as a candidate for the superblock (copy-source block) to be subjected to GC (step S411).

If the specified greatest reference count (Refcount) is 8 or greater (NO in step S408), the controller 4 determines that the selected superblock (SB) belongs to the superblock (SB) group in which the data belonging to the reference count range of 8 to 15 are collected. Then, the controller 4 determines whether or not the amount of the invalid data of the selected superblock (SB) is greater than the threshold X3 (<X2) (step S412).

If the amount of the invalid data is greater than the threshold X3 (YES in step S412), the controller 4 selects the selected superblock (SB) as a candidate for the superblock (copy-source block) to be subjected to GC (step S413).

If the amount of invalid data is less than the threshold X3 (NO in step S412), the controller 4 does not select the selected superblock (SB) as a candidate for the superblock (copy-source block) to be subjected to GC (step S414).

FIG. 29 shows the relationship between user data and intermediate addresses (iLBA) written in each page in a superblock (SB).

The controller 4 writes pairs of user data and iLBAs to pages in the superblock (SB). Here, the controller 4 may, first, generate an error detection code (EDC) based on each combination of iLBA and user data. Then, the controller 4 writes sets of iLBA, user data and EDC on the pages in the superblock (SB). When reading user data from the superblock (SB), the controller 4 examines whether or not the value calculated based on the read user data and read iLBA agrees with the read EDC, to determine whether or not the user data has been correctly read.

Next, the de-duplication executed during garbage collection (GC) will be described with reference to FIGS. 30 to 34.

FIG. 30 shows the data write operation to be executed when the reference count (Refcount) corresponding to a certain data overflows.

It is assumed here that the superblock (SB) 100-0 is a superblock for storing the data corresponding to reference counts (Refcount)=0 to 3. That is, the SB management table 200-0 associated with the superblock (SB) 100-0 includes a reference count storage area which can store a plurality of reference counts (Refcount) each having a 2-bit length.

Here, let us further suppose that write data (DataX) received from the host 2 agrees with DataA0 already stored in the superblock (SB) 100-0. If the current reference count of the DataA0 is 3, it is necessary to change the value of the reference count corresponding to the DataA0 from 3 to 4. However, the SB management table 200-0 managing the reference count (Refcount) of DataA0 cannot store reference counts (Refcount) greater than 3, and therefore the reference count (Refcount) of DataA0 cannot be changed to 4 from 3 (overflowing).

Under these circumstances, the controller 4 writes the DataX to a write-destination superblock (here, the superblock (SB) 100-1). At this time, the LUT 32 is updated and a non-used iLBA (here, iLBAx) is associated with LBAj corresponding to the DataX. Further, the iLUT 34 is updated, and PBA61 which indicates the physical location in the NAND flash memory 5, in which the DataX is written, is associated with the iLBAx. Furthermore, in the SB management table 200-1 managing the reference counts (Refcount) of the write-destination superblock (the superblock (SB) 100-1), the reference count (Refcount) corresponding to the DataX is set to 1.

Next, the de-duplication executed during GC will be described.

Figure 31:
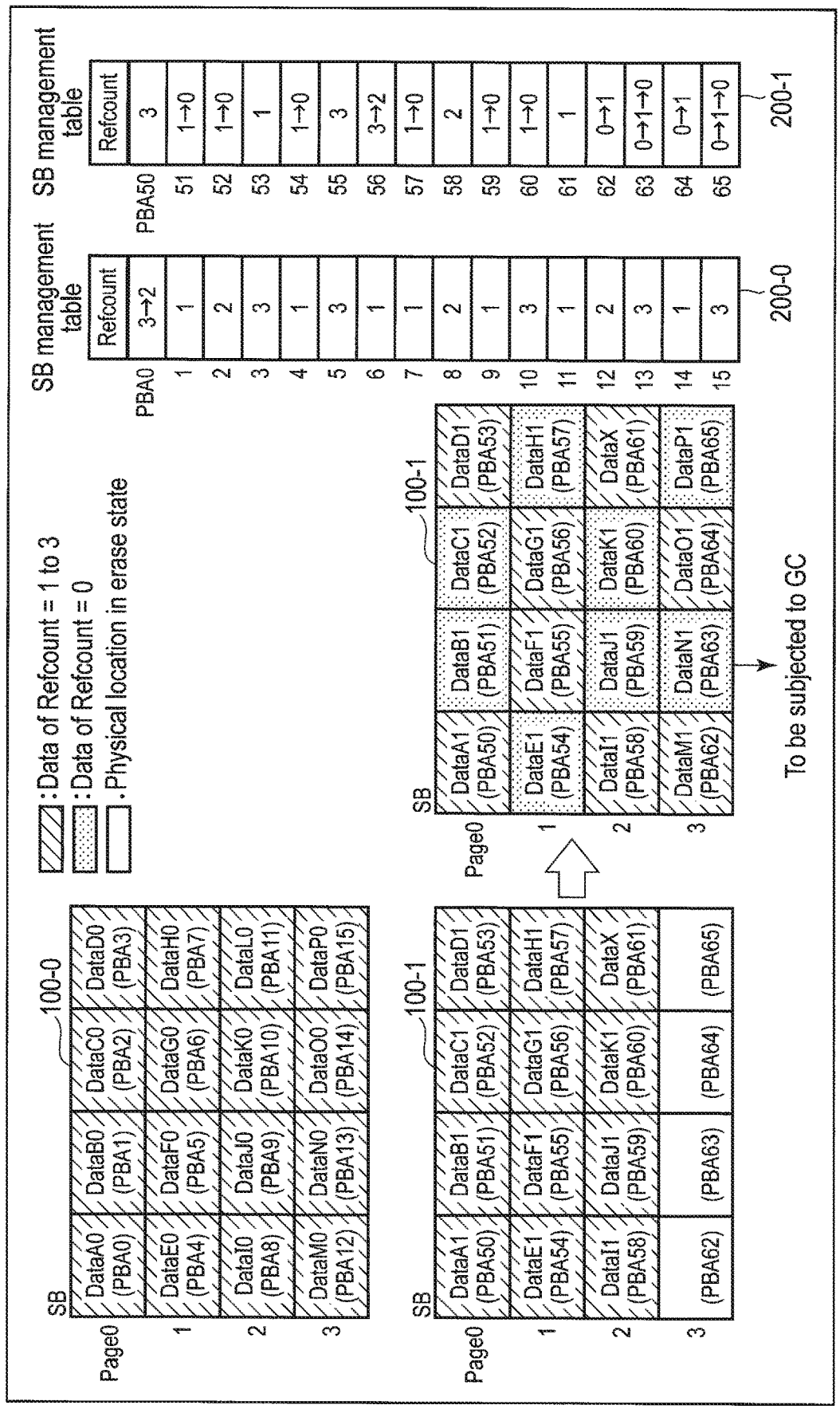
FIG. 31 is a diagram illustrating part of de-duplication operation executed by the memory system of the embodiment during garbage collection.

FIG. 31 illustrates, as an example, the case where the write-destination superblock (superblock (SB) 100-1) in which DataX is written, is selected as a superblock to be subjected to GC (a copy-source block for GC) after the entire superblock is filled with the write data from the host 2, and also the reference count (Refcount) of DataA0 which agrees with DataX is decremented from 3 to 2. In this case, as shown in FIG. 32, the controller 4 copies only the data corresponding to the reference counts of non-zero, other than DataX, (namely, DataA1, DataD1, DataF1, DataG1, DataI1, DataM1, DataO1) from the copy-source block (superblock (SB) 100-1) to the copy-destination block (superblock (SB) 100-2).

Figure 33:
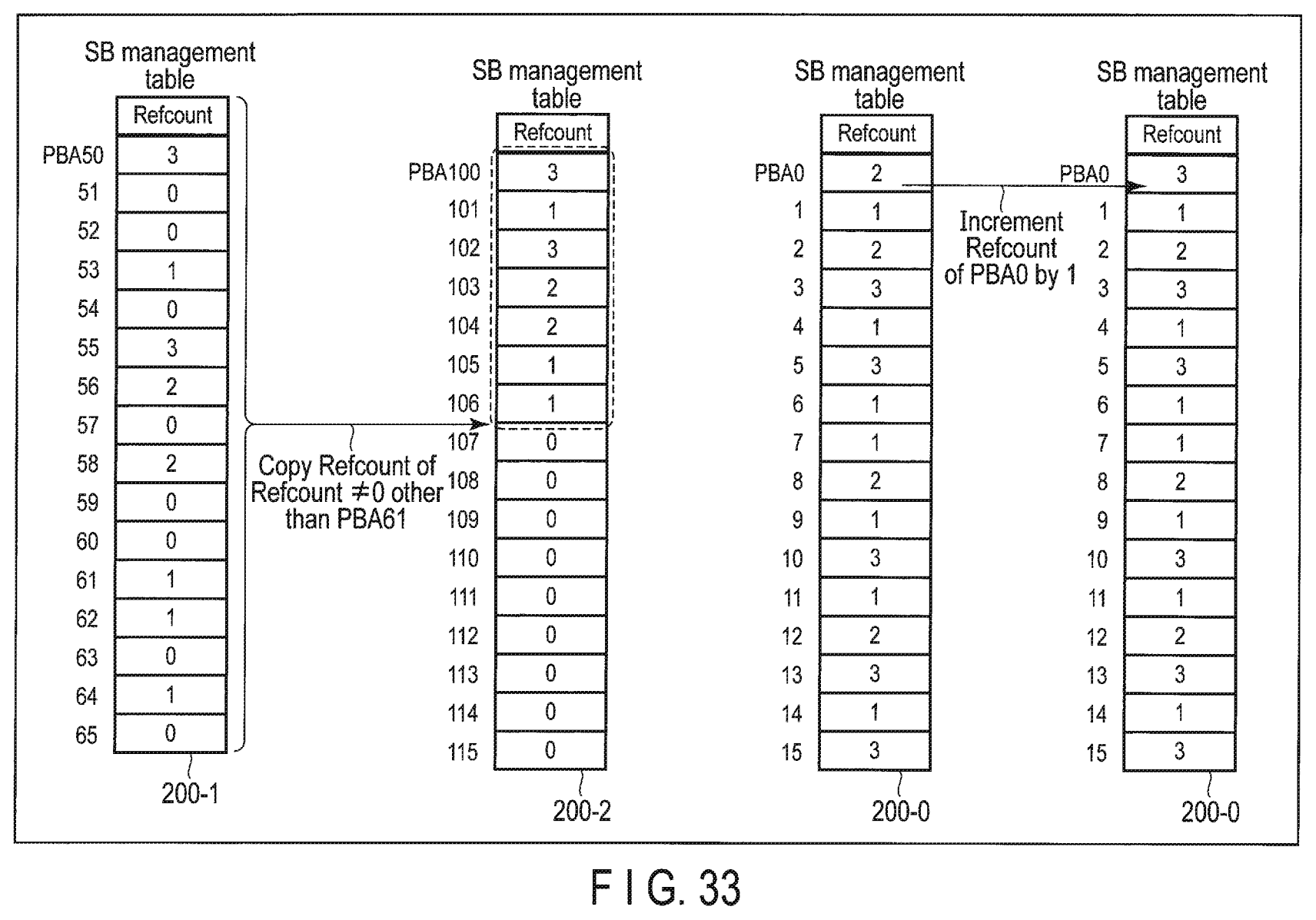

Then, as shown in FIG. 33, the controller 4 copies, of the reference counts (Refcount) of non-zero, those other than that of DataX (corresponding to PBA61) to the SB management table 200-2 from the SB management table 200-1. More specifically, the reference counts (Refcount) of DataA1 (corresponding to PBA50), DataD1 (corresponding to PBA53), DataF1 (corresponding to PBA55), DataG1 (corresponding to PBA56), DataI1 (corresponding to PBA58), DataM1 (corresponding to PBA62) and DataO1 (corresponding to PBA64) are copied from the SB management table 200-1 corresponding to the copy-source block (superblock (SB) 100-1) to the SB management table 200-2 corresponding to the copy-destination superblock (superblock (SB) 100-2).

Further, the controller 4 increments the reference count (Refcount) of DataA0 (corresponding to PBA0) by 1. Thus, in the SB management table 200-0 corresponding to the superblock (SB) 100-0 in which DataA0 which agrees with DataX is stored, the reference count (Refcount) of DataA0 (corresponding to PBA0) is changed from 2 to 3, for example.

Furthermore, as shown in FIG. 34, the controller 4 updates the LUT 32 and associates iLBA (here, iLBA0) which indicates the entry in the iLUT 34 holding PBA0 corresponding to DataA0, with LBA (here, LBAj) of DataX. Thus, when a read command including LBAj is received, PBA0 associated with iLBA0 can be referred to based on the iLBA0 corresponding to the LBAj. Therefore, DataA0 which agrees with DataX can be read.

FIG. 35 is a flowchart illustrating the procedure of GC operation for separating data including large reference counts and data including small reference counts from each other.

The controller 4 selects a superblock (copy-source block) to be subjected to GC from the superblock group in which the data including reference counts of non-zero and the data including a reference count of zero mixedly exist (step S501).

The controller 4 copies, to the first copy-destination block, a set of the data included in the copy-source block and corresponding respectively to the reference counts which belong to the first reference count range, based on the SB management table corresponding to the copy-source block (step S502). The first copy-destination block is a superblock associated with the SB management table including a reference count storage area which can store a plurality of reference counts each having a first bit length.

Next, the controller 4 copies, to the second copy-destination block, a set of the data included in the copy-source block and corresponding respectively to the reference counts belonging to the second reference count range having a lower limit higher than the upper limit of the first reference count range, based on the SB management table corresponding to the copy-source block (step S503). The second copy-destination block is a superblock associated with the SB management table including a reference count storage area which can store a plurality of reference counts each having a second bit length greater than the first bit length.

By the above-described processing, the data including reference counts belonging to the first reference count range and the data including reference counts belonging to the second reference count range are moved respectively to superblocks different from each other, and thus the data group belonging to the same reference count range can be collected in the same superblock. Therefore, the use efficiency of the reference count storage area of each SB management table can be enhanced, thereby making it possible to reduce the amount of the memory resource necessary for management of each reference count.

FIG. 36 is a flowchart illustrating the procedure of the redundant data copying process to be executed when the reference count corresponding to a certain data overflows.

The controller 4 determines whether or not the reference count of an already stored certain data (first data) has overflowed by reception of a new write data from the host 2 (step S601). In step S601, the controller 4 determines whether or not the value of the reference count corresponding to the first data exceeds the maximum expressible by the bit length of each reference count which can be stored in the reference count storage area of the SB management table corresponding to the first superblock in which the first data is stored by reception of the write data which agrees with the first data from the host 2.

If the value of the reference count corresponding to the first data exceeds the maximum expressible by the bit length of each reference count which can be stored in the reference count storage area of the SB management table corresponding to the first superblock (YES in step S601), the controller 4 copies the first data to another superblock associated with the management table including the reference count storage area which can store a plurality of reference counts each having a bit length greater than that of any reference count in the SB management table corresponding to the first superblock in which the first data is stored (step S602). Moreover, as described with reference to FIG. 24, in step S602, the controller 4 updates the SB management table corresponding to the superblock to which the first data is copied and increments the reference count corresponding to the first data by 1. Further, the controller 4 updates the iLUT 34 and associates PBA which indicates the physical location where the first data is copied with iLBA corresponding to the first data.

FIG. 37 is a flowchart illustrating the procedure of the reference count storage area expanding process to be executed when the reference count corresponding to a certain data overflows.

The controller 4 determines whether or not the reference count of an already stored certain data (first data) overflowed by reception of the new write data from the host 2 (Step S701). In step S701, the controller 4 determines whether or not the value of the reference count corresponding to the first data exceeds the maximum value expressible by the bit length of each reference count which can be stored in the reference count storage area of the SB management table corresponding to the first superblock in which first data is stored by reception of the write data which agrees with the first data from the host 2.

If the value of the reference count corresponding to the first data exceeds the maximum value expressible by the bit length of each reference count which can be stored in the reference count storage area of the SB management table corresponding to the first superblock (YES in step S701), the controller 4 expands the size of the reference count storage area of the SB management table corresponding to the first superblock to increase the bit length of each reference count storable in the reference count storage area of the SB management table corresponding to the first superblock (step S702). In step S702, as described with reference to FIG. 20, the controller 4 may release the previous reference count storage area and redo reserving a big-sized reference count storage area.

FIG. 38 is a flowchart illustrating the procedure of the data writing process to be executed when the reference count corresponding to a certain data overflows.

The controller 4 determines whether or not the reference count of an already stored certain data (first data) has overflowed by reception of the new write data from the host 2 (step S801). In step S801, the controller 4 determines whether or not the maximum value expressible by the bit length of each reference count which can be stored in the reference count storage area of the SB management table corresponding to the first superblock in which first data is stored, exceeds the value of the reference count corresponding to the first data by reception of the write data which agrees with the first data from the host 2.

If the value of the reference count corresponding to the first data exceeds the maximum value expressible by the bit length of each reference count which can be stored in the reference count storage area of the SB management table corresponding to the first superblock (YES in step S801), the controller 4 executes the following processing in place of associating iLBA already assigned to the first data with LBA of the write data.

The controller 4 updates LUT 32 and associates non-used iLBA (for example, iLBAx) with LBA of the write data (step S802). Subsequently, the controller 4 writes the write data to a certain superblock (for example, the current write-destination superblock) (step S803). The controller 4 updates iLUT 34 and associates PBA which indicates the location (physical location) in the NAND flash memory 5, in which the write data is written, with the iLBA (iLBAx) associated with LBA of the write data (step S804). Then, the controller 4 updates the SB management table corresponding to the superblock in which the write data is written, and sets the reference count corresponding to the write data to 1 (step S805).

As a result, even if the value of the current reference count of the already existing data (first data) which agrees with write data reaches the maximum value expressible by the maximum bit length of the usable reference count, the write data can be written in the NAND flash memory 5.

FIG. 39 illustrates an address reference structure in which an address reference path directly referring to PBA from LBA and an address reference path referring to PBA from LBA through iLBA, mixedly exist.

In FIG. 39, LBA 32 is configured to associate either one of iLBA and PBA with a certain LBA.

When iLBA is associated with a certain LBA, PBA is not referred to PBA directly from this LBA, but referred to from this LBA through iLBA. In this case, as described above, address translation is executed using two address translation tables including LBA32 and iLUT 34.

On the other hand, when PBA is associated with a certain LBA, the LBA can be referred to directly from the PBA as in ordinary cases of the SSD, and thus the performance of, for example, the data reading operation can be improved.

In this embodiment, when data (redundant data) which agrees with write data received from the host 2 does not exist in the NAND flash memory 5, either one of the followings is executed.

(1) The controller 4 updates the hash LUT 33 to assigns non-use iLBA to the hash value of the write data, and then updates the LUT 32 to associates this iLBA with LBA of the write data.

(2) The controller 4 updates the LUT 32 and associates PBA directly with LBA of the write data.

In the case of case (2), the write data may be written to a monopoly type superblock. In FIG. 39, the superblocks (SB) 100-100, 100-101, 100-102, . . . , indicate monopoly type superblocks (SB). A monopoly type superblock (SB) means a superblock (SB) for storing data to be referred to only from a single LBA. The monopoly type superblocks (SB) are each associated with an SB management table including a reference count storage area where can store a plurality of reference counts (Refcount) each having a 1-bit length. A reference count of a 1-bit length=0 indicates that the corresponding data is not referred to from any LBA, that is, the corresponding data is invalid data. A reference count of a 1-bit length=1 indicates that the corresponding data is referred to from only one LBA, that is, the corresponding data is valid data. In the case where write data is written to a monopoly type superblock, the LUT 32 may be notified that the write-destination superblock is a monopoly type superblock, and thereby PBA may be associated with LBA of the write data.

In the case (1) above, the write data may be written to a share-type superblock. In FIG. 39, superblocks (SB) 100-0, 100-1, 100-2, . . . , 100-50, 100-51, 100-52, . . . , indicate share-type superblocks (SB). A share-type superblock (SB) means a superblock (SB) for storing data which may be referred to from a plurality of LBAs. The share-type superblocks (SB) are each associated with an SB management table including a reference count storage area where can store a plurality of reference counts (Refcount) each having 2 bits or more. FIG. 39 illustrates, as an example, the SB management tables associated respectively with the superblocks (SB) 100-50, 100-51, 100-52, . . . , each include a reference count storage area which can store a plurality of reference counts of a 2-bit length (or 8-bit length), and the SB management tables associated respectively with the superblocks (SB) 100-0, 100-1, 100-2, . . . , each include a reference count storage area which can store a plurality of reference counts each having a 4-bit length (or 16-bit length). In the case where write data is written to a share type superblock, the LUT 32 may be notified that the write-destination superblock is a share-type superblock, and thereby, iLBA may be associated by LBA of the write data.

In each of the share type superblocks (SB), when the reference counts corresponding to a certain stored data overflow, the size of the reference count storage area of the corresponding SB management table may be expanded. For example, when it necessary to change the reference count corresponding to a certain data stored in the superblock (SB) 100-50, from 3 to 4 (or necessary to change from 255 to 256), the size of the reference count storage area of the SB management table corresponding to the superblock (SB) 100-50 may be expanded to change the bit length of each reference count of this SB management table from 2 bits to 4 bits (from 8 bits to 16 bits).

When data (redundant data) which agrees with the write data received from the host 2 does not exist in the NAND flash memory 5, the controller 4 may associate whichever of iLBA/PBA with LBA of the write data. In this case, the controller 4 may determine which of iLBA/PBA should be associated with LBA of the write data, based on the hint information received from the host 2. For example, in the case where hint information indicating an LBA group which may be referred to from other LBA is notified to the SSD 3, the controller 4 may associate PBA with LBA of the write data and write the write data to a monopoly type superblock if data (redundant data) which agrees with the write data does not exist in the NAND flash memory 5 and LBA of the write data does not belong to the LBA group notified by the hint information.

FIG. 40 illustrates an address reference structure in which PBA is referred to from LBA through iLBA for all data.

When data (redundant data) which agrees with write data received from the host 2 does not exist in the NAND flash memory 5, the controller 4 assigns a non-use iLBA to the hash value of the write data and associates the iLBA to LBA of the write data. Then, the controller 4 writes the write data to a monopoly type superblock.

In a certain monopoly-type superblock (SB), when the reference count corresponding to certain stored data overflows, the size of the reference count storage area of the corresponding SB management table may be expanded.

For example, when it is necessary to change the reference count corresponding to a certain data stored in the superblock (SB) 100-10 from 1 to 2, the size of the reference count storage area of the SB management table corresponding to the superblock (SB) 100-100 may be expanded to change the bit length of each reference count of this SB management table from 1 bit to 2 bits (or from 1 bit to 8 bits).

Moreover, in a share-type superblock (SB) also, when the reference count corresponding to a certain stored data overflows, the size of the reference count storage area of the corresponding SB management table may be expanded.

For example, when it is necessary to change the reference count corresponding to a certain data stored in the superblock (SB) 100-50 from 3 to 4 (or from 255 to 256), the size of the reference count storage area of the SB management table corresponding to the superblock (SB) 100-50 may be expanded whereby to change the bit length of each reference count of the SB management table from 2 bits to 4 bits (or from 8 bits to 16 bits).

When data (redundant data) which agrees with the write data received from the host 2 does not exist in the NAND flash memory 5, the controller 4 may determine the type of the superblock (SB) to which the write data should be written based on the hint information received from the host 2. For example, in the case where the hint information indicating an LBA group with a high probability of being referred to from each of the other LBAs is notified to the SSD 3, and if data (redundant data) corresponding to the write data does not exist in the NAND flash memory 5 and also the LBA of the write data belongs to the LBA group notified by the hint information, the controller 4 may write the write data to a share-type superblock.

FIG. 41 shows a configuration example of the look-up table (LUT) 32 used in the address reference structure shown in FIG. 39.

The LUT 32 includes a plurality of entries corresponding to a plurality of LBAs, respectively. Each entry includes a flag field and an iLBA/PBA field. The flag field holds a flag indicating that the content of the corresponding iLBA/PBA field is either one of iLBA and PBA. For example, the flag of "1" indicates that the content of the corresponding iLBA/PBA field is iLBA, and the flag of "0" indicates that the content of the corresponding iLBA/PBA field is PBA.

When a read command is received from the host 2, the controller 4 acquires a flag and an address (iLBA/PBA) from the entry corresponding to the LBA included in the read command with reference to the LUT 32.

If the flag acquired from the LUT 32 is "1", the controller 4 refers to the iLUT 34 using the address (iLBA) acquired from the LUT 32 and acquires PBA from the iLUT 34. Then, the controller 4 reads the data from the physical location in the NAND flash memory 5 designated by the PBA acquired from the iLUT 34.

On the other hand, if the acquired flag is "0", the controller 4 reads the data from the physical location in the NAND flash memory 5, designated by the address (PBA) acquired from the LUT 32 without reference to the iLUT 34.

FIG. 42 shows an example of a hardware configuration example of an information processing device (computing device) functioning as the host 2.

The information processing device is realized as a computing device such as a server. The information processing device includes a processor (CPU) 101, a main memory 102, a BIOS-ROM 103, a network controller 105, a peripheral interface controller 106, a controller 107, an embedded controller (EC) 108 and the like.

The processor 101 is a CPU configured to control the operation of each component of the information processing device. The processor 101 executes various programs loaded to the main memory 102 from one of a plurality of SSDs 3. The main memory 102 comprises a random access memory such as DRAM.

Further, the processor 101 also executes the basic input/output system (BIOS) stored in the BIOS-ROM 103, which is a nonvolatile memory. The BIOS is a system program for hardware control.

The network controller 105 is a communication device such as a cable LAN controller or a wireless LAN controller. The peripheral interface controller 106 is configured to execute communications with a peripheral device such as a USB device.

The controller 107 is configured to execute communications with devices connected respectively to a plurality of connectors 107A. The SSDs 3 may be connected respectively to these connectors 107A. The controller 107 is, for example, an SAS expander, PCIe Switch, PCIe expander, a flash array controller or a RAID controller.

The EC 108 functions as a system controller configured to execute power control of the information processing device. The EC 108 turns on/off the power of the information processing device in reply to the user's operation on the power switch.

Figure 43:
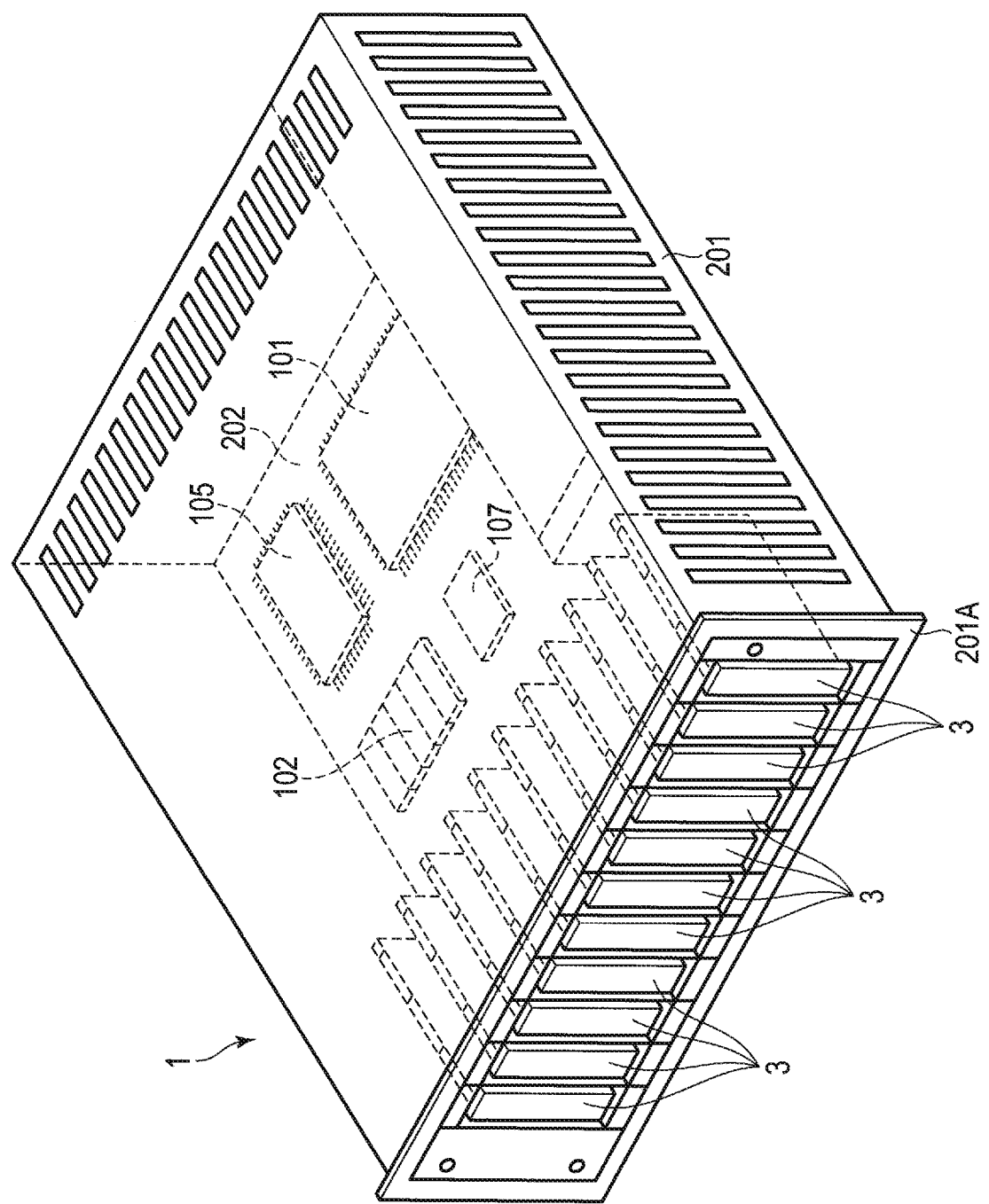
FIG. 43 is a diagram illustrating a configuration example of a computer including a host and the memory system of the embodiment.

FIG. 43 illustrates a configuration example of the information processing device (computing device) including a plurality of SSDs 3 and a host 2.

The information processing device comprises a thin box-shaped housing 201 accommodatable in a rack. A number of SSDs 3 may be disposed in the housing 201. In this case, these SSDs 3 may be removably inserted respectively to slots provided in a front face 201A of the housing 201.

A system board (mother board) 202 is disposed in the housing 201. On the system board (mother board) 202, various electronic parts including a CPU101, a main memory 102, a network controller 105 and a controller 107 are mounted. These electronic parts function as the host 2.

As described above, according to this embodiment, address translation is executed in two levels using the LUT 32 and the iLUT 34. In the LUT 32, if the write data agrees with already existing certain data, the same intermediate address (iLBA) as the intermediate address (iLBA) of the already existing data is associated with the logical address (LBA) of the write data. Thus, in the iLUT 34, regardless of the number of logical addresses referring to a certain data, each physical address is associated with only one intermediate address (iLBA).

Therefore, even in the case where data (redundant data) currently referred to from a plurality of logical addresses are copied to another block by garbage collection, it can be guaranteed that the controller 4, merely by updating only one entry in the iLUT 34 corresponding to this one intermediate address to a copy-destination physical address, can correctly refer to the copy-destination physical address from these logical addresses.

Further, all of the reference counts corresponding respectively to a plurality of data stored in a certain first block (superblock) are managed by the management table (the SB management table) corresponding to the first block. Here, when a certain first block is selected as a copy-source block to be subjected to GC, the processing of copying a set of the data included in the copy-source block and corresponding respectively to reference counts belonging to a first reference count range to a copy-destination block, and the processing of copying a set of the data included in the copy-source block and corresponding respectively to reference counts belonging to a second reference count range having a lower limit higher than the upper limit of the first reference count range to a copy-destination block are performed, based on the contents of the management table corresponding to the first block. Thus, a set of data corresponding respectively to reference counts belonging to the same reference count range can be collected in the same block. Therefore, as compared to the situation where data including different reference counts mixedly exist in the same superblock, the amount of consumption of the memory resource for the reference count storage area can be significantly reduced. As a result, it is possible to save the memory source required for storing management data necessary for de-duplication.

Moreover, the data groups belonging to the same reference count range have approximately similar lifetimes. Therefore, it becomes possible to increase the probability that the data included in the same superblock are invalidated approximately at the same timing by collecting a set of data corresponding respectively to reference counts belonging to the same reference count range in the same block, and thus the frequency of execution of GC can be reduced. As a result, it is possible to lower the write amplification, and the lifetime of the SSD 3 can be maximized.

Note that this embodiment is described in connection with the case where the allocation of write-destination blocks/copy-destination blocks, erase operation, write operation and read operation are executed in the unit of a superblock including a plurality of physical blocks, but they may be executed in the unit of a physical block. In other word, it suffices if the number of physical blocks included in a first block is one or more.

Further, in this embodiment, as the nonvolatile memory, a NAND flash memory is illustrated. But, the functions of this embodiment are applicable to other various nonvolatile memories, for example, magnetoresistive random access memory (MRAM), phase change random access memory (PRAM), resistive random access memory (ReRAM) or ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory including a plurality of blocks; and
a controller electrically connected to the nonvolatile memory and configured to:
manage, per physical address in which data have been stored, the number of logical addresses associated with the physical address; and
perform garbage collection by:
copying first data from a first physical address in a copy-source block to a first block and not copying second data from a second physical address in the copy-source block to the first block; and
copying the second data from the second physical address in the copy-source block to a second block and not copying the first data from the first physical address in the copy-source block to the second block, wherein
the number of logical addresses associated with the first physical address belongs to a first range,
the number of logical addresses associated with the second physical address belongs to a second range different from the first range.

2. The memory system of claim 1, wherein,
when the first data is data having a lifetime longer than a lifetime of the second data, the first range is greater than the second range.

3. The memory system of claim 1, wherein
the controller is further configured to:
when write data received from a host is update data of data already stored in the nonvolatile memory, decrement the number of logical addresses associated with a physical address of the data by one.

4. The memory system of claim 1, wherein
the controller is further configured to:
in response to receiving write data from a host,
in a case where third data that matches with the write data is not stored in the nonvolatile memory,
write the write data to the nonvolatile memory,
update a first translation table managing a corresponding relationship between logical addresses and intermediate addresses to associate first intermediate address with a logical address of the write data,
update a second translation table managing a corresponding relationship between the intermediate addresses and physical addresses to associate a third physical address with the first intermediate address, the third physical address indicating a location of the nonvolatile memory in which the write data is written, and
set the number of logical addresses associated with the third physical address to one; and
in a case where the third data that matches with the write data is already stored in the nonvolatile memory,
without writing the write data to the nonvolatile memory, update the first translation table to associate a second intermediate address with the logical address of the write data, the second intermediate address being associated with a fourth physical address in the second translation table, the fourth physical address indicating a location of the nonvolatile memory in which the third data is stored, and
increment the number of logical addresses associated with the fourth physical address by one.

5. A memory system comprising:
a nonvolatile memory including a plurality of blocks; and
a controller electrically connected to the nonvolatile memory and configured to:
manage, per physical address in which data have been stored, the number of logical addresses associated with the physical address; and
perform garbage collection by selecting first data in preference to second data as copy target data for the garbage collection, wherein the first data is stored at a first physical address, the number of logical addresses associated with the first physical address belongs to a first range, the second data is stored at a second physical address, the number of logical addresses associated with the second physical address belongs to a second range, and the first range is greater than the second range.

6. The memory system of claim 5, wherein the first data is data having a lifetime longer than a lifetime of the second data.

7. The memory system of claim 5, wherein the controller is further configured to:

when write data received from a host is update data of data already stored in the nonvolatile memory, decrement the number of logical addresses associated with a physical address of the data by one.

8. The memory system of claim 5, wherein the controller is further configured to:

in response to receiving write data from a host, in a case where third data that matches with the write data is not stored in the nonvolatile memory, write the write data to the nonvolatile memory, update a first translation table managing a corresponding relationship between logical addresses and intermediate addresses to associate first intermediate address with a logical address of the write data, update a second translation table managing a corresponding relationship between the intermediate addresses and physical addresses to associate a third physical address with the first intermediate address, the third physical address indicating a location of the nonvolatile memory in which the write data is written, and set the number of logical addresses associated with the third physical address to one; and in a case where the third data that matches with the write data is already stored in the nonvolatile memory, without writing the write data to the nonvolatile memory, update the first translation table to associate a second intermediate address with the logical address of the write data, the second intermediate address being associated with a fourth physical address in the second translation table, the fourth physical address indicating a location of the nonvolatile memory in which the third data is stored, and increment the number of logical addresses associated with the fourth physical address by one.

9. A memory system comprising:

a nonvolatile memory including a plurality of blocks; and a controller electrically connected to the nonvolatile memory and configured to:

manage, per physical address in which data have been stored, the number of logical addresses associated with the physical address; and when executing garbage collection, copy data stored at a copy-source physical address of the nonvolatile memory to a copy-destination physical address of the nonvolatile memory, and associate the number of logical addresses that has been associated with the copy-source physical address with the copy-destination physical address.

10. The memory system of claim 9, wherein the controller is further configured to:

when write data received from a host is update data of data already stored in the nonvolatile memory, decrement the number of logical addresses associated with a physical address of the data by one.

11. The memory system of claim 9, wherein the controller is further configured to:

in response to receiving write data from a host, in a case where third data that matches with the write data is not stored in the nonvolatile memory, write the write data to the nonvolatile memory, update a first translation table managing a corresponding relationship between logical addresses and intermediate addresses to associate first intermediate address with a logical address of the write data, update a second translation table managing a corresponding relationship between the intermediate addresses and physical addresses to associate a third physical address with the first intermediate address, the third physical address indicating a location of the nonvolatile memory in which the write data is written, and set the number of logical addresses associated with the third physical address to one; and in a case where the third data that matches with the write data is already stored in the nonvolatile memory, without writing the write data to the nonvolatile memory, update the first translation table to associate a second intermediate address with the logical address of the write data, the second intermediate address being associated with a fourth physical address in the second translation table, the fourth physical address indicating a location of the nonvolatile memory in which the third data is stored, and increment the number of logical addresses associated with the fourth physical address by one.

\* \* \* \* \*